United States Patent
Jetzfellner

(10) Patent No.: US 11,231,958 B2
(45) Date of Patent: Jan. 25, 2022

(54) METHOD AND CONTROL SYSTEM FOR CONTROLLING AND/OR MONITORING DEVICES

(71) Applicant: Siemens Aktiengesellschaft, Munich (DE)

(72) Inventor: Thomas Jetzfellner, Aschheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/962,252

(22) PCT Filed: Oct. 22, 2018

(86) PCT No.: PCT/EP2018/078901
§ 371 (c)(1),
(2) Date: Jul. 15, 2020

(87) PCT Pub. No.: WO2019/141391
PCT Pub. Date: Jul. 25, 2019

(65) Prior Publication Data
US 2021/0065919 A1    Mar. 4, 2021

(30) Foreign Application Priority Data

Jan. 22, 2018 (EP) .................. 18000379
Jan. 22, 2018 (EP) .................. 18152750
(Continued)

(51) Int. Cl.
*G06F 9/46* (2006.01)
*G16Y 40/30* (2020.01)
*G06F 16/182* (2019.01)

(52) U.S. Cl.
CPC .......... *G06F 9/466* (2013.01); *G06F 16/1837* (2019.01); *G16Y 40/30* (2020.01)

(58) Field of Classification Search
CPC ...... G06F 9/466; G06F 16/1837; G16Y 40/30
See application file for complete search history.

(56) References Cited

U.S. PATENT DOCUMENTS

2005/0055385 A1    3/2005  Sinha et al.
2013/0054765 A1    2/2013  Baret et al.
(Continued)

FOREIGN PATENT DOCUMENTS

CN    105579965 A    5/2016
CN    106981004 A    7/2017
(Continued)

OTHER PUBLICATIONS

Anderson Ross: "Security Engineering. A Guide to Building Dependable Distributed Systems"; Wiley; Jan. 2001; 2001.
(Continued)

*Primary Examiner* — Jason D Recek
(74) *Attorney, Agent, or Firm* — Schmeiser, Olsen & Watts, LLP

(57) ABSTRACT

A simple management of complex control instruction chains in a blockchain for a specific task for controlling devices is provided. In particular, embodiments of the invention permits a prescribed validity to be assigned for a specific task of blockchain-based device control, the validity being defined by the life cycle (e.g. the period of use) of a device, for example.

17 Claims, 3 Drawing Sheets

(30) Foreign Application Priority Data

| | | |
|---|---|---|
| Mar. 16, 2018 | (EP) | 18162189 |
| Apr. 18, 2018 | (EP) | 18167960 |
| Apr. 18, 2018 | (WO) | PCT/EP2018/059891 |
| Apr. 27, 2018 | (WO) | PCT/EP2018/060900 |
| May 29, 2018 | (EP) | 18174922 |
| Aug. 2, 2018 | (WO) | PCT/EP2018/071065 |
| Aug. 2, 2018 | (WO) | PCT/EP2018/071066 |

(56) References Cited

U.S. PATENT DOCUMENTS

| | | | |
|---|---|---|---|
| 2013/0060741 A1 | 3/2013 | Zvibel | |
| 2015/0089034 A1 | 3/2015 | Stickle et al. | |
| 2017/0206522 A1 | 7/2017 | Schiatti et al. | |
| 2017/0295023 A1 | 10/2017 | Madhavan et al. | |
| 2018/0336509 A1* | 11/2018 | Guttmann | G06N 5/046 |
| 2019/0095647 A1 | 3/2019 | Merli et al. | |

FOREIGN PATENT DOCUMENTS

| | | |
|---|---|---|
| CN | 107272437 A | 10/2017 |
| DE | 102011018878 B3 | 9/2012 |
| DE | 102011081796 A1 | 2/2013 |
| DE | 102012214324 A1 | 3/2013 |
| DE | 102016205289 A1 | 10/2017 |
| WO | WO 2017145006 A1 | 8/2017 |

OTHER PUBLICATIONS

Baird Leemon: "Overview of Swirlds Hashgraph", Swirlds; 2016.

Needham Roger M et al: "Using encryption for authentication in large networks of computers", ACM: Communications of the ACM, vol. 21, No. 12, Dec. 1978; 1978.

The Ethereum Book Project/Mastering Ethereum https://github.com/ethereumbook/ethereumbook, Status: Oct. 24, 2017; 2017.

Christidis Konstantinos et al: "Blockchains and Smart Contracts for the Internet of Things", IEEE Access, vol. 4, pp. 2292-2303, XP011613134, DOI: 10.1109/ACCESS.2016.2566339, retrieved on Jun. 3, 2016; abstract pp. 2296-22298, p. 2293, left column, paragraph 1-3, p. 2296, left column, paragraph 3, p. 2298, left column, last paragraph, p. 2298, right column, last and penultimate paragraph, abstract, fig. 1; pp. 2292, col. 1, paragraph 1; pp. 2293; pp. 2295, col. 1, paragraph 5: 2016.

Baird Leemon: "The Swirlds Hashgraph Consensus Algorithm: Fair, Fast, Byzantine Fault Tolerance", Swirlds Tech Report SWIRLDS-TR-2016-01; 2016.

Blockchainhub: "Blockchain Oracles", https://blockchainhub.net/blockchain-oracles/; 2018.

Anonymous et al; "Cache replacement policies"; Wikipedia; pp. 1-7;L XP055532967; https://en.wikipedia.org/w/indes.php?title=Cache_replacement_policies&oldid=804458100; 2017.

Henning Diedrich: "Ethereum: Blockchains, Digital Assets, Smart Contracts, Decentralized Autonomous Organizations", CreateSpace Independent Publishing Platform; 2016.

Antonopoulos Andraes M: "Mastering Bitcoin—Unlocking Digital Cryptocurrencies", O'Reilly Media, Beijing Cambridge Farnham Köln; Sebastopol Tokyo, XP055306939, ISBN: 978-1-4493-7404-4, pp. 113, 123, 158, 179-182, 18-25, 61-63, 161-173; the whole document.

Joseph Poon, Thaddeus Dryja: The Bitcoin Lightning Network: Scalable Off-Chain Instant Payments. Jan. 14, 2016, abgeru-fen am Jun. 30, 2018 (PDF; 3 MB, english).

PCT International Search Report dated Feb. 1, 2019 corresponding to PCT International Application No. PCT/EP2018/078901 filed Oct. 22, 2018.

* cited by examiner

METHOD AND CONTROL SYSTEM FOR CONTROLLING AND/OR MONITORING DEVICES

CROSS-REFERENCE TO RELATED APPLICATIONS

This application is a national stage entry of PCT Application No. PCT/EP2018/078901, having a filing date of Oct. 22, 2018, PCT/EP2018/071066, having a filing date of Aug. 2, 2018, PCT/EP2018/071065, having a filing date of Aug. 2, 2018, EP 18174922.7, having a filing date of May 29, 2018, PCT/EP2018/060900, having a filing date of Apr. 27, 2018, EP 18167960.6, having a filing date of Apr. 18, 2018, PCT/EP2018/059891, having a filing date of Apr. 18, 2018, EP18162189.7, having a filing date of Mar. 16, 2018 and EP 18000379.0, having a filing date of Jan. 22, 2018, EP 18152750.8, having a filing date of Jan. 22, 2018, the entire contents all of which are hereby incorporated by reference.

FIELD OF TECHNOLOGY

The following relates to a method and control system for controlling and/or monitoring devices.

BACKGROUND

Devices, such as field devices and production devices, are being increasingly networked and can, by way of example, be provided/operated by different operators. Instruction sequences that can be executed by the devices are often conveyed to these devices. A disadvantage in this regard is that a performance of the instruction sequences is difficult to control in a heterogeneous network comprising devices from different operators.

SUMMARY

The technology of blockchains or "distributed ledgers" is currently a hotly discussed technology that can, in particular, be realized as a distributed database system. Besides applications for local payment systems (e.g. Bitcoin), new application technologies are being developed in the finance industry. In particular, transactions between firms can therefore be performed in a manner protected against manipulation without a mediator or clearing house. This allows new business models without a trusted mediator and reduces transaction costs, and new digital services can be provided flexibly without having to establish trust relationships and an infrastructure that has been set up specifically for the digital services. A transaction data record (or transaction, for short) protected by a blockchain comprises e.g. program code, which can also be referred to as what is known as a "smart contract".

According to one aspect, the invention relates to a control system for controlling and/or monitoring devices, comprising:
  a distributed database system (BC) having
    a multiplicity of nodes (BCN, BCN_D), wherein the nodes (300, BCN, BCN_D) and the devices (300, D, BCN_D) are connected to one another via a first communication network (NW1);
    a first determining module (110), wherein
      the first determining module assigns execution requirements to control instructions,
      an executability of the control instructions by nodes of the distributed database system or by devices is ascertained on the basis of the execution requirements that were (or have been) ascertained for the control instructions, for example,
      the execution requirements comprise device-specific requirements and/or presupposed control instructions,
      the first determining module comprises a cache module,
      the cache module comprises a prescribed number of entries,
      the entries store control instructions already executed by the devices with their associated execution requirements and/or store presupposed control instructions already executed by the devices;
    a first memory module (130) for storing the respective control instructions with the assigned execution requirements in control transactions, wherein
      the control transactions are stored in the distributed database system (BC);
      the control transactions are transmitted to the devices (300, D, BCN_D) by means of the distributed database system;
    a first checking module (140) for checking the respective execution requirements during execution of the control instructions of one of the control transactions by an applicable device, wherein
      checking is performed to ascertain whether confirmation transactions for the presupposed control instructions of the respective execution requirements of the respective control transaction are available in the distributed database system;
    an execution module (150, 150_D) for executing the control instructions by means of the applicable device on the basis of the result of the checking.

The executability can be ascertained on the basis of the execution requirements that need to be met e.g. for an execution of the control instructions by applicable devices/nodes. To this end, the applicable execution requirements for the control instructions have been determined first, for example.

Unless indicated otherwise in the description below, the terms "perform", "calculate", "computer-aided", "compute", "discover", "generate", "configure", "reconstruct" and the like preferably relate to actions and/or processes and/or processing steps that alter and/or produce data and/or that convert data into other data, the data being able to be presented or available as physical variables, in particular, for example as electrical impulses. In particular, the expression "computer" should be interpreted as broadly as possible in order to cover in particular all electronic devices having data processing properties. Computers can therefore be for example personal computers, servers, programmable logic controllers (PLCs), handheld computer systems, pocket PC devices, mobile radios and other communication devices that can process data in computer-aided fashion, processors and other electronic devices for data processing.

Within the context of the invention, "computer-aided" can be understood to mean for example an implementation of the method in which in particular a processor carries out at least one method step of the method.

Within the context of the invention, a processor can be understood to mean for example a machine or an electronic circuit. A processor can be in particular a central processing unit (CPU), a microprocessor or a microcontroller, for example an application-specific integrated circuit or a digital signal processor, possibly in combination with a memory unit for storing program instructions, etc. A processor can, by way of example, also be an IC (integrated circuit), in particular an FPGA (field programmable gate array) or an ASIC (application-specific integrated circuit), or a DSP (digital signal processor) or a graphics processor GPU (graphics processing unit). A processor can also be understood to mean a virtualized processor, a virtual machine or a soft CPU. It can, by way of example, also be a programmable processor that is equipped with configuration steps for carrying out the method according to the invention or that is configured by means of configuration steps such that the programmable processor realizes the features according to the invention for the method, the components, the modules or other aspects and/or subaspects of the invention.

Within the context of the invention, a "memory unit" or a "memory module" and the like can be understood to mean for example a volatile memory in the form of random access memory (RAM) or a permanent memory such as a hard disk or a data carrier.

Within the context of the invention, a "module" can be understood to mean for example a processor and/or a memory unit for storing program instructions. By way of example, the processor is configured specifically to execute the program instructions such that the processor performs functions to implement or perform the method according to the invention or a step of the method according to the invention.

A module can, by way of example, also be a node of the distributed database system that for example performs/realizes the specific functions/features of an applicable module. The respective modules can, by way of example, also be in the form of separate or standalone modules. To this end, the applicable modules can comprise further elements, for example. These elements are for example one or more interfaces (e.g. database interfaces, communication interfaces—e.g. network interface, WLAN interface) and/or an evaluation unit (e.g. a processor) and/or a memory unit. The interfaces can be used for example to interchange (e.g. receive, convey, send or provide) data. The evaluation unit can be used for example to compare, check, process, assign or calculate data in computer-aided and/or automated fashion. The memory unit can be used for example to store, retrieve or provide data in computer-aided and/or automated fashion.

Within the context of the invention, "comprise", in particular in regard to data and/or information, can be understood to mean for example (computer-aided) storage of applicable information or of an applicable datum in a data structure/data record (which e.g. is in turn stored in a memory unit).

Within the context of the invention, "assign", in particular in regard to data and/or information, can be understood to mean for example computer-aided assignment of data and/or information. By way of example, a second datum is assigned to a first datum in this regard by means of a memory address or a unique identifier (UID), e.g. by storing the first datum together with the memory address or the unique identifier of the second datum together in a data record.

Within the context of the invention, "provide", in particular in regard to data and/or information, can be understood to mean for example computer-aided provision. Provision is effected for example via an interface (e.g. a database interface, a network interface, an interface to a memory unit). This interface can be used for example to convey and/or send and/or retrieve and/or receive applicable data and/or information during the provision.

Within the context of the invention, "provision" can also be understood to mean for example loading or storing, for example of a transaction containing applicable data. This can, by way of example, be effected on or by a memory module. "Provision" can also be understood to mean for example transmitting (or sending or conveying) of applicable data from one node to another node of the blockchain or of the distributed database system (or the infrastructure thereof).

Within the context of the invention, a "checksum", for example a data block checksum, a data checksum, a node checksum, a transaction checksum, a concatenation checksum or the like, can be understood to mean for example a cryptographic checksum or cryptographic hash or hash value, which are formed or calculated, in particular by means of a cryptographic hash function, for a data record and/or data and/or one or more of the transactions and/or a subregion of a data block (e.g. the block header of a block of a blockchain or data block header of a data block of the distributed database system or only some of the transactions of a data block). A checksum can be in particular a checksum/s or hash value/s of a hash tree (e.g. Merkle tree, Patricia tree). Furthermore, it can, in particular, also be understood to mean a digital signature or a cryptographic message authentication code. The checksums can, by way of example, be used to provide cryptographic protection/protection against manipulation for the transactions and the data stored therein on different levels of the database system. If for example a high level of security is called for, the checksums are produced and checked at transaction level, for example. If a lower level of security is called for, the checksums are produced and checked at block level (e.g. for the entire data block or for only some of the data block and/or some of the transactions), for example.

Within the context of embodiments of the invention, a "data block checksum" can be understood to mean a checksum that for example is calculated for some or all transactions of a data block. A node can then, by way of example, check/discover the integrity/authenticity of the applicable part of a data block by means of the data block checksum. Additionally or alternatively, the data block checksum may in particular also have been formed for transactions of a preceding data block/predecessor data block of the data block. This data block checksum can in particular also be realized by means of a hash tree, for example a Merkle tree [1] or a Patricia tree, wherein the data block checksum is in particular the root checksum of the Merkle tree or of a Patricia tree or of a binary hash tree. In particular, transactions are safeguarded by means of further checksums from the Merkle tree or Patricia tree (e.g. by using the transaction checksums), wherein in particular the further checksums are leaves in the Merkle tree or Patricia tree. The data block checksum can thus for example safeguard the transactions by virtue of the root checksum being formed from the further checksums. The data block checksum can, in particular, be calculated for transactions of a specific data block of the data blocks. In particular, such a data block checksum can be adopted in a succeeding data block of the specific data block in order to concatenate this succeeding data block with its preceding data blocks, for example, and in particular thus to make an integrity of the distributed database system checkable. This allows the data block checksum for example to undertake the function of the concatenation checksum or to be adopted in the concatenation checksum. The header of a data block (e.g. of a new data block or of the data block for which the data block checksum has been formed) can comprise the data block checksum, for example.

Within the context of embodiments of the invention, a "transaction checksum" can be understood to mean a checksum that is in particular formed for a transaction of a data block. Additionally, for example a calculation of a data block checksum for an applicable data block can be speeded up, since for example already calculated transaction checksums can immediately be used as leaves e.g. of a Merkle tree for this purpose.

Within the context of embodiments of the invention, a "concatenation checksum" can be understood to mean a checksum that, in particular, indicates or references the preceding data block of the distributed database system for a respective data block of the distributed database system (in particular frequently referred to as "previous block hash" in specialist literature) [1]. This in particular involves an applicable concatenation checksum being formed for the applicable preceding data block. The concatenation checksum used can be for example a transaction checksum or the data block checksum of a data block (that is to say an existing data block of the distributed database system), in order to concatenate a new data block with an (existing) data block of the distributed database system. It is, by way of example, alternatively possible for a checksum to be formed for a header of the preceding data block or for all of the preceding data block and used as concatenation checksum. This can, by way of example, also be calculated for multiple or all preceding data blocks. It is, by way of example, also feasible for the concatenation checksum to be formed for the header of a data block and the data block checksum. However, a respective data block of the distributed database system preferably comprises a respective concatenation checksum that was calculated for or relates to a preceding data block, in particular even more preferably the directly preceding data block, of the respective data block. It is, by way of example, also possible for an applicable concatenation checksum to be also formed only for a portion of the applicable data block (e.g. preceding data block). This allows for example a data block to be produced that comprises an integrity-protected portion and an unprotected portion. This would allow for example a data block to be produced whose integrity-protected portion is invariable and whose unprotected portion can also still be altered later. Integrity-protected is intended to be understood here to mean in particular that an alteration of integrity-protected data is discoverable by means of a checksum.

The data stored in a transaction of a data block, for example, can, in particular, be provided in different ways. Instead of the data, e.g. user data such as measurement data or data/ownership relationships pertaining to assets, a transaction of a data block can comprise only the checksum for these data, for example. The applicable checksum can be produced in various ways. This can be e.g. an applicable data block checksum of a data block (containing the applicable data) of another database or of the distributed database system, a transaction checksum of a data block containing the applicable data (of the distributed database system or of another database) or a data checksum that was formed using the data.

Additionally, the applicable transaction can also comprise a reference to or an indication of a memory location (e.g. an address of a file server and details as to where the applicable data can be found on the file server; or an address of another distributed database that comprises the data). The applicable data could then, by way of example, also be provided in another transaction of a further data block of the distributed database system (e.g. if the applicable data and the associated checksums are contained in different data blocks). It is, by way of example, alternatively conceivable for these data to be provided via another communication channel (e.g. via another database and/or a cryptographically secured communication channel).

It is also possible, by way of example, for, in addition to the checksum, an additional data record (e.g. a reference to or an indication of a memory location) to be stored in the applicable transaction, in particular indicating a memory location from which the data can be retrieved. This is in particular advantageous for keeping a data size of the blockchain or distributed database system as small as possible.

Within the context of embodiments of the invention, "security-protected" can be understood to mean for example protection provided in particular by means of a cryptographic method. By way of example, this can be brought about by using the distributed database system to provide or transmit or send applicable data/transactions. This is preferably achieved by combining the various (cryptographic) checksums, since these interact in particular in synergistic fashion in order for example to improve the security or cryptographic security for the data of the transactions. In other words, "security-protected" within the context of embodiments of the invention can in particular also be understood to mean "cryptographically protected" and/or "protected against manipulation", "protected against manipulation" also being able to be referred to as "integrity-protected".

Within the context of embodiments of the invention, "concatenation of (the) data blocks of a distributed database system" can be understood to mean for example that data blocks each comprise information (e.g. concatenation checksum) referring to or referencing another data block or multiple other data blocks of the distributed database system [1][4][5].

Within the context of embodiments of the invention, "insertion into the distributed database system" and the like can be understood to mean for example that, in particular, a transaction or the transactions or a data block with its transactions is conveyed to one or more nodes of a distributed database system. If these transactions are for example validated successfully (e.g. by the node/s), these transactions are in particular concatenated as a new data block with at least one existing data block of the distributed database system [1][4][5]. For this purpose, the applicable transactions are stored for example in a new data block. In particular, this validation and/or concatenation can be performed by a trusted node (e.g. a mining node, a blockchain oracle or a blockchain platform). In particular, a blockchain platform can be understood to mean a blockchain as a service, as proposed in particular by Microsoft or IBM. In particular, a trusted node and/or a node can each store a node checksum (e.g. a digital signature) in a data block (e.g. in the data block validated and generated thereby, which is then concatenated), in order in particular to make it possible to identify the originator of the data block and/or to make it possible to identify the node. In this case, this node checksum indicates which node has for example concatenated the applicable data block with at least one other data block of the distributed database system.

Within the context of embodiments of the invention, "transaction" or "transactions" can be understood to mean for example a smart contract [4][5], a data structure or a transaction data record that, in particular, each comprise one of the transactions or multiple transactions. Within the context of embodiments of the invention, "transaction" or "transactions" can also be understood to mean for example the data of a transaction of a data block of a blockchain. A transaction can in particular comprise a program code that provides a smart contract, for example. By way of example, within the context of embodiments of the invention, a transaction can also be understood to mean a control transaction and/or confirmation transaction. A confirmation transaction is able, for example after successful execution of control transactions, to be stored by a device in the distributed database system (e.g. the device stores the confirmation transaction in the distributed database system). A confirmation transaction can comprise for example a confirmation of an execution of the control instructions of the control transaction by one of the devices if an applicable device from the devices has successfully executed the control instructions of the control transaction. To this end, the confirmation transaction can, by way of example, comprise a checksum produced by the applicable device (e.g. a transaction checksum) for the executed control instructions and/or a confirmation of the execution, which is e.g. likewise protected by the checksum. A confirmation transaction can, by way of example, also be stored in the distributed database system if the device partially executes the control instructions and/or the execution of the control instructions is interrupted. This can be the case e.g. if a fault has occurred on the device during the execution of the control instructions that no longer permits the execution of the control instructions (e.g. a fault occurred on an actuator or tool). By way of example, another device, for example meeting the execution requirements for the remaining unexecuted control instructions, can then use the confirmation transaction to execute these unexecuted control instructions of the applicable control transaction. Accordingly, the confirmation transaction can comprise for example the degree of execution or an indication about the executed portion of the control instructions. Alternatively or additionally, a confirmation transaction can indicate the control instructions that still need to be executed for a successful execution of the control instructions of an applicable control transaction. Accordingly, for example a confirmation transaction can comprise a data record indicating which of the control instructions still need to be executed and indicating which of the control instructions are missing for the successful execution of the control instructions of an applicable control transaction. This allows for example a further processing of the control instructions to take place even if the execution of the control instructions on a device was interrupted. Accordingly, for example the execution requirements can call for more than one device (e.g. two or three devices or more devices) to meet the execution requirements so that an execution of the control instructions is guaranteed even if e.g. a device fails during the execution of the control instructions of an applicable control transaction.

Alternatively, a transaction can, by way of example, be a data structure that stores data (e.g. the control instructions). A transaction can, by way of example, also be referred to as a message (that is to say a communication message storing data) or can be a message that e.g. stores applicable data (e.g. control instructions). Embodiments of the invention therefore allows applicable transactions or messages to be interchanged. Transactions can e.g. comprise the control instructions and/or contractual data and/or other data such as video data, user data, measurement data, etc.

Within the context of embodiments of the invention, "control instructions" or "control transactions" can be understood to mean for example a smart contract [4] [5] or executable program code that is in particular executed by the distributed database system, wherein for example the distributed database system or nodes and infrastructure thereof performs or implements the applicable control instructions. In particular, the control instructions can be used to control the devices/nodes. In particular, the control instructions or the control instructions of the/a control transaction can or are supposed to be used to control/actuate the devices and/or the nodes. In particular, multiple control instructions or control transactions comprising one or more data blocks yield an instruction sequence that can control in particular a production installation with the associated production machines, can control the devices of an automation network or can control the devices of a power supply system or can control devices on the Internet of Things. In particular, the production instructions or production steps for a product are encoded in the control instructions or control transactions (that is to say also in the instruction sequences). The devices (e.g. the applicable device) are for example devices of a technical system and/or industrial installation and/or of an automation network and/or of a production installation and/or devices on the Internet of Things that are in particular also a node of the distributed database system. The devices in this case can, by way of example, be field devices that are in particular also a node of the distributed database system. The devices can, by way of example, also be automated teller machines, wherein the control instructions prompt a cash payment. By way of example, the control instructions can be derived from or determined from an instruction sequence. By way of example, a control transaction can comprise one or more control instructions. By way of example, the control instructions encode mechanical movement and/or other physical variables (e.g. pressure or temperature) that are converted into the applicable mechanical movement and/or the applicable other physical variables by an applicable device/node (e.g. by an applicable actuator). The control instructions are then used to control actuators of the devices and/or nodes, for example. Accordingly, an applicable device/node comprises an actuator, for example. If a device/node is a robot, for example, then an actuator would also be referred to as an effector. A device can also be a mechatronic device or system, for example, a mechatronic device/system being an actuator and/or a linear motion device, for example. A linear motion device is a device for carrying out translative movements, for example. An applicable device can also be a drive system, for example. The control instructions and the devices and/or nodes can, by way of example, also be used to adjust and/or control a control loop, for example by virtue of the confirmation transactions for executed control instructions being evaluated by the control system and applicable control instructions being produced in response to the confirmation transactions. For these new control instructions, applicable execution requirements are then determined again, for example, and these are then stored in control transactions again, for example, so that the control transactions can—as described in embodiments of the invention—be executed by the applicable devices, for example. The control instructions can, by way of example, also be control instructions for controlling cryptographic devices and/or methods (e.g. a user authentication).

Control instructions can also be understood to mean for example instruction sequences or else transactions from a database or a database system that are supposed to be executed by devices or nodes of the distributed database system. The database system can be the distributed database system, for example, if there are e.g. transactions to which execution requirements were not yet allocated or assigned. Alternatively or additionally, the database system can be another database, e.g. a conventional hierarchic database, from which the applicable transactions can be retrieved.

Control instructions can also be understood to mean for example instruction sequences or else transactions that are provided by an input system and that are supposed to be executed by the distributed database system. Control instructions can be understood to mean for example instruction sequences or control instructions that are used to control mechanical and/or electrical and/or electromechanical and/or electronic devices.

Within the context of embodiments of the invention, "device-specific requirements" can be understood to mean for example a specific device that is e.g. stipulated by a unique identifier, devices that can perform prescribed control actions (e.g. a production robot that can weld metal parts; a painting robot that can apply prescribed paints to a manufactured part; devices that make electrical connections in a substation in automated fashion) or devices that perform production steps or control instructions with a prescribed precision and/or at a prescribed speed (e.g. lathes, milling cutters and cutting machines). Alternatively or additionally, "device-specific requirements" can also presuppose specific device classes that are prescribed for an execution or performance of the control instructions. In particular, a device class is understood to mean one or more devices (e.g. grinding devices or sawing devices) that are capable of executing specific prescribed actions (e.g. grinding or sawing a specific material), for example. In particular, the device-specific requirements are the requirements imposed on the applicable devices and/or nodes for executing the control instructions. The device-specific data or device properties then correspond for example to the actual and/or current device-specific data or device properties of a device. By way of example, checking is performed to ascertain whether a device or a production machine is capable of executing the control instructions with the prescribed precision that is e.g. prescribed in the device-specific requirements. In particular, device-specific requirements can also be referred to as machine and/or mechatronic and/or production-specific requirements. In particular, device-specific data or device properties can also be referred to as machine and/or mechatronic and/or production-specific data or device properties. In particular, device-specific data or device properties can also be referred to as device information. In particular, the device-specific requirements prescribe the requirements that are supposed to be met by the device-specific data of a device. In other words, the device-specific requirements prescribe a "setpoint" value that is compared against the "actual" value from the devices. The device-specific data are in particular the current device properties. These device properties/device-specific data comprise for example the UID of a device or system, available tools or supported production processes (milling, grinding or 3D printing), production precision, production costs, site of the devices, network address for addressing/actuating the device, authorized users, etc.

The device-specific requirements can, by way of example, also be security requirements or location-related requirements (e.g. a country statement, a GPS statement or zip code (PLZ)) that a device is supposed to meet for executing the control instructions. By way of example, one requirement can be that the device is supposed to have prescribed security devices or that execution of the control instructions on the device also requires specific/prescribed authentication. This can be the case for example if someone wishes to use a device (e.g. an automated teller machine) to withdraw cash. The control instructions are then, by way of example, the request by the customer to make a cash payment. If for example an applicable customer has specified that he e.g. permits a cash payment only in prescribed countries, e.g. Italy, France and Austria, then this is stored in the device-specific requirements (and in particular possibly implicitly in the execution requirements as well). An automated teller machine in Andorra might then not permit a payment or prevent a payment. Alternatively, this can e.g. also be prevented by another node of the distributed database system or prevented by a smart contract of the distributed database system. It is also possible, by way of example, for the security requirements to call for specific authentication of the customer. By way of example, for a pin to be entered for a payment (which is not necessarily the case e.g. in the USA) and/or for a specific pin length to be required (e.g. 8 characters) and/or for other additional authentication methods to be required (e.g. 2-factor authentication, mobile TAN, Google Authenticator).

Alternatively, the determining module can also analyze the control instructions further and, if for example the determining module already discovers that the device-specific requirements are not met or are not meetable, can create a control transaction that indicates this to the applicable device or the system and if need be prevents an execution of the control instructions. Alternatively, it is, by way of example, also possible for no control transaction to be produced, and at some point there is a timeout for the execution of the control instructions, e.g. after a prescribed period, which is preferably configurable.

Within the context of embodiments of the invention, "system-specific data" or "device-specific data" can also be understood to mean for example system properties or device properties of a device or technical system. The device-specific data or system-specific data are for example current device properties or system properties. The device-specific data or system-specific data (or the applicable properties) can, by way of example, comprise the following data for a technical system, the devices of a technical system or a device: the UID of the device or system, available tools or supported production processes (milling, grinding or 3D printing) of the device or system, production precision of the device or system, production costs of the device or system, site of the device or system, network address for addressing/actuating the device or system, authorized users for the device or system, name of the device or system, etc.

Depending on the chosen implementation, for example the system-specific data can be realized for one or more devices of a technical system generally, e.g. by virtue of a UID/(network) address of the technical system also being able to be used to address, identify or communicate with the applicable devices of the technical system. Alternatively or additionally, for example the device-specific data for one device or the multiple devices of the technical system can be included in the system-specific data.

Within the context of embodiments of the invention, a "technical system" can be understood to mean for example a device or multiple devices that are communicatively connected to one another and/or to a distributed database system (e.g. the first distributed database system).

Within the context of embodiments of the invention, "presupposed control instructions" can be understood to mean for example control instructions that, in particular, need to be executed by other nodes (of the distributed database system) and/or by one or more of the devices already before the applicable control instructions can be executed. In particular, applicable confirmation transactions for these previously executed control instructions are stored in the distributed database system (e.g. in data blocks of the distributed database system) if e.g. the previously executed control instructions were successfully executed by devices or nodes. In particular, these previously executed or presupposed control instructions also result in the device-specific requirements assigned to these previously executed control instructions being checked as well or taken into consideration as well. The execution requirements are in particular used to ensure that for example an order of the production steps is observed for creating a product. This achieves the effect for example that the order of production is observed in a meaningful way. E.g. one production step is prevented from being destroyed by another just because the order of production has not been observed. Similarly, it is in particular also possible for a controller of a power supply system to be controlled by virtue of e.g. transformers or voltage couplers being switched on or connected to the power supply system in the correct order. If for example the execution of control instructions or control transactions requires no presupposed control instructions, the presupposed control instructions can be blank. By way of example, they can be filled with a zero, filled with a blank string or with a value indicating that no presupposed control instructions are needed. Alternatively, for example some of the control instructions can have no assigned execution requirement, in particular at least one of the control instructions having at least one assigned execution requirement. By way of example, the presupposed control instructions are control instructions that have been converted e.g. by a device and/or node into a prescribed mechanical movement and/or other physical variables (e.g. pressure or temperature), by means of a device or node, into the applicable mechanical movement and/or the applicable other physical variables, or are supposed to have been converted (e.g. for preparation of a workpiece) before the performance of the control instructions. The presupposed control instructions (provided that they were executed successfully) were then used for example to actuate the actuators of the devices and/or nodes such that a workpiece was put into the state or production state that e.g. a further processing is possible or is made possible after the execution of the presupposed control instructions. Accordingly, e.g. the applicable devices/nodes can then be actuated with the control instructions of the control transaction such that the further processing takes place (if e.g. the presupposed control instructions were executed and in particular confirmation transactions are available for them). The presupposed control instructions and the devices and/or nodes can, by way of example, also be used to adjust and/or control a control loop by virtue of for example the confirmation transactions for executed/presupposed control instructions being evaluated by the control system and applicable control instructions being produced in response to the confirmation transactions. The presupposed control instructions can, by way of example, also be control instructions that were used to actuate a cryptographic device and/or method (e.g. a user authentication). Alternatively or additionally, the presupposed control instructions can, by way of example, prescribe a capture of specific measured variables (e.g. by a sensor). By way of example, it is thus prescribed that applicable transactions with applicable measured values are supposed to observe prescribed measured value ranges or threshold values. The measured values can be for example a value of a measured variable (e.g. 30° C.) and/or date/time of the capture and/or location of the capture and/or sensor type and/or further information about the sensor (e.g. measurement accuracy).

In particular, "storage of transactions in data blocks" and the like is supposed to be understood to mean direct storage or indirect storage. Direct storage can be understood to mean for example that the applicable data block (of the distributed database system) or the applicable transaction (of the distributed database system) comprises the respective data. Indirect storage can be understood to mean for example that the applicable data block or the applicable transaction comprises a checksum and optionally an additional data record (e.g. a reference or indication to a memory location) for applicable data, and the applicable data are therefore not stored in the data block (or the transaction) directly (that is to say only a checksum for these data instead). In particular, the storage of transactions in data blocks can result in these checksums being validated, for example, as explained under "insertion into the distributed database system", for example.

Within the context of embodiments of the invention, a "program code" (e.g. a smart contract) can be understood to mean for example a program instruction or multiple program instructions, in particular stored in one or more transactions. The program code is in particular executable and is executed by the distributed database system, for example. This can be realized by means of an execution environment (e.g. a virtual machine), for example, the execution environment or the program code preferably being Turing complete. The program code is preferably executed by the infrastructure of the distributed database system [4] [5]. This involves for example a virtual machine being realized by the infrastructure of the distributed database system.

Within the context of embodiments of the invention, a "separate and/or direct communication channel" can be understood to mean for example a data transmission (e.g. a sending, a receiving, a transmitting, a providing or a conveying) by means of a communication channel as realized for example by the lightning network initially just for the transmission of cryptocurrency [9]. By way of example, this channel can be used to send transactions/messages more quickly and to store a confirmation of this data interchange in the distributed database system. This allows for example important and/or time-critical control instructions or control transactions to be transmitted to an applicable device at higher speed and, in the process, e.g. the slower data transmission of the distributed database system (e.g. when replicating the data blocks/transactions) to be avoided. By way of example, a separate and/or direct communication channel can be set up for embodiments of the invention and the cited aspects, exemplary embodiments, embodiments of the invention and their variants for a data transmission between a device (and/or node). By way of example, a direct communication channel results in the transactions/messages being interchanged between a sender (e.g. the (first) memory module and/or the (first) determining module) and a receiver (e.g. the device that is supposed to execute the control instructions) directly without further nodes and/or devices of the distributed database system being involved in this data interchange. By contrast, a separate communication channel can result in nodes and/or devices of the distributed database system being involved in the data interchange. If the separate and/or direct communication channel was set up between the sender and the receiver successfully (that is to say in particular a communication connection was established thereby), then data for example in the form of transactions or messages can be interchanged between the sender and the receiver. By way of example, the necessary data for ascertaining the executability and/or the control transactions can be interchanged between the sender and/or the receiver. If for example the communication channel is closed/terminated (that is to say in particular a communication connection is terminated), then, by way of example, a result of the data transmission e.g. in the form of transactions (e.g. as a transmission confirmation transaction) is stored in the distributed database system (e.g. in data blocks of the distributed database system). The result of the data transmission can be for example a confirmation of the transmission or reception of the applicable transactions/messages and/or an analysis result and/or the last transmitted transaction/message that was transmitted via the separate and/or direct communication channel before the communication channel was closed. The transaction can be stored with the result by the sender and/or receiver, for example. The analysis result can be the confirmation of the executability of the control instructions by a device, for example, wherein for example an applicable device has confirmed that it can execute the control instructions. This can, by way of example, in turn be stored in a transaction (e.g. in an executability confirmation transaction) and e.g. stored in the execution requirements (e.g. in the device-specific requirements). Alternatively or additionally, the executability confirmation transaction is stored in the distributed database system. The executability confirmation transaction comprises for example a unique identifier for the device that is capable of executing the control instructions or meets the applicable execution requirements. Alternatively or additionally, the executability confirmation transaction comprises for example data about the execution, e.g. how well or to what degree the execution requirements are met (e.g. how quickly the control instructions are performed, when they are reliably performed, how accurately or precisely the control instructions are executed—for example when executing production control instructions). Alternatively or additionally, the executability confirmation transaction comprises for example device-specific data of the applicable device that are relevant to the execution of the control instructions, e.g. the device-specific data having been ascertained by the applicable device at the time of confirmation of the executability by the device. E.g. the confirmation of the executability and the ascertainment of the device-specific data take place (approximately) at the same time—for example within a time window of a few seconds or minutes. By way of example, the data of the executability confirmation transaction may also have been interchanged between the sender and the receiver before the executability confirmation transaction is stored e.g. in the distributed database system. The executability confirmation transaction can, by way of example, also be cryptographically protected (e.g. it can be encrypted or can be protected by a transaction checksum). It is also possible, by way of example, for the control transactions to be transmitted in an analogous manner to the applicable device that is supposed or able to execute the control instructions. To this end, for example a further separate and/or direct communication channel can be set up between the sender and the receiver. Alternatively, the aforementioned communication channel can continue to be used, for example. The applicable communication channel is then used for example to transmit the applicable control transactions to the applicable device. If for example the communication channel is closed/terminated again when the transmission has been (successfully) completed, the result of the transmission is e.g. stored as a transmission confirmation transaction in the distributed database system. It is also possible, by way of example, for the message most recently interchanged via the communication channel to be stored in the transmission confirmation transaction (e.g. if the communication channel is interrupted) and for the transmission confirmation transaction e.g. then to be stored in the distributed database system. This most recently interchanged message can be used for example to continue the data interchange or the data transmission when the communication channel is set up again. The transmission confirmation transaction can, by way of example, also be cryptographically protected. The transmission confirmation transaction can, by way of example, comprise the control instructions and/or the control transaction and/or the last interchanged message between the sender and the receiver. A continuation of the data interchange or of the data transmission can, by way of example, also be used for other data transmissions and is not restricted specifically to the data transmission or the data interchange of control transactions.

The separate and/or direct communication channel is advantageous for improving a transmission speed and/or transmission latency. By way of example, a hybrid method is also possible, for example by virtue of an applicable communication channel being used for time-critical control instructions (e.g. having high priority). By way of example, the execution requirements (e.g. time-critical control instructions or control instructions for a realtime application) can be used to determine whether applicable control instructions that are supposed to be transmitted via an applicable separate communication channel are involved. Alternatively or additionally, the (first) determining module can determine applicable transmission requirements for a data transmission of the control transactions when determining the execution requirements, for example. The transmission requirements can, by way of example, be stored in the execution requirements. The transmission requirements can then, by way of example, be used by the memory module to ascertain whether the control transactions for a transmission to the applicable device are stored in the distributed database system or whether the separate and/or direct communication channel is used for a data transmission to the applicable device. The data transmission can then, by way of example, be performed by the (first) memory module, which, to this end, e.g. comprises an applicable communication module (e.g. a network interface).

Within the context of embodiments of the invention, a "smart contract" can be understood to mean for example an executable program code [4] [5] (see in particular the "program code" definition). The smart contract is preferably stored in a transaction of a distributed database system (e.g. a blockchain), for example in a data block of the distributed database system. By way of example, the smart contract can be executed in the same way as explained in the definition of "program code", in particular within the context of embodiments of the invention.

Within the context of embodiments of the invention, "smart contract process" can be understood to mean in particular an execution of a program code (e.g. of the control instructions or of a smart contract) in a process by the distributed database system or the infrastructure thereof.

Within the context of embodiments of the invention, "proof-of-work evidence" can be understood to mean for example solving a computationally intensive problem that, in particular, needs to be solved on the basis of the data block content/content of a specific transaction [1] [4] [5]. A computationally intensive problem of this kind is, by way of example, also referred to as a cryptographic puzzle.

Within the context of embodiments of the invention, a "distributed database system", which, by way of example, can also be referred to as a distributed database, can be understood to mean for example a locally distributed database, a blockchain, a distributed ledger, a distributed memory system, a distributed ledger technology (DLT) based system (DLTS), a revision-proof database system, a cloud, a cloud service, a blockchain in a cloud or a peer-to-peer database. It is also possible, by way of example, for different implementations of a blockchain or DLTS to be used, such as e.g. a blockchain or DLTS that is implemented by means of a directed acyclic graph (DAG), a cryptographic puzzle, a hash graph or a combination of the implementation variants [6][7]. It is also possible, by way of example, for different consensus methods (consensus algorithms) to be implemented. These can be for example a consensus method by means of a cryptographic puzzle, gossip about gossip, virtual voting or a combination of the methods (e.g. gossip about gossip in combination with virtual voting) [6] [7]. If a blockchain is used, for example, then it can be implemented in particular by means of a Bitcoin-based implementation or an Ethereum-based implementation [1] [4] [5]. A "distributed database system" can also be understood to mean for example a distributed database system that has at least some of its nodes and/or devices and/or infrastructure implemented by a cloud. By way of example, the applicable components are implemented as nodes/devices in the cloud (e.g. as virtual nodes in a virtual machine). This can be accomplished by means of VM-ware, Amazon Web Services or Microsoft Azure, for example. On account of the high flexibility of the implementation variants explained, it is, in particular, also possible for subaspects of the implementation variants to be combined with one another, e.g. by using a hash graph as a blockchain, the blockchain itself e.g. also being able to be blockless.

If for example a directed acyclic graph (DAG) is used (e.g. IOTA or Tangle), then in particular transactions or blocks or nodes of the graph are connected to one another via directed edges. This means in particular that (all) edges (always) have the same direction, similarly to in the case of e.g. time. In other words, it is in particular not possible to run or jump backwards (that is to say counter to the same common direction) through the transactions or the blocks or the nodes of the graph. Acyclic in this instance means in particular that there are no loops when running through the graph.

The distributed database system can be a public distributed database system (e.g. a public blockchain) or a closed (or private) distributed database system (e.g. a private blockchain), for example.

If it is a public distributed database system, for example, this means that new nodes and/or devices are able to join or be accepted by the distributed database system without proof of authorization or without authentication or without registration information or without credentials. In particular, the operators of the nodes and/or devices can remain anonymous in such a case.

If the distributed database system is a closed distributed database system, for example, then new nodes and/or devices require valid proof of authorization and/or valid authentication information and/or valid credentials and/or valid registration information, for example, in order to be able to join or be accepted by the distributed database system.

A distributed database system can also be a distributed communication system for data interchange or a peer-2-peer communication system or a peer-2-peer application, for example. This can be a network or a peer-2-peer network, for example.

A/the distributed database system can also be a local distributed database system and/or a local distributed communication system, for example.

Within the context of embodiments of the invention, "data block", which, in particular depending on context and implementation, can also be referred to as "link" or "block", can be understood to mean for example a data block of a distributed database system (e.g. a blockchain or a peer-to-peer database) that is, in particular, implemented as a data structure and preferably in each case comprises one of the transactions or several of the transactions. In one implementation, the database (or the database system) can be a DLT based system (DLTS) or a blockchain and a data block can be a block of the blockchain or of the DLTS, for example. A data block can comprise details pertaining to the size (data size in bytes) of the data block, a data block header (block header), a transaction counter and one or more transactions, for example [1]. The data block header can comprise a version, a concatenation checksum, a data block checksum, a timestamp, proof-of-work evidence and a nonce (one-time value, random value or counter used for the proof-of-work evidence), for example [1] [4] [5]. A data block can, by way of example, also be just a specific memory area or address area for the total data stored in the distributed database system. It is thus possible, by way of example, for blockless distributed database systems, such as e.g. the IoT chain (ITC), IOTA and Byteball, to be implemented. These involve in particular the functionalities of the blocks of a blockchain and of the transactions being combined with one another such that e.g. the transactions themselves protect the sequence or chain of transactions (of the distributed database system) (that is to say store them in security-protected fashion, in particular). To this end, for example a concatenation checksum can be used to concatenate the transactions themselves with one another by virtue of preferably a separate checksum or the transaction checksum of one or more transactions being used as concatenation checksum, which is stored in the applicable new transaction as well when a new transaction is stored in the distributed database system. In such an embodiment, a data block can also comprise one or more transactions, for example, one transaction corresponding to one data block in the simplest case, for example.

Within the context of embodiments of the invention, "nonce" can be understood to mean for example a cryptographic nonce (abbreviation for "used only once" [2] or "number used once" [3]). In particular, a nonce denotes individual combinations of numbers or a combination of letters that are preferably used just once in the respective context (e.g. transaction, data transmission).

Within the context of embodiments of the invention, "preceding data blocks of a (specific) data block of the distributed database system" can be understood to mean for example the data block of the distributed database system that in particular directly precedes a (specific) data block. Alternatively, "preceding data blocks of a (specific) data block of the distributed database system" can, in particular, also be understood to mean all data blocks of the distributed database system that precede the specific data block. As a result, the concatenation checksum or the transaction checksum can, in particular, be formed only from the data block (or the transactions thereof) directly preceding the specific data block or from all data blocks (or the transactions thereof) preceding the first data block, for example.

Within the context of embodiments of the invention, a "blockchain node", "node", "node of a distributed database system" and the like can be understood to mean for example devices (e.g. field devices), computers, smartphones, clients or subscribers that perform operations for (with) the distributed database system (e.g. a blockchain) [1] [4] [5]. Such nodes can, by way of example, execute transactions of a distributed database system or the data blocks thereof or insert or concatenate new data blocks with new transactions into the distributed database system by means of new data blocks. In particular, this validation and/or concatenation can be performed by a trusted node (e.g. a mining node) or solely by trusted nodes. A trusted node is, by way of example, a node that has additional security measures (e.g. firewalls, access restrictions to the node or the like) in order to prevent manipulation of the node. Alternatively or additionally, a trusted node can store a node checksum (e.g. a digital signature or a certificate) in a new data block when the new data block is concatenated with the distributed database system, for example. It is thus, in particular, possible to provide proof indicating that the applicable data block was inserted by a specific node or indicating its origin. The devices (e.g. the applicable device) are for example devices of a technical system and/or industrial installation and/or of an automation network and/or of a production installation that are in particular also a node of the distributed database system. The devices in this instance can be for example field devices or devices in the Internet of Things that are in particular also a node of the distributed database system. Nodes can, by way of example, also comprise at least one processor, e.g. in order to perform their computer-implemented functionality.

Within the context of embodiments of the invention, a "blockchain oracle" and the like can be understood to mean for example nodes, devices or computers that have a security module that comprises for example software protection mechanisms (e.g. cryptographic methods), mechanical protection devices (e.g. a lockable housing) or electrical protection devices (e.g. tamperproofing or a protection system that erases the data of the security module in the event of inadmissible use/handling of the blockchain oracle). The security module can comprise cryptographic keys, for example, which are necessary for calculating the checksums (e.g. transaction checksums or node checksums).

Within the context of embodiments of the invention, a "computer" can be understood to mean for example a computer (system), a client, a smartphone, a device or a server that are in each case arranged outside the blockchain or are not subscribers to the distributed database system (e.g. the blockchain) (that is to say do not perform operations with the distributed database system, or only query it, without, however, performing transactions, do not insert data blocks or calculate proof-of-work evidence). Alternatively, a computer can, in particular, also be understood to mean a node of the distributed database system. In other words, a device can, in particular, also be understood to mean a node of the distributed database system or else a device outside the blockchain or the distributed database system. A device outside the distributed database system can access the data (e.g. transactions or control transactions) of the distributed database system and/or be actuated by nodes (e.g. by means of smart contracts and/or blockchain oracles), for example. If for example actuation or control of a device (e.g. a device in the form of a node or a device outside the distributed database system) is performed by a node, this can be accomplished e.g. by means of a smart contract that is, in particular, stored in a transaction of the distributed database system. A device or node can comprise an actuator, for example. A device or node can also be a mechatronic device or system, for example, a mechatronic device/system being an actuator and/or a linear motion device, for example. A linear motion device is a device for carrying out translative movements, for example. An applicable device can also be a drive system, for example. A device or node can be a cryptographic device/node (e.g. for performing user authentication), for example.

Within the context of embodiments of the invention, "digital twin" can be understood to mean for example a digital image, in particular in the form of a data model or a data structure, of a real product, (technical) item or of a (physical) object. These are e.g. (electrical/electromechanical/electronic) devices, wind turbines, or large installations such as offshore platforms. In particular, the term digital twin is also explained in the following patent applications: WO2016/141998 or PCT/EP2016/064785. In particular, a digital twin can be updated on the basis of data from the item that is reproduced. These applicable data can be captured by sensors and can then update the digital twin, for example. This can be done in real time, periodically, under manual control or at prescribed times, for example. A primary digital twin can be understood to mean for example a very detailed digital image of an item that, in particular, comprises a large volume of data and, by way of example, comprises hundreds or thousands of data records. In particular, a digital twin can comprise a control module (e.g. control software) or control system (e.g. a monitoring system of the item, which monitoring system is reproduced by the digital twin), so that for example the digital twin can perform control actions (e.g. the primary digital twin can insert transactions with updated data into the blockchain or can independently check its data integrity on the basis of the blockchain). In particular, the primary digital twin or a selected (or secondary) digital twin comprising a selected portion of the data of the primary digital twin can be implemented e.g. by means of embodiments of the invention (e.g. the control system and/or the distributed database system and/or the first distributed database system). In this case, a digital twin (e.g. the primary digital twin and/or the secondary digital twin) is a control system according to embodiments of the invention and/or a distributed database system according to embodiments of the invention and/or a first distributed database system according to embodiments of the invention or a digital twin is e.g. in the form of one of these items according to the invention (or a combination thereof), for example.

Embodiments of the invention allows, in particular, a local infrastructure for executing control instructions to be implemented. In particular, this allows control of the devices in the Internet of Things to be performed locally, even if individual operators of devices and/or device groups of the devices do not trust one another. In particular, the devices can be in the form of nodes of the distributed database system, and it is possible, by way of example, to find for executing or performing the control instructions dynamically by means of the distributed database system or an applicable node or an applicable device that meets the demanded execution requirements for executing the control instructions. Giving illegal preference to a node (e.g. as a result of fraud/bribery) can be severely hampered if for example a blockchain-based implementation of the distributed database system is used, since protection of confidence or protection against manipulation analogously to Bitcoin is implemented for the control transactions or confirmation transactions. In particular, it is possible to dispense with a central entity performing authentication of the nodes. If, by way of example, the database system is realized by means of a blockchain that, in particular, implements a cryptographic currency such as Bitcoin, then a customer that has set the control instructions or that has provided an instruction sequence (from which e.g. the control instructions are derived) can be billed for an execution of the control instructions in a simple and efficient manner, for example.

Additionally, security when operating the distributed database system (e.g. a blockchain) can be increased, for example, since an additional check was introduced for the execution of the control instructions, in particular. In other words, in particular unchecked transactions or control instructions are converted into checked transactions, the check being performed on the basis of node or device properties of devices or nodes (e.g. the device-specific data) that are supposed to execute the control instructions, for example.

It is also conceivable, by way of example, for the method to be used to improve, or increase the security of, the payment of cash at automated teller machines if the automated teller machine is a node of the distributed database system or uses a node of the distributed database system or another interface to access or retrieve the applicable control transactions of the distributed database system, for example.

The cache module is advantageous in particular for speeding up the assignment of the execution requirements, for example by virtue of already calculated (or else assigned or determined) execution requirements from previously processed/executed control instructions being able to be reused. The entries in the cache module may, by way of example, be organized analogously to a conventional instruction cache, e.g. by virtue of known displacement algorithms being used. If the execution requirements are prescribed by a central policy, for example, the instruction cache can be used e.g. for repetitive control instructions to speed up the assignment of the applicable execution requirements.

The determining module can be implemented with different complexity, in particular. By way of example, the execution requirements can be prescribed by a central policy, or the execution requirements are determined by the determining module and then assigned to the control instructions. When the execution requirements have been e.g. prescribed, the determining module can be in a form such that in particular the respective control instructions are assigned the applicable execution requirements necessary for the execution thereof by the devices.

By way of example, the transactions can, depending on implementation, either be stored directly in the data blocks of the distributed database system or be stored directly in the distributed database system.

In a first embodiment of the control system, the presupposed control instructions are already executed control instructions for which a confirmation of the execution thereof is stored in confirmation transactions of the data blocks of the distributed database system. Alternatively, the presupposed control instructions are already executed control instructions for which a confirmation of the execution thereof is stored in confirmation transactions of the distributed database system.

The control system is advantageous for, in particular, prescribing an order for the execution or processing of the control instructions by the applicable device by means of the presupposed control instructions. In particular, the presupposed control instructions can be control instructions of the same instruction sequence that, in particular, need to be executed at a time before the control instructions that (currently) need to be executed by the applicable device. The presupposed control instructions in this instance were in particular likewise stored in control transactions that are in turn stored in data blocks (that is to say one data block or multiple data blocks) of the distributed database system.

In further embodiments of the control system, the execution requirements prescribe a performance of the presupposed control instructions before further control instructions are performed.

The control system is advantageous for, in particular, ensuring that the execution or performance of the control instructions by the applicable device results in a product being produced in steps, for example. This is, in particular, advantageous if it is supposed to be ensured that prescribed or selected control instructions or production steps are carried out by a prescribed or selected device.

In further embodiments of the control system, the execution requirements prescribe an order of a performance of the control instructions of a data block or of various data blocks. Alternatively, the execution requirements prescribe an order of a performance of the control instructions.

The control system is advantageous for, in particular, prescribing an order for the execution or performance of the control instructions by the applicable device by means of the presupposed control instructions. In particular, the presupposed control instructions can be control instructions of the same instruction sequence that, in particular, need to be executed before the control instructions that (currently) need to be executed by the applicable device. The presupposed control instructions in this instance are in particular likewise stored in control transactions that are in turn stored in data blocks (that is to say one data block or multiple data blocks) of the distributed database system.

In further embodiments of the control system, the execution requirements prescribe dependencies with respect to other control instructions of a data block or of various data blocks of a performance of the control instructions. Alternatively, the execution requirements prescribe dependencies with respect to other control instructions of a performance of the control instructions.

The control system is advantageous for, in particular, prescribing an order for the execution or performance of the control instructions by the applicable device by means of the presupposed control instructions. In particular, the presupposed control instructions can be control instructions of the same instruction sequence that, in particular, need to be executed before the control instructions that (currently) need to be executed by the applicable device. The presupposed control instructions in this instance were in particular likewise stored in control transactions that are in turn stored in data blocks (that is to say one data block or multiple data blocks) of the distributed database system.

In further embodiments of the control system, the execution requirements prescribe priorities for a performance of the control instructions.

The control system is advantageous for, in particular, giving preference to or prioritizing prescribed control instructions for the execution or performance of the control instructions by the applicable device. Preferably, this means in particular that the applicable control instructions are performed (e.g. by the devices or the distributed database system) faster or before other, nonpreferred control instructions. These control instructions to be given preference or these control instructions briefly given preference can be for example important/critical control instructions that need to be executed immediately, for example in order to prevent device damage, infrastructure damage or personal injury. If for example a monitoring device that is, in particular, likewise a node of the distributed database system discovers that the applicable device, e.g. a production device, is overheating or that a person is dangerously close to the device, then this monitoring device can for example set an applicable control transaction with control instructions and execution requirements (e.g. the execution requirements comprise the priority) to shut down the device in data blocks of the distributed database system. The distributed database system or the infrastructure thereof evaluates this control transaction and preferably conveys the control transaction to the device that is to be shut down.

In further embodiments of the control system, the execution requirements prescribe a time limit by which control instructions need to be performed.

The control system is advantageous for, in particular, using the execution requirements to prescribe for prescribed or selected control instructions a time limit by which the control instructions need to be performed by the applicable device. If this time limit is exceeded, for example, then, in particular, the checking module can provide a control signal in order to react to the exceeding of the time limit. The control signal can then be used to inform a production worker or a service engineer or to trigger an alarm signal in automated fashion, for example. It is also possible for the production process to be restarted, for example.

In further embodiments of the control system, the control system comprises an optimizer that optimizes an execution of the control instructions by the devices on the basis of a prescribed criterion.

The control system is advantageous for, in particular, optimizing a production process according to the prescribed criteria. The prescribed criteria can be the production time, the costs incurred or the energy needing to be used, for example. By way of example, the optimizer can break down an instruction sequence into control instructions that are in turn stored in the control transactions. This involves the optimizer breaking down the instruction sequence into the control instructions on the basis of the prescribed criterion. If for example the criterion is to optimize the production time for producing a product (e.g. production time for the product needs to be kept as short as possible), the instruction sequence is broken down such that the individual components are manufactured in parallel by multiple devices—that is to say the applicable control instructions in control transactions are performed by these. If for example the criterion is to optimize the production costs for producing a product, the instruction sequence is broken down such that the individual components are manufactured serially by one device (e.g. the applicable device) or as few devices as possible—that is to say the applicable control instructions in control transactions are performed by the applicable devices. To control this, the optimizer transfers the applicable information to the determining module, for example, so that the determining module stores this information in the execution requirements. The optimizer can be a separate module or an integral part of the determining module, for example. Alternatively, the optimizer can perform the optimization on the basis of the execution requirements or can even create the execution requirements itself and provide them to the determining module, for example.

In further embodiments of the control system, the distributed database system is a blockchain and the data blocks are blocks of the blockchain, or the distributed database system is a peer-2-peer database system.

The control system is advantageous for, in particular, realizing a local control system infrastructure. Moreover, it is, in particular, possible for such a control system to be realized even if the operators of the devices do not trust one another.

In further embodiments of the control system, the control instructions are executable by an applicable device if confirmation transactions for the presupposed control instructions of the respective execution requirements of the respective control transaction are available in the distributed database system.

In further embodiments of the control system, the data blocks are concatenated with one another via a cryptographic hash function (H).

In further embodiments of the control system, the control system or the determining module comprises an activity module, wherein the activity module is configured to display and/or document the activity of the control system and/or of the determining module.

The control system is advantageous for, in particular, making the activity checkable by an administrator during operation by means of a status lamp, a heartbeat signal or a control signal, for example. Alternatively, the activity module can, by way of example, write information to a file, for example in order to document system states or restarts of nodes or modules or of the determining module.

In further embodiments of the control system, the determining module determines the execution requirements and/or determines which of the control instructions is stored in control transactions, wherein which control instructions are stored in control transactions is determined on the basis of the execution requirements.

This is advantageous for, in particular, first discovering which of the control instructions are executable by the devices and e.g. creating control transactions with execution requirements only for these instructions.

In further embodiments of the control system, the prescribed number (of entries) for the cache module is stipulated on the basis of the data size of the control instructions and the associated execution requirements and also the available cache size.

In further embodiments of the control system, entries in the cache module are displaced using the LRU method, LFU method, FIFO method, LIFO method or clock method.

In further embodiments of the control system, the cache module uses an analysis of the previously executed control instructions to calculate which control instructions are supposed to be executed next, the analysis being effected by means of a neural network, for example.

This is advantageous for, in particular, speeding up determination for execution requirements, since e.g. the appropriate execution requirements for the predicted control instructions that are supposed to be executed next can be calculated or determined already.

In further embodiments of the control system, the determining module determines the execution requirements and/or determines which of the control instructions is stored in control transactions, wherein which control instructions are stored in control transactions is determined on the basis of the execution requirements. Storage is preferably effected if executability has been able to be confirmed or successfully ascertained on the basis of the execution requirements.

This is advantageous for, in particular, having the devices check and/or allowing the devices to check whether and when the presupposed control instructions of the respective execution requirements are performed or the execution requirements are met.

In further embodiments of the control system, the control instructions are executable by an applicable device if confirmation transactions for the presupposed control instructions of the respective execution requirements of the respective control transaction are available in the distributed database system. In other words, for example confirmation transactions are available for the presupposed control instructions of the applicable execution requirements by virtue of the distributed database system providing the confirmation transactions, for example (so that e.g. they can be retrieved by a/the device). By way of example, these confirmation transactions are stored in the distributed database system.

According to a further aspect, embodiments of the invention relates to a determining module (110) for a distributed database system or for a control system having a distributed database system for controlling and/or monitoring devices, having:
- a first interface (410) for receiving or retrieving control instructions;
- a first evaluation unit (420), wherein
   - the first evaluation unit (420) assigns execution requirements to the control instructions,
   - for example, an executability of the control instructions by nodes of a distributed database system or by devices is ascertained on the basis of the execution requirements,
   - the execution requirements comprise device-specific requirements and/or presupposed control instructions,
   - the first determining module comprises a cache module,
   - the cache module comprises a prescribed number of entries,
   - the entries store control instructions already executed by the devices with their associated execution requirements and/or store presupposed control instructions already executed by the devices.

The executability can be ascertained on the basis of the execution requirements that need to be met e.g. for an execution of the control instructions by applicable devices/nodes. To this end, the applicable execution requirements for the control instructions have been determined first, for example.

The determining module is advantageous for, in particular, improving the execution of control instructions by devices or nodes (e.g. production robots, control systems for a power distribution network, bank terminals, automated teller machines, money transfers between banks) that are connected to one another via a network.

Additionally, security during the operation of a distributed infrastructure (e.g. a distributed database system having devices and/or nodes or having devices that access the distributed database system) implemented wholly or in part by means of a distributed database system (e.g. a blockchain) can be increased, for example. In particular, the term "control instructions" should be understood broadly. In addition to the definition cited above, for example, it can also mean transactions that are supposed to be executed by a device (e.g. a node of a blockchain or a device outside the blockchain, e.g. device D). In other words, the apparatus converts in particular unchecked transactions into checked transactions, the check being performed on the basis of the device-specific requirements and device-specific data that are supposed to execute the control instructions, for example.

Embodiments of the invention can be used to ensure demanded device-specific requirements for the execution of the control instructions on the device, for example. The device-specific requirements can, by way of example, also be security requirements and/or location-related requirements (e.g. a country statement, a GPS statement or zip code (PLZ)) that a device is supposed to meet for executing the control instructions. As an alternative, specific/prescribed authentication can also be called for by the device-specific requirements for the execution, for example.

This can be the case for example if someone wishes to use a device (e.g. an automated teller machine) to withdraw cash. The control instructions are then, by way of example, the request by the customer to make a cash payment. If for example an applicable customer has specified (e.g. at his home bank or using online banking) that he e.g. permits a cash payment only in prescribed countries, e.g. Italy, France and Austria, then this is stored in the device-specific requirements (and hence in particular implicitly in the execution requirements as well). An automated teller machine in Andorra might then not permit a payment or prevent a payment. It is also possible, by way of example, for the security requirements to call for prescribed authentication of and/or a prescribed authentication method for the customer. This can involve for example a pin being entered or required for a payment (which is not necessarily the case e.g. in the USA) and/or a specific pin length being required (e.g. 8 characters) and/or other additional authentication methods being required (e.g. 2-factor authentication, mobile TAN, Google Authenticator).

Alternatively, the determining module, e.g. the evaluation unit, can also analyze the control instructions further and, if for example the determining module or the (first) evaluation unit already discovers that the device-specific requirements are not met or are not meetable (e.g. the control instructions were sent from an unapproved country or are intended for a device or node in an unapproved country), can create a control transaction that indicates this to the applicable device or the system and preferably prevents or prohibits an execution of the control instructions. Alternatively, it is, by way of example, also possible for no control transaction to be produced, and at some point there is a timeout for the execution of the control instructions, e.g. after a prescribed period. Alternatively or additionally, a control signal can be provided, for example, that e.g. informs an engineer or controls a warning signal in the event of control instructions being unexecutable.

It would, by way of example, also be conceivable for online banking to be protected in this manner by virtue of security requirements and/or location-related requirements of the computer (that is to say the device that sends control instructions) being checked for whether the payment is permitted by a(nother) device.

Additionally, the determining module can, by way of example, also comprise a first assigning module and/or a first memory module and/or further modules, as was explained in the exemplary embodiments. The nodes or devices can then comprise a checking module and/or an execution module, for example, as was explained in the exemplary embodiments or embodiments. It is also possible, in particular, for other features of the other aspects and exemplary embodiments of the invention to be transferred to this aspect of embodiments of the invention.

The device-specific requirements for nodes or devices can also be user-related or comprise user-specific requirements, for example. By way of example, a first user can call for low precision for producing a workpiece in his assigned device-specific requirements. By way of example, a second user can then call for higher precision for producing a workpiece in his assigned device-specific requirements. In this way, it is e.g. also possible for security requirements to be stored in user-related fashion. It is, by way of example, also conceivable for specific types or kinds of control instructions—user-related or otherwise—to have assigned device-specific requirements that are taken into consideration by the determining module. By way of example, one requirement can be that a control instruction for loading firmware is performed only by a device that meets prescribed security requirements, e.g. in order to ensure that expertise in the firmware is not readily accessible to anyone in a production installation. These prescribed security requirements can, by way of example, call for only specific personnel to have access to an applicable device or for the device to be protected by a password and/or other cryptographic mechanisms (e.g. access is possible only by inserting a chip card and entering a pin).

The cache module is advantageous in particular for speeding up the assignment of the execution requirements, for example by virtue of already calculated (or else assigned or determined) execution requirements from previously processed/executed control instructions being able to be reused. The entries in the cache module may, by way of example, be organized analogously to a conventional instruction cache, e.g. by virtue of known displacement algorithms being used. If the execution requirements are prescribed by a central policy, for example, the instruction cache can be used e.g. for repetitive control instructions to speed up the assignment of the applicable execution requirements.

The determining module can be implemented with different complexity, in particular. By way of example, the execution requirements can be prescribed by a central policy, or the execution requirements are determined by the determining module and then assigned to the control instructions. When the execution requirements have been prescribed, the determining module can be in a form such that the respective control instructions are assigned the applicable execution requirements necessary for the execution thereof by the devices.

In further embodiments of the determining module, the determining module comprises an optimizer, wherein the optimizer optimizes the execution of the control instructions by the devices on the basis of a prescribed criterion.

In further embodiments of the determining module, the determining module comprises a first breakdown module, wherein the first breakdown module is configured to break down an instruction sequence into the applicable control instructions. The applicable control instructions are provided to the control system or the first determining module, for example. Preferably, the applicable control instructions are provided to the control system via the determining module, so that e.g. the control system conveys the applicable control transactions with control instructions to the nodes or devices via the distributed database system.

In further embodiments of the determining module, the determining module comprises an activity module, wherein the activity module is configured to display or document the activity of the apparatus and/or of the determining module.

The determining module is advantageous for, in particular, making the activity checkable by an administrator during operation by means of a status lamp, a heartbeat signal or a control signal, for example. Alternatively, the activity module can, by way of example, write information to a file, for example in order to document system states or restarts of nodes or modules or of the determining module.

In further embodiments of the determining module, the determining module comprises a configuration memory that comprises device-specific data about the devices and/or device-specific data about the nodes and/or the device-specific requirements.

The determining module is advantageous for, in particular, quickly accessing the device-specific data and/or configuring the device-specific requirements for specific transactions or devices in advance. The configuration memory can be realized by blocks or data blocks of the distributed database system, for example. The device-specific requirements for nodes or devices can also be user-related, for example. By way of example, a first user can call for low precision for producing a workpiece in his assigned device-specific requirements. By way of example, a second user can then call for higher precision for producing a workpiece in his assigned device-specific requirements. In this way, it is also possible for security requirements to be stored in user-related fashion. It is, by way of example, also conceivable for specific types or kinds of control instructions—user-related or otherwise—to have assigned device-specific requirements that are taken into consideration by the determining module. By way of example, one requirement can be that a control instruction for loading firmware is performed only by a device that meets prescribed security requirements, e.g. in order to ensure that expertise in the firmware is not readily accessible to anyone in a production installation. These prescribed security requirements can, by way of example, call for only specific personnel to have access to an applicable device or for the device to be protected by a password and/or other cryptographic mechanisms (e.g. access is possible only by inserting a chip card and entering a pin).

In further embodiments of the determining module, the determining module comprises an administrative interface.

The determining module is advantageous for, in particular, allowing a configuration of the determining module. The administrative interface can be used to configure the device-specific requirements and preferably store them in the distributed database system, for example.

In further embodiments of the determining module, the control instructions are executable by an applicable device if confirmation transactions for the presupposed control instructions of the respective execution requirements of the respective control transaction are available in the distributed database system.

This is advantageous for, in particular, having the devices check and/or allowing the devices to check whether and when the presupposed control instructions of the respective execution requirements are performed or the execution requirements are met.

In further embodiments of the determining module, the determining module comprises a capture unit for capturing device-specific data about the devices or device-specific data about nodes.

The determining module is advantageous for, in particular, facilitating and speeding up a check on and creation of the device-specific data. Although the determining module could re-request these data from the devices or nodes for every single determination each time, it is, in particular, more appropriate for the capture unit to request these data at prescribed times or intervals, for example, and e.g. to store them in a configuration memory, or the nodes and devices do this independently, e.g. after being switched on, at prescribed times or intervals, by virtue of this information being conveyed to the capture unit. If the capture unit is implemented as a smart contract of the distributed database system, for example, this can also be done when connecting to the distributed database system, for example.

In further embodiments of the determining module, the determining module is a node of a distributed database system or a smart contract of a distributed database system or in the form of a device.

In further embodiments of the determining module, the determining module comprises a first assigning module for assigning the respective execution requirements to the control instructions.

In further embodiments of the determining module, the determining module comprises a first memory module for storing the respective control instructions with the assigned execution requirements in control transactions, wherein in particular the control transactions are stored in data blocks (B) of the distributed database system (BC) and/or in particular the control transactions are transmitted to the devices (D, BCN_D) or the nodes by means of the data blocks (B). This can involve in particular the control instructions together with the assigned execution requirements being stored in the control transactions if the control instructions are executable by a device or a node.

Alternatively, the determining module comprises a first memory module for storing the respective control instructions with the assigned execution requirements in control transactions, wherein in particular the control transactions are stored by the distributed database system (BC) and/or in particular the control transactions are transmitted to the devices (D, BCN_D) or the nodes by means of the distributed database system. This can involve in particular the control instructions together with the assigned execution requirements being stored in the control transactions if the control instructions are executable by a device or a node.

In further embodiments of the determining module, the first evaluation unit determines the execution requirements for the execution (e.g. of the control instructions or the executability of the control instructions) on the basis of the device-specific requirements and/or presupposed control instructions and device-specific data and/or already executed control instructions, wherein in particular the execution requirements are determined on the basis of a result of a comparison of the device-specific requirements and/or presupposed control instructions with device-specific data and/or already executed control instructions.

In further embodiments of the determining module, the first evaluation unit determines the execution requirements for the execution on the basis of an executability of the control instructions by a node of the distributed database system or a device, wherein in particular the execution requirements are determined on the basis of a result of a check on an executability of the control instructions by a node of the distributed database system or a device.

In further embodiments of the determining module, the first evaluation unit determines the execution requirements for the execution of the control instructions (that is to say the execution requirements necessary for the execution of the control instructions) on the basis of the device-specific requirements and/or presupposed control instructions and device-specific data and/or already executed control instructions and/or the applicable control instructions themselves and/or on the basis of an instruction sequence, wherein in particular, the execution requirements are determined on the basis of a result of a comparison of the device-specific requirements and/or presupposed control instructions with device-specific data and/or already executed control instructions, in particular, the instruction sequence comprises stipulations for an execution of the control instructions.

In further embodiments of the determining module, the first evaluation unit determines an executability of the control instructions on the basis of the execution requirements, wherein in particular, determining the executability involves the device-specific requirements and/or presupposed control instructions and/or device-specific data and/or already executed control instructions being taken into consideration, in particular, the execution requirements are determined on the basis of a result of a comparison of the device-specific requirements and/or presupposed control instructions with device-specific data and/or already executed control instructions.

According to a further aspect, embodiments of the invention relates to an apparatus for a distributed database system or for a control system having a distributed database system for controlling and/or monitoring devices, having:

a first determining module (110), wherein the distributed database system (BC) comprises a multiplicity of nodes (BCN, BCN_D), the nodes (300, BCN, BCN_D) and the devices (300, D, BCN_D) being connected to one another via a first communication network (NW1), the first determining module assigns execution requirements to control instructions, an executability of the control instructions by nodes of the distributed database system or by devices is ascertained on the basis of the execution requirements, the execution requirements comprise device-specific requirements and/or presupposed control instructions, the first determining module comprises a cache module, the cache module comprises a prescribed number of entries, the entries store control instructions already executed by the devices with their associated execution requirements and/or store presupposed control instructions already executed by the devices.

In further embodiments of the apparatus, the control instructions are executable by an applicable device if confirmation transactions for the presupposed control instructions of the respective execution requirements of the respective control transaction are available in the distributed database system.

This is advantageous for, in particular, having the devices check and/or allowing the devices to check whether and when the presupposed control instructions of the respective execution requirements are performed or the execution requirements are met.

According to a further aspect, embodiments of the invention relates to a method for the computer-aided assignment of execution requirements for control instructions, having the following method steps:

receiving (910) or retrieving control instructions;

assigning execution requirements to the control instructions, wherein an executability of the control instructions by nodes of a distributed database system or by devices is ascertained on the basis of the execution requirements, the execution requirements comprise device-specific requirements and/or presupposed control instructions, the distributed database system is a blockchain, for example, storing entries in a cache module, wherein the cache module can store a prescribed number of entries, the entries store control instructions already executed by the devices with their associated execution requirements and/or store presupposed control instructions already executed by the devices.

In further embodiments of the methods, the applicable methods comprise further method steps in order to implement the functional features or in order to implement further features of the distributed database system or the apparatus.

According to a further aspect, embodiments of the invention relates to a method for the computer-aided control of devices, having the following method steps:

assigning execution requirements to the control instructions, wherein
an executability of the control instructions by nodes of a distributed database system or by devices is ascertained on the basis of the execution requirements,
the execution requirements comprise device-specific requirements and/or presupposed control instructions, storing entries in a cache module, wherein
the cache module can store a prescribed number of entries,
the entries store control instructions already executed by the devices with their associated execution requirements and/or store presupposed control instructions already executed by the devices,
storing (530) the respective control instructions with the applicable execution requirements in control transactions, wherein the control transactions are stored in the distributed database system (e.g. the control transactions can be stored in data blocks of a/the block-based database system, or the control transactions are stored by the database system itself in the case of a/the blockless database system).

In further embodiments of the methods, the applicable methods comprise further method steps in order to implement the functional features or in order to implement further features of the control system or the determining module.

According to a further aspect, embodiments of the invention relates to a device having:

a first communication module for receiving control transactions, wherein the distributed database system provides the control transactions, wherein
for example, the control transactions comprise control instructions for the device,
for example, the control transactions comprise execution requirements,
for example, the execution requirements comprise device-specific requirements for the device and/or presupposed control instructions,
for example, the applicable execution requirements are assigned to the respective control transactions;
for example, a first checking module for checking the respective execution requirements for an execution of the control instructions of one of the control transactions by the device, wherein
for example, checking is performed to ascertain whether confirmation transactions for the presupposed control instructions of the respective execution requirements of the respective control transaction are available in the distributed database system;
for example, a first execution module for executing the control instructions by means of the applicable device on the basis of a result of the checking.

In a further embodiment of the device or devices, the device or devices comprise(s) at least one further module or multiple further modules in order to implement possible embodiments of a device that are disclosed in the embodiments of the control system. By way of example, the receiving of the control transactions is realized such that the distributed database system conveys the control transactions to the device (so that the device receives the control transactions) or the device calls or receives the applicable control transactions for example from a data interface of the distributed database system. This data interface can be configured for example such that devices that are not in the form of a node (e.g. blockchain-external devices) can retrieve or receive the control transactions or other transactions from the distributed database system. Alternatively or additionally, the data interface can be in a form such that devices or nodes of the distributed database system can receive or retrieve the control transactions or other transactions from the distributed database system.

According to a further aspect, embodiments of the invention relates to a method for the computer-aided control of a device, having the following method steps:

receiving control transactions, wherein a distributed database system provides the control transactions, wherein
for example, the control transactions comprise control instructions for the device,
for example, the control transactions comprise execution requirements,
for example, the execution requirements comprise device-specific requirements for the device and/or presupposed control instructions,
for example, the applicable execution requirements are assigned to the respective control transactions,
checking the respective execution requirements for an execution of the control instructions of one of the control transactions by the device, wherein
for example, checking is performed to ascertain whether confirmation transactions for the presupposed control instructions of the respective execution requirements of the respective control transaction are available in the distributed database system;
executing the control instructions by means of the applicable device on the basis of a result of the checking.

In further embodiments of the methods, the applicable methods comprise further method steps in order to implement the functional features or in order to implement further features of the device.

In addition, a computer program product (non-transitory computer readable storage medium having instructions, which when executed by a processor, perform actions) having program instructions for performing the aforementioned methods according to embodiments of the invention is claimed, wherein one of the methods according to embodiments of the invention, all of the methods according to embodiments of the invention or a combination of the methods according to embodiments of the invention is performable by means of the computer program product each time.

Additionally, a variant of the computer program product having program instructions for configuring a creating device, for example a 3D printer, a computer system or a manufacturing machine suitable for creating processors and/or devices, is claimed, wherein the creating device is configured using the program instructions such that the distributed database system according to embodiments of the invention and/or the control system and/or the device or the determining module is created.

Furthermore, a providing apparatus for storing and/or providing the computer program product is claimed. The providing apparatus is for example a data carrier that stores and/or provides the computer program product. Alternatively and/or additionally, the providing apparatus is for example a network service, a computer system, a server system, in particular a distributed computer system, a cloud-based computer system and/or virtual computer system that stores and/or provides the computer program product preferably in the form of a data stream.

This provision is effected, by way of example, as a download in the form of a program data block and/or instruction data block, preferably as a file, in particular as a download file, or as a data stream, in particular as a download data stream, of the complete computer program product. This provision can, by way of example, alternatively be effected as a partial download that consists of multiple parts and, in particular, is downloaded via a peer-to-peer network or provided as a data stream. Such a computer program product is read into a system by using the providing apparatus in the form of the data carrier, for example, and executes the program instructions, so that the method according to embodiments of the invention is carried out on a computer or configures the creating device such that it creates the distributed database system according to embodiments of the invention and/or the control system and/or the device.

BRIEF DESCRIPTION

Some of the embodiments will be described in detail, with reference to the following figures, wherein like designations denote like members, wherein.

DETAILED DESCRIPTION

The exemplary embodiments below, unless indicated otherwise or already indicated, have at least one processor and/or a memory unit in order to implement or carry out the method.

Moreover, in particular a (relevant) person skilled in the art, with knowledge of the method claim/method claims, is of course aware of all routine options for realizing products or options for implementation in the conventional art, and so there is no need in particular for independent disclosure in the description. In particular, these customary realization variants known to a person skilled in the art can be realized exclusively by hardware (components) or exclusively by software (components). Alternatively and/or additionally, a person skilled in the art, within the scope of his/her expert ability, can choose to the greatest possible extent arbitrary combinations according to embodiments of the invention of hardware (components) and software (components) in order to implement realization variants according to embodiments of the invention.

A combination according to embodiments of the invention of hardware (components) and software (components) can occur in particular if one portion of the effects according to embodiments of the invention is brought about preferably exclusively by special hardware (e.g. a processor in the form of an ASIC or FPGA) and/or another portion by the (processor- and/or memory-aided) software.

In particular, in view of the high number of different realization options, it is impossible and also not helpful or necessary for the understanding of embodiments of the invention to name all these realization options. In this respect, in particular all the exemplary embodiments below are intended to demonstrate merely by way of example a few ways in which in particular such realizations of the teaching according to embodiments of the invention could be manifested.

Consequently, in particular the features of the individual exemplary embodiments are not restricted to the respective exemplary embodiment, but rather relate in particular to embodiments of the invention in general. Accordingly, features of one exemplary embodiment can preferably also serve as features for another exemplary embodiment, in particular without this having to be explicitly stated in the respective exemplary embodiment.

Figure 1:
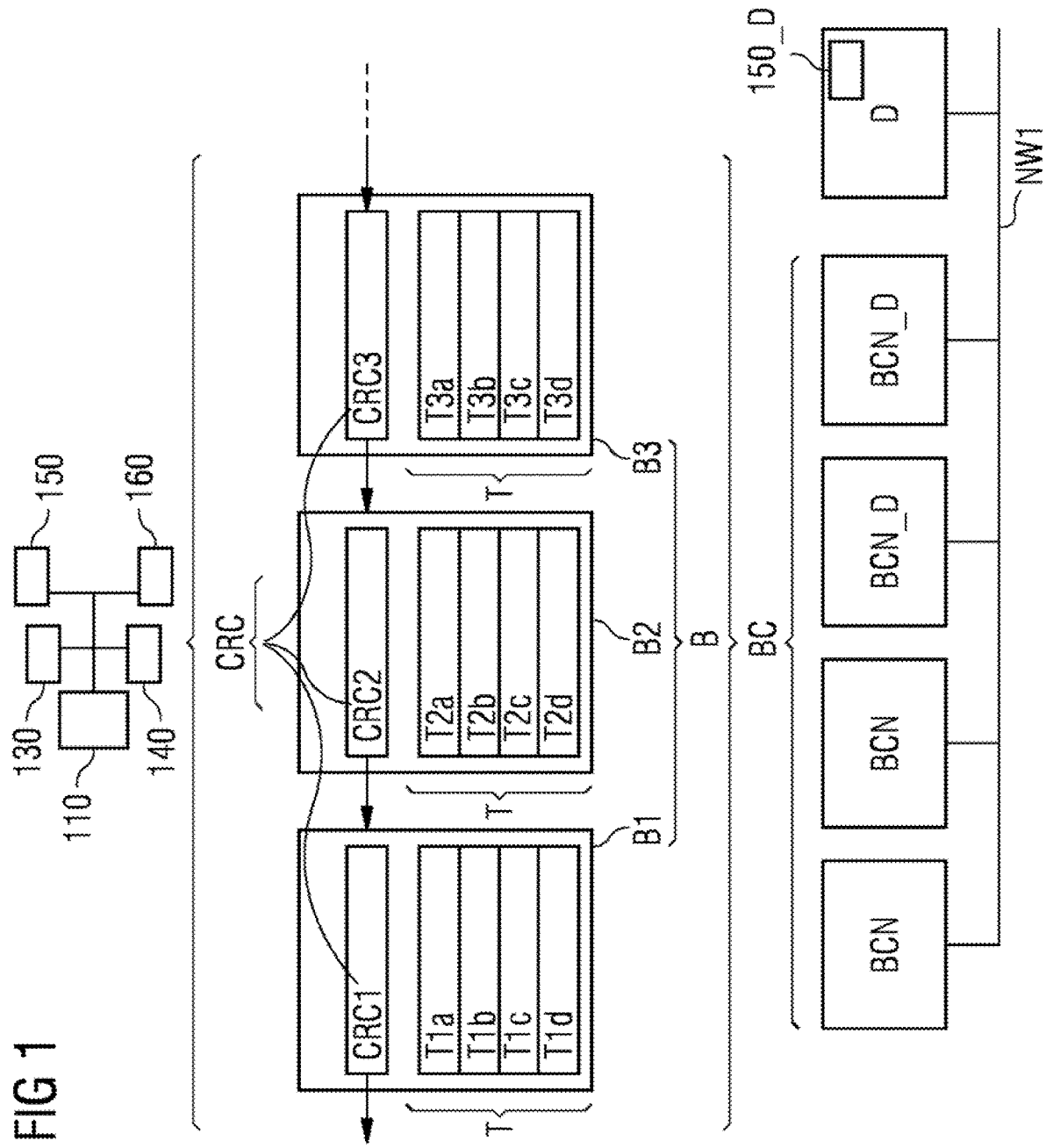
FIG. 1 shows a first exemplary embodiment of the invention.

FIG. 1 shows a first exemplary embodiment of the invention. In so doing, FIG. 1 shows a control system for controlling and/or monitoring devices, the distributed database system being realized by means of a blockchain BC, for example.

The exemplary embodiment of a control system for controlling and/or monitoring devices can, in one variant, comprise the following features:

a distributed database system (BC) having
- for example, a multiplicity of nodes (BCN, BCN_D), wherein the nodes (300, BCN, BCN_D) and the devices (300, D, BCN_D) are connected to one another via a first communication network (NW1);
- a first determining module (110), wherein
- for example, the first determining module assigns execution requirements to control instructions,
- for example, an executability of the control instructions by nodes of the distributed database system or by devices is ascertained on the basis of the execution requirements (it is thus, in particular, ascertained whether the applicable nodes or devices are capable of executing the control instructions e.g. by virtue of the applicable execution requirements for the control instructions being checked—e.g. whether the devices meet the execution requirements),
- for example, the execution requirements comprise device-specific requirements and/or presupposed control instructions,
- for example, the first determining module comprises a cache module,
- for example, the cache module comprises a prescribed number of entries,
- for example, the entries store control instructions already executed by the devices with their associated execution requirements and/or store presupposed control instructions already executed by the devices;
- for example, a first memory module (130) for storing the respective control instructions with the assigned execution requirements in control transactions, wherein
- for example, the control transactions are stored in data blocks (B) of the distributed database system (BC) or for example the control transactions are stored by means of the distributed database system (BC);
- for example, the control transactions are transmitted to the devices (D, BCN_D) by means of the data blocks (B) or for example the control transactions are transmitted to the devices (D, BCN_D) by means of the distributed database system (BC);
- for example, a first checking module for checking the respective execution requirements for the execution of the control instructions of one of the control transactions by an applicable device, wherein
for example, the device-specific requirements for the applicable device are checked; and/or
for example, checking is performed to ascertain whether confirmation transactions for the presupposed control instructions are available in data blocks of the distributed database system or whether confirmation transactions for the presupposed control instructions are available in the distributed database system;
for example, an execution module for executing the control instructions by means of the applicable device on the basis of a result of the checking;
for example, a second memory module for storing the result of the execution of the control instructions in confirmation transactions of the data blocks of the distributed database system.

Alternatively or additionally, e.g. the second memory module can be configured to store the result of the execution of the control instructions in confirmation transactions of the distributed database system.

In one variant, embodiments of the invention relates to a control system for controlling and/or monitoring devices, comprising:
for example, a distributed database system (BC) having
for example, a multiplicity of nodes (BCN, BCN_D), wherein the nodes (300, BCN, BCN_D) and the devices (300, D, BCN_D) are connected to one another via a first communication network (NW1);
for example, a first determining module (110), wherein
for example, the first determining module assigns execution requirements to control instructions,
for example, an executability of the control instructions by nodes of the distributed database system or by devices is ascertained on the basis of the execution requirements,
for example, the execution requirements comprise device-specific requirements and/or presupposed control instructions,
for example, the first determining module comprises a cache module,
for example, the cache module comprises a prescribed number of entries,
for example, the entries store control instructions already executed by the devices with their associated execution requirements and/or store presupposed control instructions already executed by the devices;
for example, a first memory module (130) for storing the respective control instructions with the assigned execution requirements in control transactions, wherein
for example, the control transactions are stored in the distributed database system (BC) (e.g. in the data blocks (B));
for example, the control transactions are transmitted to the devices (300, D, BCN_D) by means of the distributed database system (e.g. by means of the data blocks (B)).

In detail, FIG. 1 shows blocks B, for example a first block B1, a second block B2 and a third block B3, of the blockchain BC.

The blocks B each comprise multiple transactions T. The transactions T can comprise control transactions and/or confirmation transactions.

The first block B1 comprises a first transaction T1a, a second transaction T1b, a third transaction T1c and a fourth transaction T1d, for example.

The second block B2 comprises a fifth transaction T2a, a sixth transaction T2b, a seventh transaction T2c and an eighth transaction T2d, for example.

The third block B3 comprises a ninth transaction T3a, a tenth transaction T3b, an eleventh transaction T3c and a twelfth transaction T3d, for example.

The blocks B each additionally also comprise one of the concatenation checksums CRC formed on the basis of the direct predecessor block. The first block B1 therefore comprises a first concatenation checksum CRC1 from its predecessor block, the second block B2 comprises a second concatenation checksum CRC2 from the first block B1, and the third block B3 comprises a third concatenation checksum CRC3 from the second block B2.

The respective concatenation checksum CRC1, CRC2, CRC3 is preferably formed for the block header of the applicable predecessor block. The concatenation checksums CRC can preferably be formed by using a cryptographic hash function such as e.g. SHA-256, KECCAK-256 or SHA-3. By way of example, the concatenation checksum can additionally be calculated for the data block checksum, or the header comprises the data block checksum (the data block checksum is explained subsequently).

Additionally, each of the blocks can comprise a data block checksum. This can be realized by means of a hash tree, for example.

In order to form the hash tree, a transaction checksum (e.g. likewise a hash value) is calculated for each transaction of a data (block). Alternatively or additionally, a transaction checksum created by the originator of the transaction preferably when the transaction was generated can continue to be used therefor.

Usually, e.g. a Merkle tree or Patricia tree, the root hash value/root checksum of which is preferably stored in the respective blocks as applicable data block checksum, is used for a hash tree.

In one variant, the data block checksum is used as concatenation checksum.

A block can furthermore have a timestamp, a digital signature, proof-of-work evidence, as was explained in the embodiments of the invention.

The blockchain BC itself is realized by a blockchain infrastructure having multiple blockchain nodes BCN, BCN_D. The nodes can be for example computers, blockchain oracles, trusted nodes or one or more or all of the devices that are supposed to be controlled or monitored. In other words, it is, in particular, possible for the devices to be in the form of blockchain nodes, which are then referred to as device nodes BCN_D, for example. Devices that are not in the form of blockchain nodes, for example, and that effect only read access to the blockchain, for example, are, in particular, referred to as blockchain-external devices D. The nodes are communicatively connected to one another via a first network NW1 (e.g. a communication network such as the Internet or an Ethernet network). The blockchain infrastructure is used to replicate at least some of the data blocks B or all of the data blocks B of the blockchain BC for some or all nodes of the blockchain, for example.

In particular, devices can be understood to mean blockchain-external devices D or device nodes BCN_D.

The control system realized by means of the blockchain BC moreover comprises a first determining module 110, a first memory module 130, a first checking module 140, a first execution module 150 and a second memory module 160, which are communicatively connected to one another via the control system (e.g. a bus) or via the blockchain and the infrastructure thereof (e.g. the first network NW1). The first (communication) network NW1 can be a mobile radio network, an Ethernet network, a WAN, an LAN or the Internet. The first checking module 140, the first execution module 150 and/or the second memory module 160 can, in implementation variants, be optional modules.

The first determining module 110 is configured for assignment, wherein
  the first determining module assigns execution requirements to control instructions,
  for example, an executability of the control instructions by nodes of the distributed database system or by devices is ascertained on the basis of the execution requirements (e.g. for this purpose the execution requirements have been ascertained for the control instructions first),
  the execution requirements comprise device-specific requirements and/or presupposed control instructions,
  the first determining module comprises a cache module,
  the cache module comprises a prescribed number of entries,
  the entries store control instructions already executed by the devices with their associated execution requirements and/or store presupposed control instructions already executed by the devices.

The storage can take place (including in the preceding exemplary embodiments) if execution requirements were assigned or were determined for control instructions and the entries in the cache module contain no corresponding entry having the applicable control instructions with the assigned execution requirements. If an entry needs to be displaced, for example, this can involve displacement strategies being used, which are known from instruction caches of processors.

During assignment, the determining module first checks whether the applicable control instructions already have an entry for them with suitable execution requirements in the instruction cache. If this checking is successful, the execution requirements from the entry are used and are assigned to the applicable control instructions. If this check is not successful, the necessary execution requirements are calculated from a policy, for example, by virtue of a database with such a policy being queried, or the execution requirements are determined for the applicable control instructions, as explained below. The effect achieved thereby is in particular that no complex calculations or device queries need to be performed again in order to determine the execution requirements, or access to a slow database connection can be dispensed with.

Furthermore, in one variant of embodiments of the invention, the determining module can be configured to determine execution requirements for an execution of control instructions by the devices, wherein device-specific requirements and/or presupposed control instructions are stored in the execution requirements or comprises these. In a specific implementation, the execution requirements (alternatively simply called requirements) can be stored in requirement data records, for example, which are in turn then stored in the transactions (e.g. in control transactions). The first determining module itself can be realized as a software component (e.g. as a smart contract) or as a hardware component or as a combination of hardware and software components, for example.

To determine the execution requirements for the control instructions, the control instructions are analyzed, for example, in order to ascertain what technical pre-requisites/requirements (e.g. device-specific data/device properties) the devices/nodes are supposed to meet e.g. for an execution of the control instructions. Alternatively or additionally, it is possible to ascertain for an execution of the control instructions which (presupposed) control instructions need to be executed in order for the applicable control instructions (which are supposed to be stored in the control transaction) to be executed by a device.

In one variant, the determining module ascertains an executability of the control instructions by nodes of the distributed database system and/or by devices on the basis of the execution requirements.

The executability can, by way of example, be determined by virtue of checking being performed to ascertain whether the devices and/or nodes are capable of executing the applicable control instructions. This can be determined, by way of example, by comparing the device-specific requirements against the device-specific data in order to discover whether a device and/or which device is capable of implementing/executing the applicable control instructions. It is, by way of example, also possible for the check on the executability to involve further execution requirements such as e.g. the presupposed control instructions being checked.

This can be accomplished by first retrieving the applicable device information (or device-specific data or device properties) from the/a registration module or a device database and comparing it against the device-specific requirements. If a device or multiple devices meet/s the device-specific requirements, the executability of the control instructions has been (successfully) ascertained in respect of the device-specific requirements. In other words, the applicable control instructions are at least executable by one device or node.

In one variant, the control system, the determining module, the registration module or the device database can retrieve or additionally retrieve current device-specific data from an applicable device so as, by way of example, to take into consideration a current device state (e.g. error state of the device, device is in a maintenance mode, device is currently ready) of the device/node when ascertaining executability. By way of example, an applicable device is able, according to the device information of the registration module, to execute the control instructions. If this device information is obsolete (e.g. it was stored in the registration module when the device was installed), for example, then it may be that the current device state (e.g. device is in an error state) does not permit execution of the control instructions by one of the devices, for example. In such a case, the executability of the control instructions is not able to be ascertained successfully and executability of the control instructions is not confirmed. A device state is e.g. an "error state" (e.g. operating system crashed, tool faulty, a device component is faulty), a "maintenance state" (the device cannot execute control instructions because spare parts are being fitted, for example), "at capacity" (the device cannot currently perform control instructions because it is currently already performing control instructions, for example) or "ready" (the device is capable of performing the control instructions). The current device-specific data preferably comprise a current device state and/or information concerning when the device is capable of performing the control instructions and/or when the device is likely to have performed the control instructions and/or when the device is certain to have performed the control instructions. In particular information concerning when the device is certain to have performed the control instructions is relevant to real-time applications or in realtime scenarios. If for example current device-specific data were ascertained, these data are used to update the entries in the device database, for example.

In one variant, checking is first of all performed to ascertain when the device-specific data for an applicable device (or an applicable node) were updated in the device database, for example. If this occurred recently (e.g. within a prescribed period—for example 1 hour or 5 minutes), then it is possible to dispense with retrieving device-specific data again, for example, since the data of the device database are regarded as up to date. Accordingly, the entries in the device database with device-specific data comprise a timestamp indicating the last update, for example.

In one variant, the executability of the control instructions is ascertained or checked by checking whether e.g. there are applicable confirmation transactions present in the distributed database system or stored by the distributed database system, for example, for the applicable presupposed control instructions. In other words, the control instructions are executable by an applicable device, for example, if confirmation transactions for the (applicable) presupposed control instructions of the respective execution requirements of the respective control transaction are available in the distributed database system. For example if such confirmation transactions are stored in applicable data blocks.

In a further variant, it is also possible for the devices to be asked directly whether they are capable of executing the applicable control instructions, for example. This can be done e.g. by sending applicable query transactions or query messages to the applicable devices. If the devices confirm this e.g. by means of applicable messages and for example also confirm compliance with the execution requirements, the applicable execution requirements are determined or produced for the applicable control instructions.

This direct questioning can, if need be, involve a direct and/or separate communication channel being set up between the determining module (or another module that ascertains executability) and the applicable device. This communication channel is then used to interchange the applicable transactions or messages in order to discover whether a device is capable of and/or willing to execute the applicable control instructions. To this end, the execution requirements are conveyed to the applicable device via the communication channel, for example, so that the device can confirm the executability of the control instructions on the basis of these execution requirements for the control instructions (e.g. the device meets the device-specific requirements). An applicable confirmation of executability can then be returned to the determining module (or another module that ascertains executability) via the communication channel, for example. Alternatively or additionally, the communication channel can be used to interchange the applicable current device-specific data for a device (e.g. in order to ascertain the executability of the control instructions on the basis of the execution requirements for the device).

In a further variant, the execution requirements can e.g. also be checked in a two-stage process. By way of example, a first portion of the execution requirements is e.g. already checked when determining the execution requirements and/or when assigning the execution requirements and/or when ascertaining the executability of the control instructions. A second portion of the execution requirements is then checked by the device or the checking module, for example. By way of example, checking the first portion of the execution requirements involves checking whether the devices are technically capable (e.g. are currently technically capable) of executing the control instructions. By way of example, checking the second portion of the execution requirements involves checking whether e.g. the presupposed control instructions were already executed or whether the device currently meets the device-specific requirements (e.g. by checking whether the current device-specific data meet the device-specific requirements).

If, for example, just checking the first portion of the execution requirements results in it being discovered that this first portion of the execution requirements cannot be met by the devices/nodes, the execution requirements can be prevented from being assigned to the control instructions and/or the control transactions can be prevented from being stored, for example. In other words, the assigning and/or storing is performed on the basis of a result of the check on the executability (e.g. on the first portion of the execution requirements) of the control instructions by the devices and/or the nodes.

In a further variant, the determining module 110 comprises the assigning module 120 itself or the functionalities of the assigning module 120.

The execution requirements can be calculated by the determining module individually for applicable control instructions, for example, and then e.g. assigned thereto by an assigning module. Alternatively, the execution requirements can be prescribed e.g. by a policy (e.g. configured execution rules). These execution requirements are then assigned to the applicable control instructions by the determining module or the assigning module. This involves the determining module determining which of the execution requirements are relevant to the applicable control instructions. By way of example, the control instructions for milling drill holes are assigned applicable execution requirements (e.g. in the device-specific requirements) stipulating that the drill holes are supposed to be milled with a prescribed accuracy/precision and/or that specific temperatures are not supposed to be exceeded during the milling. These execution requirements can then be checked by the devices or checking modules of the devices to ascertain whether an applicable device meets the execution requirements. Alternatively or additionally, these execution requirements can be checked by the determining module when ascertaining the executability of the control instructions, checking being performed to ascertain whether at least one of the devices and/or nodes is capable of executing the applicable control instructions in accordance with the device properties of an applicable device. The device properties can be used to ascertain whether a device is technically capable of executing the control instructions, for example.

As a software component, the first determining module 110 can be realized as a smart contract, for example, which is executed by the blockchain or the infrastructure thereof. To this end, the smart contract is stored in transactions, for example, which are in turn stored in data blocks or blocks of the blockchain BC.

The execution requirements can be calculated by the determining module for example individually for applicable control instructions and then assigned to the latter e.g. by an assigning module. Alternatively, the execution requirements may e.g. be prescribed by a policy (e.g. configured execution rules). These execution requirements are then assigned to the applicable control instructions by the determining module or the assigning module. The determining module determines which of the execution requirements are relevant for the applicable control instructions. By way of example, control instructions for milling drill holes are assigned to execution requirements that the drill holes are supposed to be milled with a prescribed accuracy/precision and/or specific temperatures are not supposed to be exceeded during milling. These execution requirements can then be checked by the devices or checking modules to ascertain whether an applicable device meets the execution requirements.

As a hardware component, the first determining module 110 can be realized by a blockchain oracle and/or a node/device of the blockchain, for example, which are in particular trustworthy, for example, and use a digital certificate or digital signatures to sign the execution requirements.

Optionally, the control system can comprise a first breakdown module that is in the form of an integral module of the first determining module 110, for example, or is in the form of a separate module (e.g. in the form of a software and/or hardware component)—analogously to the first determining module (e.g. in the form of a smart contract of the blockchain). The first breakdown module is configured to break down an instruction sequence into the applicable control instructions and to provide them to the control system, in particular the first determining module or the first memory module.

The instruction sequence can comprise control instructions for a multiplicity of devices, e.g. production machines, so that these produce an item or a product, e.g. a gas turbine or an electric motor. Alternatively or additionally, the instruction sequence comprises a specification of the product, which specification is supposed to be implemented by the devices. The instruction sequence does not necessarily have to be directed to the production of a product. It can also be the control of a power supply system, for example. The instruction sequence itself can be a smart contract, for example, that was stored in the blockchain. This smart contract can then be evaluated by the control system (or the first breakdown module and/or the first determining module), for example, with the blockchain or the infrastructure thereof.

It is also possible for the instruction sequence to be encrypted, for example, so that the first determining module 110 or the first breakdown module first needs to decrypt the instruction sequence before the instruction sequence can be broken down.

Alternatively or additionally, the control instructions of the instruction sequence are encrypted and applicable requirements for the execution thereof are stored in the instruction sequence as plain text.

The instruction sequence itself and/or the control instructions can be provided to the control system by a user, by an interface, by another database or by an input device, for example.

Alternatively or additionally, the control instructions and/or the execution requirements are encrypted by the first determining module 110, for example in order to realize protection of expertise. By way of example, the applicable device D for executing the control instructions and/or the first checking module 140 and/or the first execution module 150, 150_D have applicable cryptographic means. By way of example, the cryptographic means are an applicable cryptographic key, in order to decrypt the control instructions and/or the execution requirements if need be. The applicable cryptographic means can then be used to produce cryptographic protection (e.g. encrypt) and/or to remove cryptographic protection (e.g. perform decryption), for example.

The first breakdown module and the first determining module first break down the instruction sequence into control instructions or determine the control instructions on the basis of the instruction sequence, the control instructions also being able to be a group of control instructions or multiple control instructions. The first determining module 110 preferably knows the available devices and/or nodes and determines execution requirements for the control instructions (which can also be a group of control instructions). Alternatively, the execution requirements can be already encoded/stored in the instruction sequence, and the first determining module 110 uses this information to determine the execution requirements for the applicable control instructions. The execution requirements are thus determined or calculated (as mentioned above) on the basis of the control instructions, for example.

Additionally, the control system can comprise an optimizer that uses the execution requirements to optimize an execution of the control instructions by the devices on the basis of a prescribed criterion. Alternatively, the optimizer determines the execution requirements and provides them to the first determining module 110.

The control system is therefore capable of optimizing a production process according to the prescribed criteria, for example. The prescribed criteria can be the production time, the costs incurred or the energy needing to be used, for example. The optimizer can be an integral module of the first breakdown module or the first determining module, for example. Alternatively, the optimizer can be in the form of a standalone module of the control system.

If the optimizer is an integral module of the breakdown module or of the determining module, for example, it can perform the optimization when the instruction sequence is broken down into control instructions and when the execution requirements are determined. This involves the first breakdown module or the first determining module 110 using the optimizer, for example when breaking down the instruction sequence into the control instructions, to take into consideration the prescribed criterion.

If for example the criterion is to optimize the production time for producing a product (e.g. to keep production time for the product as short as possible), the instruction sequence is broken down, and/or accordingly optimized execution requirements are calculated, such that the individual components of the product are manufactured in parallel by multiple devices—that is to say the applicable control instructions in control transactions are performed by these. If for example the criterion is to optimize the production costs for producing a product, the instruction sequence is broken down, and/or accordingly optimized execution requirements are calculated, such that the individual components are manufactured serially by one device (e.g. the applicable device) or as few devices as possible—that is to say the applicable control instructions in control transactions are performed by the applicable devices/nodes. To control this, the optimizer transfers the applicable information to the determining module, for example, so that the determining module stores this information in the execution requirements.

In one variant, the determining module is a determining module for a distributed database system or for a control system having a distributed database system for controlling and/or monitoring devices. In this variant, it has a processor and optionally a memory unit. The processor is configured to determine execution requirements for an execution of control instructions by the devices, wherein device-specific requirements and/or presupposed control instructions are stored in the execution requirements, and the execution requirements are stored in transactions of the distributed database system. Additionally, the determining module can comprise the variant embodiments and the cited features from FIGS. 4 and 5, for example.

If the determining module comprises an assigning module, for example, the assigning module is configured to assign the respective execution requirements to the control instructions, for example. The assigning module can be in the form of a software and/or hardware component, for example—analogously to the first determining module 110 (e.g. in the form of a smart contract of the blockchain or in the form of trusted nodes of the blockchain). The assigning module can, in particular, be realized by the blockchain or a smart contract or is a software component of the blockchain infrastructure.

If for example the execution of control instructions or control transactions requires no presupposed control instructions, the presupposed control instructions can be blank, in particular. By way of example, they can be filled with a zero, filled with a blank string or with a value indicating that no presupposed control instructions are needed. Alternatively, for example some of the control instructions can have no assigned execution requirement, in particular at least one of the control instructions having at least one assigned execution requirement.

The first memory module 130 is configured to store the respective control instructions with the assigned execution requirements in control transactions, the control transactions being stored in data blocks B of the distributed database system (BC), or the control transactions being stored by the distributed database system BC. The control transactions are transmitted to the devices D, BCN_D by means of the data blocks B, for example. This is accomplished for example by virtue of the applicable data blocks being transmitted to the applicable nodes by the blockchain via the first network NW1, e.g. if the data blocks are replicated for the blockchain and/or nodes and/or specific nodes. If for example a blockchain-external device is involved, then it can be transmitted to such a device via an interface (e.g. a web interface) of the blockchain, for example, or such a device itself retrieves the applicable data from the blockchain e.g. after a prescribed time interval.

In a further variant, based on the lightning network, for example, the execution requirements and the control instructions are initially stored in control transactions. The transmission of the control transactions to the devices and/or the nodes can, if need be, involve a direct and/or separate communication channel being set up between the memory module (or another module such as the determining module or the assigning module) and the applicable device. This communication channel is then used to interchange the applicable transactions or messages so that the applicable node/the applicable device receives the necessary data for executing the control instructions. A confirmation (e.g. in the form of a confirmation transaction) for an execution of the control instructions by the applicable device (e.g. after the applicable execution requirements were checked by the device) can then be stored in the distributed database system, for example. If for example the control transactions are conveyed to the applicable device via the communication channel, then a confirmation of the transmission of the control transactions to the applicable device can be stored in a transaction (e.g. a transmission confirmation transaction) when the communication channel is closed, for example. This transmission confirmation transaction is then preferably stored in the distributed database system (e.g. in data blocks of the distributed database system). This is advantageous, in particular, for transmitting the control transactions to the applicable device as quickly as possible. This transmission can, by way of example, also take place if a communication channel is set up with the applicable device in order to check the executability of the control instructions.

A memory module of this implementation variant can be in the following form, for example:

The first memory module 130 can be configured to store the respective control instructions with the assigned execution requirements in control transactions, wherein the control transactions are transmitted to the applicable device by means of a separate and/or direct communication channel. The communication channel can be part of the distributed database system or can be realized independently thereof. Preferably, the transmission is effected if the executability of the control instructions would be able to be confirmed for/by the applicable device by means of the execution requirements. This involves, by way of example, checking whether the device meets the applicable execution requirements (e.g. the first portion of the execution requirements) for the control instructions (as described by this exemplary embodiment or its variants).

Preferably, determining the control instructions by means of the first determining module 110 involves the control instructions being determined in device-specific fashion. This means in particular that initially groups of control instructions are formed that can be performed completely by an applicable device. These groups of control instructions can also simply be called control instructions. These groups of control instructions, or control instructions, then have the execution prerequisites calculated for them—as was explained above. Storage then involves an applicable group of control instructions, or the applicable control instructions, being stored together with the associated/applicable execution prerequisites in a control transaction. Accordingly, the control transactions preferably comprise device-specific control instructions.

Figure 4:
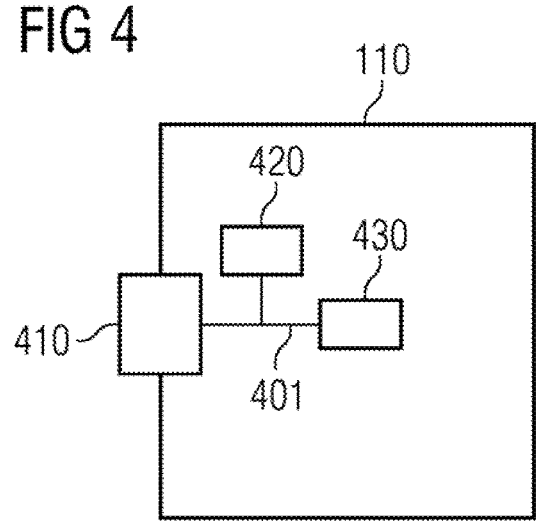
FIG. 4 shows a further exemplary embodiment of the invention.

The determining module can, by way of example, also be a determining module according to embodiments of the invention or one of the embodiments of the determining module, or a determining module as explained in FIGS. 4 and/or 5.

Storage can be performed in different ways. By way of example, a control instruction or multiple control instructions can be stored in a specific control transaction, this specific control transaction comprising the applicable execution requirements for the control instruction or the multiple control instructions. This integral approach is advantageous for accessing the data as easily as possible.

Alternatively, the applicable execution requirements can be stored in an individual or separate control transaction, the individual transaction comprising a reference or pointer concerning the control instruction or control instructions to which these applicable execution requirements relate. This is accomplished for example with a block number (of a block) with the applicable (control) transactions (with control instructions), a checksum of the block or transaction that comprises the control instructions. This is advantageous if the execution requirements are first determined during the performance of the control instructions by the applicable devices. A device (or the first checking module 140, or the first execution module 150), e.g. the applicable device performing the control instructions or some of the control instructions of a control transaction, begins performing the applicable control instructions only when the applicable execution requirements are available in a control transaction in the blockchain. Otherwise, the device, or the first checking module 140, or the first execution module 150, waits until this control transaction with the applicable execution requirements are provided by the blockchain BC.

In a further variant, the control transactions are created, or the control instructions and the execution requirements are stored in control transactions, if the execution requirements were able to be determined successfully for the control instructions and/or an executability of the control instructions was successfully determined (that is to say the control instructions can be executed by the devices).

The first memory module 130 can be in the form of a software and/or hardware component, for example—analogously to the first determining module 110 (e.g. in the form of a smart contract of the blockchain or in the form of trusted nodes of the blockchain). The first memory module 130 can, in particular, be realized by the blockchain or a smart contract or is a software component of the blockchain infrastructure.

In a further variant, the first memory module 130 comprises the assigning module 120 itself or the functionalities of the assigning module 120.

The first checking module 140 is configured to check the respective execution requirements when executing the control instructions of one of the control transactions by means of an applicable device, wherein the device-specific requirements of the respective execution requirements of the respective control transaction for the applicable device are checked; and/or checking is performed to ascertain whether confirmation transactions for the presupposed control instructions of the respective execution requirements of the respective control transaction are available in data blocks of the distributed database system, and/or checking is performed to ascertain whether confirmation transactions for the presupposed control instructions of the respective execution requirements of the respective control transaction are available/stored in the distributed database system.

The checking to ascertain whether confirmation transactions for the presupposed control instructions of the respective execution requirements of the respective control transaction are available in the distributed database system can be realized as follows. By way of example, checking is performed to ascertain whether applicable or associated confirmation transactions, in particular confirming a successful execution of the presupposed control instructions, are stored for the presupposed control instructions in the distributed database system. Additionally, further data of the confirmation transactions can also be checked, e.g. the quality with which the presupposed control instructions were executed (e.g. how great are the differences that occurred during a milling of a workpiece, how long did the execution of the presupposed control instructions take). In order to facilitate this check, it is possible, by way of example, for the presupposed control instructions to comprise details about the memory location for confirmation transactions of the presupposed control instructions or about the device (e.g. a UID of the device) that is supposed to execute the control instructions (e.g. the device-specific requirements and/or the presupposed control instructions and/or the execution requirements). A memory location is intended to be understood to mean for example a memory address, a communication interface, a link/reference/alias that can be used to address the confirmation transactions or a block number or block address of a blockchain with applicable confirmation transactions. By way of example, an applicable block of a blockchain, or a data block of the distributed database system, can comprise such a link/reference/alias. Such a link addresses an address in a data memory or memory module, for example. The memory content of the address is first initialized, e.g. to 0, and is filled with the confirmation transaction itself or with a number or address of the applicable confirmation transaction or of a data block comprising the applicable confirmation transaction e.g. as soon as the confirmation transaction is available.

In particular, "one of the control instructions" means one or more of the control instructions (i.e. it is e.g. one or more control instructions). Alternatively, "with one of the control instructions" is intended to be understood to mean "at least one of the control instructions". "One of the control instructions" is preferably the control instructions of an applicable control transaction.

In one variant, the checking module checks a unique identifier (e.g. a UID) that indicates, in a control transaction, which device is supposed to execute the control instructions. As a result, it is then possible to discover whether the applicable control transaction can be executed by the device or node. The result of this check is recorded in the check result. A unique identifier of this kind can be stipulated or ascertained by the determining module, for example. To this end, the determining module can have a directory of all identifiers of the devices/nodes, for example. For an execution of the control instructions by means of the applicable control transactions, the applicable unique identifiers for the devices or the nodes that are supposed to execute the control instructions are stored in the execution requirements and/or the control transactions and/or control instructions (e.g. by the determining module itself or the first memory module).

This is advantageous for allowing the devices/nodes to quickly discover, for example, whether the applicable control instructions e.g. can be executed by a specific device. The devices or nodes have an assigned unique identifier (UID), for example. The control system or the determining module knows in particular the applicable unique identifiers of the devices (e.g. stored in the configuration memory with the data pertaining to devices/nodes) and, when determining the control instructions, assigns the applicable unique identifiers to the control instructions either itself and/or by means of the execution requirements and/or by means of the control transactions. The allocated or assigned unique identifiers are in particular the applicable unique identifiers of the devices or of the nodes that are supposed to execute the control instructions.

The first checking module 140 can be in the form of a software and/or hardware component, for example—analogously to the first determining module 110 (e.g. in the form of a smart contract of the blockchain or in the form of trusted nodes of the blockchain). The first checking module 140 can, in particular, be realized by the blockchain or a smart contract or is a software component of the blockchain infrastructure or is a component of a node or of a device that can execute the control instructions.

When the check on the control instructions of a data block and/or of a/the control transaction (and/or of the accordingly associated execution requirements and/or presupposed control instructions) that are supposed to be executed by the applicable device has been completed by the first checking module 140, a result of the check is provided in a data record. The first checking module 140 can also perform additional checks, for example. By way of example, the transaction checksum or the data block checksum can be checked. If an applicable checksum is a digital signature or a certificate, then it is possible, by way of example, to check whether the issuer or checksum generator is actually authorized for its control instructions to be performed on the device or by the device.

By way of example, it is also possible to check whether the applicable device has a required digital certificate stating, by way of example, that the applicable device is trusted.

This can be necessary, for example, if control instructions comprising expertise that is not supposed to be made accessible to the public are involved.

It is, by way of example, also conceivable for the control instructions to be cryptographically encrypted and for preferably only the applicable device D to comprise means (e.g. an applicable key) for reversing this cryptographic encryption. These means can be included by the applicable device D itself, or the execution module 150, 150_D comprises these means.

The execution module 150, 150_D is configured to execute the control instructions by means of the applicable device on the basis of the result of the checking. If the check reveals or if the result comprises a confirmation for the execution of the control instructions, the applicable device executes these control instructions. By way of example, it can drill a hole in a component in accordance with the specifications of the control instructions that were originally specified in the instruction sequence. If the check reveals or the result comprises no confirmation for the execution of the control instructions, then a performance/execution of the control instructions is prevented.

If for example the result states that the control instructions are not supposed to be executed by the applicable device, a control signal can be provided, for example. The control signal can be used to annul for example an alarm, a service engineer or the control instructions (preferably all of them) that were produced on the basis of an instruction sequence, so that other control instructions of the instruction sequence are no longer executed by other devices. This can involve for example an applicable control transaction being stored with such a control instruction for all devices in a block of the blockchain BC and being conveyed to the devices by means of the blockchain BC. Such a control transaction preferably likewise comprises execution requirements comprising a priority. This priority is preferably higher than a priority of the other control instructions. This increased priority results in the applicable control instruction being performed preferentially by the devices in order to invalidate (annul) or prevent the execution of the remainder of the control instructions of the instruction sequence, for example.

If the first checking module 140 is a module of the blockchain BC, for example, then the first checking module 140 comprises a list of the devices with their device-specific properties, for example, which can be used to check the device-specific requirements. Alternatively, the first checking module 140 can comprise a list of the devices and their network addresses, and can request the applicable device-specific properties from the devices itself. This is advantageous for taking into consideration the current operating state of the devices for the check.

The first execution module 150, 150_D can be in the form of a software and/or hardware component, for example—analogously to the first determining module 110 (e.g. in the form of a smart contract of the blockchain or in the form of trusted nodes of the blockchain). The execution module can, in particular, be realized by the blockchain or a smart contract or is a software component of the blockchain infrastructure or is a component of a node (e.g. a blockchain execution module 150) or of a device (e.g. a device execution module 150_D) that can execute the control instructions.

If the first execution module is a module of the blockchain, for example, then the first execution module 150 comprises a list of the devices and the network addresses thereof, for example, in order to actuate the devices for the performance of the control instructions.

The second (optional) memory module 160 is configured to store the result of the execution of the control instructions in confirmation transactions of the data blocks of the distributed database system. Alternatively, e.g. the confirmation transactions are stored in the distributed database system (e.g. in the case of blockless implementations).

If the performance of the control instructions by the applicable device was successful, then this information is stored in a confirmation transaction in the blockchain. If there are for example other control instructions that presuppose a performance of the now performed control instructions (presupposed control instructions), these other control instructions can now be performed by another applicable device or the same applicable device, provided that the remainder of the execution requirements are also met.

The second memory module 160 can be in the form of a software and/or hardware component, for example—analogously to the first determining module 110 (e.g. in the form of a smart contract of the blockchain or in the form of trusted nodes of the blockchain). The second memory module 160 can, in particular, be realized by the blockchain or a smart contract or is a software component of the blockchain infrastructure or is a component of a node that can execute the control instructions.

The control system and/or the distributed database system or its nodes (e.g. blockchain nodes, devices (device nodes and blockchain-external devices)) can, by way of example, additionally also comprise a further or multiple further component/s, such as for example a processor, a memory unit, further communication interfaces (e.g. Ethernet, WLAN), an input device, in particular a computer keyboard or a computer mouse, and a display device (e.g. a monitor). The processor can comprise multiple further processors, for example, that can be used to realize further exemplary embodiments, in particular. The further component/s can likewise be communicatively connected to one another by the blockchain or the infrastructure thereof, for example.

The processor can be an ASIC, for example, that was realized on an application-specific basis for the functions of a respective module or of all modules of the exemplary embodiment (and/or of further exemplary embodiments), the program component or the program instructions being realized as integrated circuits, in particular. The processor can also be an FPGA, for example, that, in particular, is configured by means of the program instructions such that the FPGA performs the functions of a respective module or of all modules of the exemplary embodiment (and/or of further exemplary embodiments).

Depending on the chosen implementation variant, the distributed database system can comprise the first checking module and/or the first execution module and/or the second memory module. Accordingly, these modules can also be referred to as optional modules, or can also be optional modules, depending on the implementation.

In this implementation variant, the devices are kept simple—e.g. without such corresponding modules. This is advantageous to make the devices as simple as possible and interface them with the distributed database system. This allows inexpensive devices to be used, in particular.

In a further implementation variant, the devices comprise a first device checking module and/or a first device execution module and/or a second device memory module. Depending on the chosen implementation, the first checking module and/or the first execution module and/or a second memory module, when their functionalities/tasks are realized/performed, can access the corresponding modules of the devices.

In other words, the control system or the distributed database system knows the applicable device modules (e.g. by means of data stored in a table). The first checking module 140 and/or the first execution module 150 and/or the second memory module 160 have information concerning how the device modules 150_D can be addressed or actuated (e.g. via a module-internal table that preferably automatically updates itself, for example via broadcast messages in the first communication network NW1 or via the distributed database system BC). The first checking module and/or the first execution module and/or the second memory module preferably implement only the portion that distributes or conveys the necessary information or tasks to the applicable device or the applicable devices (e.g. the control transactions or the confirmation transactions or the result of the checking by the checking module). The remainder of the functionality is realized by the device modules.

This is advantageous for relocating all or some more computation-intensive checking tasks by the first checking module or execution tasks by the first execution module to the applicable devices.

The control system can also comprise an optional registration module.

The registration module can be in the form of a software and/or hardware component, for example—analogously to the first determining module 110 (e.g. in the form of a smart contract of the blockchain or in the form of trusted nodes of the blockchain). The registration module can, in particular, be realized by the blockchain or a smart contract or is a software component of the blockchain infrastructure. Alternatively, the registration module can be realized as a specific trusted node, the network address of which is known publicly, for example. If a closed distributed database system in which only authorized nodes and/or devices are interfaced with the control system or with the distributed database system is involved, for example, then, in particular, solely the network address of the registration module is known publicly.

The registration module is configured to add new nodes and/or devices to the control system. As soon as a new device and/or node wishes to join the control system or the distributed database system, the new device or the new node sends a query to the registration module. This can be done directly, for example by virtue of node and/or device information being conveyed directly to the registration module. If this is done indirectly, the query is forwarded between the nodes and modules of the distributed database system until the query reaches the registration module.

The node and/or device information can comprise the following:
  device address/node address
  operator of the device/node
  scope of functions of the device/node
  cryptographic keys (e.g. for checking checksums/digital signatures produced by the device/node)
  further properties needed for checking the execution requirements.

The node and/or device information can then be stored in the control system (e.g. in applicable tables of the control system, in the distributed database system itself, or in a device database, wherein e.g. the control system and/or the distributed database system comprises this device database), for example, so that the checking and/or execution of the control instructions or control transactions can be performed by the applicable modules.

If the database system is a closed distributed database system, for example, the registration module also checks whether the device/node has access authorization—that is to say whether in particular the device/node is accepted as part of the control system or of the distributed database system. For this, the device/node provides authentication information (cryptographic keys, passwords, etc.), for example, that is checked by the registration module.

If the database system is an open distributed database system, for example, then the node and/or device information is captured, for example.

Depending on the implementation variant, the checking module 140 and/or the execution module 150 and/or the second memory module 160 are optional modules.

In particular, the control system can also be used to realize a digital twin (e.g. in the form of a blockchain), for example, or the control system is a digital twin.

The digital twin is realized (or calculated or produced) for a control unit or a product to be produced, for example.

Otherwise, storing transactions in data blocks is one of multiple variants for storing the transactions. By way of example, implementations are known that are realized e.g. as blockless distributed databases (or database systems). Accordingly, it is also possible to store the applicable transactions directly in the distributed database system. Accordingly or in an analogous manner, conveyance of transactions to nodes or devices can be performed even without data blocks. Accordingly or in an analogous manner, access, loading or provision of transactions (or similar operations) of the distributed database system can be performed even without using data blocks.

In a further variant, the control system comprises the following features:
  for example, a first determining module for determining execution requirements for an execution of control instructions by the devices, wherein
    for example, device-specific requirements and/or presupposed control instructions are stored in the execution requirements;
  for example, a distributed database system having
    for example, a multiplicity of nodes, wherein the nodes and the devices are connected to one another via a first communication network;
  for example, a first assigning module for assigning the respective execution requirements to the control instructions;
  for example, a first memory module for storing the respective control instructions with the assigned execution requirements in control transactions, wherein
    for example, the control transactions are stored in data blocks of the distributed database system;
    for example, the control transactions are conveyed to the devices by means of the data blocks;
  for example, a first checking module for checking the respective execution requirements for the execution of the control instructions of one of the control transactions by an applicable device, wherein
    for example, the device-specific requirements for the applicable device are checked; and/or
    for example, checking is performed to ascertain whether confirmation transactions for the presupposed control instructions are available in data blocks of the distributed database system;
  for example, an execution module for executing the control instructions by means of the applicable device on the basis of a result of the checking.

In a further variant, the control system comprises the following features:

for example, a first determining module (110), wherein
for example, the first determining module is configured to determine execution requirements for an execution of control instructions by the devices,
for example, the execution requirements are ascertained on the basis of the control instructions,
for example, device-specific requirements and/or presupposed control instructions are stored in the execution requirements,
for example, the first determining module is configured to determine transmission requirements for a transmission of the control instructions (e.g. by means of control transactions),
for example, the transmission requirements are ascertained on the basis of the control instructions;
for example, a distributed database system (BC) having a multiplicity of nodes (BCN, BCN_D), wherein the nodes (300, BCN, BCN_D) and the devices (300, D, BCN_D) are connected to one another via a first communication network (NW1);
for example, a first assigning module (120) for assigning the respective execution requirements to the control instructions;
for example, a first memory module (130),
for example, the first memory module is configured to store the respective control instructions with the (assigned) execution requirements in control transactions or for example the first memory module is configured to store the respective control instructions in control transactions,
for example, the first memory module uses the transmission requirements to select a transmission method or a combination of transmission methods for a data transmission of the control transactions to the devices,
for example, a first selected transmission method (e.g. for non-time-critical control instructions/control transactions) stores the control transactions in the distributed database system (BC),
for example, the first selected transmission method transmits the control transactions to the devices (300, D, BCN_D) by means of the distributed database system;
for example, a second selected transmission method (e.g. for time-critical control instructions or control transactions) transmits the control transactions to the devices (300, D, BCN_D) by means of separate and/or direct communication channels;
for example, a first checking module for checking the respective execution requirements for an execution of the control instructions of one of the control transactions by the device, wherein
for example, checking is performed to ascertain whether confirmation transactions for the presupposed control instructions of the respective execution requirements (e.g. of the second portion of the execution requirements or of the presupposed control instructions) of the respective control transaction are available in the distributed database system;
for example, a first execution module for executing the control instructions by means of the applicable device on the basis of a result of the checking.

This variant allows the memory module, which e.g. comprises a communication module, to select the transmission method that is required for compliance with the execution requirements and/or transmission requirements. This is advantageous for realtime applications, in particular, if for example the second transmission method can be used to transmit the transactions/messages such that realtime requirements are met. In this variant or the other variants too, a check on the executability of the control instructions can be performed in one stage or in two stages, for example by virtue of the determining module or the memory module ascertaining the executability on the basis of the execution requirements (e.g. on the basis of the first portion of the execution requirements).

In a further variant, the control system comprises the following features:

for example, a first determining module (110), wherein
for example, the first determining module is configured to determine transmission requirements for a transmission of the control instructions (e.g. by means of control transactions),
for example, the transmission requirements are ascertained on the basis of the control instructions;
for example, a distributed database system (BC) having a multiplicity of nodes (BCN, BCN_D), wherein the nodes (300, BCN, BCN_D) and the devices (300, D, BCN_D) are connected to one another via a first communication network (NW1);
for example, a first assigning module (120) for assigning the respective execution requirements to the control instructions;
for example, a first memory module (130),
for example, the first memory module is configured to store the respective control instructions in control transactions,
for example, the first memory module uses the transmission requirements to select a transmission method or a combination of transmission methods for a data transmission of the control transactions to the devices,
for example, a first selected transmission method (e.g. for non-time-critical control instructions/control transactions) stores the control transactions in the distributed database system (BC),
for example, the first selected transmission method transmits the control transactions to the devices (300, D, BCN_D) by means of the distributed database system;
for example, a second selected transmission method (e.g. for time-critical control instructions or control transactions) transmits the control transactions to the devices (300, D, BCN_D) by means of separate and/or direct communication channels.

Figure 2:
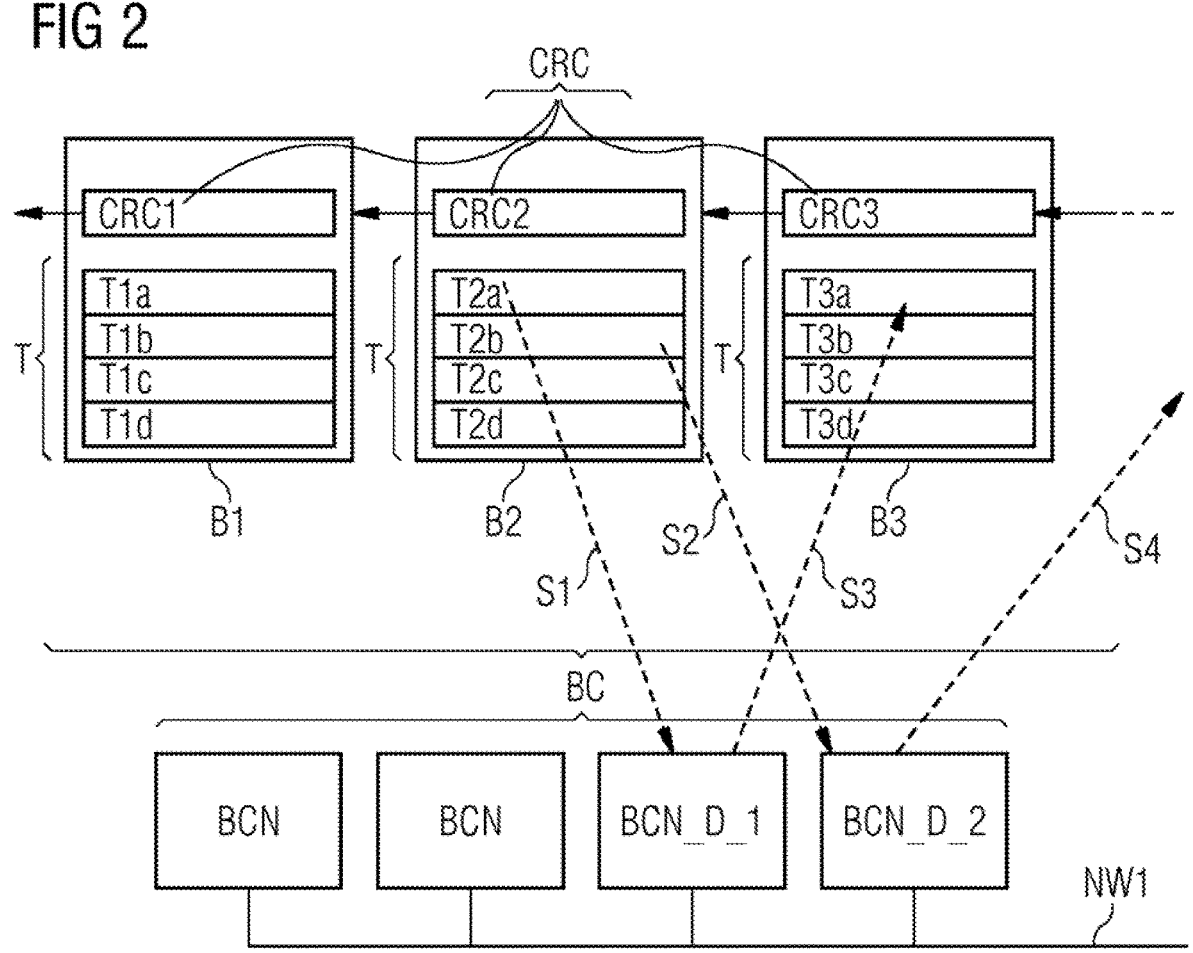
FIG. 2 shows a further exemplary embodiment of the invention.

FIG. 2 shows a second exemplary embodiment of the invention, which implements control of devices that are realized as nodes of the blockchain BC.

This variant can, by way of example, also be realized by the exemplary embodiment from FIG. 1, or is compatible with this figure. Accordingly, the control system from FIG. 2 can likewise have one or more modules of the control system from FIG. 1.

The control system, which is realized as blockchain BC, provides multiple transactions T, which can also comprise control transactions.

By way of example, the fifth transaction T2a is a first control transaction comprising first control instructions and first execution requirements assigned to these control instructions. The sixth transaction T2b is for example a second control transaction comprising second control instructions and second execution requirements assigned to these control instructions. The second execution requirements call for the presupposed control instructions to be that the second control instructions are executed by a specific device, for example a second device node BCN_D_2, and that the first control instructions need to be executed by a specific device node, for example a first device node BCN_D_1, before the second device node BCN_D_2 can begin performing the second control instructions.

In other words, the second execution requirements for the second control instructions stipulate that the execution thereof is begun if the first control instructions were executed and a confirmation for the execution thereof is provided by the blockchain in (confirmation) transactions stored in blocks of the blockchain.

In a first step S1, the first control instructions of the first control transaction are conveyed to the first device node BCN_D_1 by the blockchain and executed by the first device node BCN_D_1. Following successful performance of the first control instructions by the first device node BCN_D_1, a confirmation about this performance is written to a confirmation transaction for this purpose and stored in a data block of the blockchain in a second step S2. This is the ninth transaction T3a in this exemplary embodiment.

After the execution requirements for the second control instructions are met, the second control transaction is conveyed to the second device node BCN_D_2 by the blockchain in a third step S3. This can be done by the blockchain itself—as depicted e.g. in FIG. 1—or performed by a separate module or device, for example.

The second device node BCN_D_2 performs the second control instructions. If performance is successful, the second device node BCN_D_2 stores a second confirmation transaction in a block of the blockchain in a step S4.

A device node is intended to be understood here to mean in particular a node of the blockchain that is simultaneously a device or has device properties in order to perform control instructions.

Embodiments of the invention allows complex control instruction chains (also called instruction sequences) to be performed in an (automation) network, in which nodes and/or device nodes and/or blockchain-external devices are networked to one another, in a simple manner even if different operators of the individual nodes and devices do not trust one another.

A further exemplary embodiment of the invention, not depicted in a figure, relating to a device as explained in FIG. 1 or FIG. 2 with the associated exemplary embodiments.

The device comprises a first communication module, an optional first checking module, an optional first execution module and a second memory module, which are communicatively connected to one another via a bus. A bus in this instance can also be a simple program flow or a data interchange between the applicable components.

The device can, by way of example, additionally also comprise a further or multiple further component/s, such as for example a processor, a memory unit, further communication interfaces (e.g. Ethernet, WLAN), an input device, in particular a computer keyboard or a computer mouse, and a display device (e.g. a monitor). The processor can, by way of example, comprise multiple further processors that can be used in particular for realizing further exemplary embodiments. The further component/s can, by way of example, likewise be communicatively connected to one another via the bus.

The processor can be an ASIC, for example, that was realized on an application-specific basis for the functions of a respective module or of all modules of the exemplary embodiment (and/or of further exemplary embodiments), the program component or the program instructions being realized as integrated circuits, in particular. The processor can also be an FPGA, for example, that, in particular, is configured by means of the program instructions such that the FPGA performs the functions of a respective module or of all modules of the exemplary embodiment (and/or of further exemplary embodiments).

The first communication module, for example an Ethernet interface, is configured to receive data blocks of a distributed database system (for example a blockchain), wherein
control transactions with control instructions for the device are stored in the data blocks of the distributed database system (in other words, the control transactions with the stored control instructions are received by means of the data blocks of the distributed database system),
the control transactions comprise execution requirements,
the execution requirements comprise device-specific requirements for the device and/or presupposed control instructions,
the applicable execution requirements are assigned to the respective control transactions.

In particular, the execution requirements assigned to the (respective) control transactions can be used by the device to discover whether the device can execute the control instructions of the (respective) control transactions and/or whether the control instructions are intended for the device for execution.

The first communication module 310 is, in particular, configured to receive the control transactions by means (or with the aid) of the data blocks of the distributed database system (or the control transactions are conveyed to the device by means of the distributed database system, and the device then receives these control transactions).

Alternatively, the first communication module 310 is, in particular, configured to receive the control transactions by means of the distributed database system. For example, the database system can send the applicable control transactions to the first communication module or the applicable device for this purpose.

Receiving in this instance is intended to be understood to mean in particular that the applicable transactions are conveyed to the device e.g. directly by means of the distributed database system or are provided to the device by means of the distributed database system (e.g. by a node or a blockchain oracle) such that the device can retrieve or receive the transactions from the distributed database system.

Accordingly, in a further variant, the communication module, for example an Ethernet interface, can be configured to receive control transactions from a distributed database system (for example a blockchain), wherein
for example, the control transactions comprise control instructions for the device,
for example, the control transactions comprise execution requirements,
for example, the execution requirements comprise device-specific requirements for the device and/or presupposed control instructions,
for example, the applicable execution requirements are assigned to the respective control transactions.

The communication module can also be in a different form in a further variant. The control transactions (e.g. with control instructions and execution requirements) can e.g. be transmitted to the (applicable) device by means of a separate and/or direct communication channel. The communication channel can be part of the distributed database system or can be realized independently thereof. Preferably, following a transmission of the control transactions to the device, a transmission confirmation transaction for the transmission of the control transactions between the device and the distributed database system is stored in the distributed database system. The sending of the control transactions and/or the setup of the communication channel and/or the storing of the transmission confirmation transaction can e.g. be effected by the memory module of the control system and/or of the distributed database system or of a communication module of the control system and/or of the distributed database system (FIG. 1). Preferably, terminating/closing the communication channel results in the transmission confirmation transaction being stored in the distributed database system by the device and/or the distributed database system/control system. Preferably, the transmission confirmation transaction comprises the applicable control transactions and/or a checksum (e.g. a digital signature or a transaction checksum) for the applicable control transactions. This checksum may e.g. have been produced by the determining module and/or the memory module of the control system (in accordance with FIG. 1), for example if the execution requirements were determined successfully and/or the executability of the control instructions was ascertained successfully by means of the execution requirements (e.g. the first portion of the execution requirements) (e.g. if it was discovered that the device meets the device-specific requirements). The communication module 310 can, by way of example, also be in the form of a hybrid module that e.g. can use the communication channel and/or the distributed database system to receive transactions (e.g. control transactions). The separate and/or direct communication channel can be used, if need be, to receive control transactions that are supposed to be processed as quickly as possible (e.g. in the case of realtime requirements). The distributed database system can then be used e.g. to retrieve non-time-critical control transactions and/or confirmation transactions.

The first checking module is configured to check the respective execution requirements for an execution of the control instructions of one of the control transactions by the device, wherein in particular, the device-specific requirements of the respective execution requirements of the respective control transaction for the device are checked, and/or in particular, checking is performed to ascertain whether confirmation transactions for the presupposed control instructions of the respective execution requirements of the respective control transaction are available in data blocks of the distributed database system; and/or in particular, checking is performed to ascertain whether confirmation transactions for the presupposed control instructions of the respective execution requirements of the respective control transaction are available in the distributed database system (e.g. in the data blocks or directly in the transactions for blockless implementations).

The device checks the respective execution requirements assigned to the applicable control instructions. The execution requirements and/or the control instructions are e.g. stored in one of the control transactions. In other words, the device e.g. reads the control instructions of one of the received control transactions and also reads the associated execution requirements from the applicable control transaction (e.g. from the same control transaction comprising the control instructions or a separate control transaction comprising the applicable execution requirements).

In particular, the device checks the device-specific requirements for the device, the device-specific requirements being stored in the applicable execution requirements. In other words, checking is, in particular, performed to ascertain whether the device-specific requirements for an execution of the control instructions are met.

Alternatively or additionally, the device checks whether confirmation transactions for the presupposed control instructions are available in the distributed database system (e.g. are stored in the distributed database system or are stored in data blocks of the distributed database system). In other words, checking is performed to ascertain whether the presupposed control instructions necessary for the execution of the control instructions were already executed therefor (and this is accordingly stored/documented in confirmation transactions, in particular).

The result of this checking is stored in a result or stored in a result data record.

The first execution module is configured to execute the control instructions by means of the applicable device on the basis of a result of the checking. This then involves for example motors, mills or mechatronic components being actuated by the device in accordance with the control instructions if the result of the checking so permits.

The second memory module is configured to store the result of the execution of the control instructions in confirmation transactions of the data blocks of the distributed database system.

Alternatively, the second memory module is configured to store the result of the execution of the control instructions in confirmation transactions of the distributed database system (e.g. by virtue of the applicable confirmation transactions being stored in the distributed database system or the transactions themselves being stored by the distributed database system if it is a blockless database system).

The modules can be realized as a hardware component or as a software component or as a combination of hardware and software components, for example. By way of example, software components such as program libraries can be used in order to use program instructions of the program libraries to configure the processor such that it realizes the functionalities of an applicable module.

The device itself can be a node of a blockchain or of a distributed database system.

In a further variant, the device or the control system generally or the cited inventions with their features could be implemented by means of a blockless distributed database system (e.g. by means of the architecture used by IOTA). In particular, an applicable data block can then correspond to a single (control) transaction, e.g. in order to realize a blockless distributed database system (e.g. a blockless blockchain).

In such a variant, the device comprises a communication module for receiving (the) control transactions by means of a/the distributed database system, wherein the control transactions comprise stored control instructions, the control transactions comprise execution requirements, the execution requirements comprise device-specific requirements for the device and/or presupposed control instructions, the applicable execution requirements are assigned to the respective control transactions.

In a further variant, which is implemented on a (data) block basis, the device comprises a communication module for receiving data blocks of a/the distributed database system, wherein control transactions with control instructions for the device are received by means of the data blocks of the distributed database system, the control transactions comprise execution requirements, the execution requirements comprise device-specific requirements for the device and/or presupposed control instructions, the applicable execution requirements are assigned to the respective control transactions.

Consequently, the communication module of the device according to embodiments of the invention can be in a form in accordance with the cited variants.

The variants explained can, by way of example, each also comprise the modules already explained, such as the checking module and/or the execution module and/or the second memory module.

The blockless variants explained can also be realized as methods in an analogous manner.

If the device has the first checking module and/or the first execution module, for example, this is advantageous for relocating all or some more computation-intensive checking tasks by the control system (FIG. 1-2) or the distributed database system to the device or multiple devices of the same type as the device.

A device as used for example in the context of or together with the control system can have the following features, for example:

for example, a first communication module for receiving data blocks of a distributed database system, wherein for example, control transactions having control instructions for the device are stored in the data blocks of the distributed database system, for example, the control transactions comprise execution requirements, for example, the execution requirements comprise device-specific requirements for the device and/or presupposed control instructions, for example, the applicable execution requirements are assigned to the respective control transactions;

for example, a first checking module for checking the respective execution requirements for an execution of the control instructions of one of the control transactions by the device, wherein for example, checking is performed to ascertain whether confirmation transactions for the presupposed control instructions of the respective execution requirements of the respective control transaction are available in data blocks of the distributed database system;

for example, a first execution module for executing the control instructions by means of the applicable device on the basis of a result of the checking.

Alternatively, in one variant, such a device can comprise the following features:

for example, a first communication module for receiving control transactions provided by a distributed database system, wherein for example, the control transactions comprise control instructions for controlling the device, for example, the control transactions comprise execution requirements, for example, the execution requirements comprise device-specific requirements for the device and/or presupposed control instructions, for example, the applicable execution requirements are assigned to the respective control transactions;

for example, a first checking module for checking the respective execution requirements for an execution of the control instructions of one of the control transactions by the device, wherein for example, checking is performed to ascertain whether confirmation transactions for the presupposed control instructions of the respective execution requirements of the respective control transaction are available in the distributed database system;

for example, a first execution module for executing the control instructions by means of the applicable device on the basis of a result of the checking.

In one variant, the control system can also have the following features:

for example, a distributed database system (BC) having for example, a multiplicity of nodes (BCN, BCN_D), wherein the nodes (300, BCN, BCN_D) and the devices (300, D, BCN_D) are connected to one another via a first communication network (NW1);

for example, a first determining module (110), wherein for example, the first determining module assigns execution requirements to control instructions, for example, an executability of the control instructions by nodes of the distributed database system or by devices is ascertained on the basis of the execution requirements, for example, the execution requirements comprise device-specific requirements and/or presupposed control instructions, for example, the first determining module comprises a cache module, for example, the cache module comprises a prescribed number of entries, for example, the entries store control instructions already executed by the devices with their associated execution requirements and/or store presupposed control instructions already executed by the devices;

for example, a first memory module (130) for storing the respective control instructions with the assigned execution requirements in control transactions, wherein for example, the control transactions are stored in data blocks (B) of the distributed database system (BC);

for example, the control transactions are transmitted to the devices (300, D, BCN_D) by means of the data blocks (B).

In a further variant, embodiments of the invention relates to an apparatus for a distributed database system or for a control system having a distributed database system for controlling and/or monitoring devices, having:

for example, a first determining module (110), wherein for example the distributed database system (BC) comprises a multiplicity of nodes (BCN, BCN_D), the nodes (300, BCN, BCN_D) and the devices (300, D, BCN_D) being connected to one another via a first communication network (NW1), for example, the first determining module assigns execution requirements to control instructions, for example, an executability of the control instructions by nodes of the distributed database system or by devices is ascertained on the basis of the execution requirements, for example, the execution requirements comprise device-specific requirements and/or presupposed control instructions, for example, the control instructions are executable by an applicable device if confirmation transactions for the presupposed control instructions of the respective execution requirements of the respective control transaction are available in the distributed database system, for example, the first determining module comprises a cache module, for example, the cache module comprises a prescribed number of entries, for example, the entries store control instructions already executed by the devices with their associated execution requirements and/or store presupposed control instructions already executed by the devices;

for example, a first memory module (130) for storing the respective control instructions with the assigned execution requirements in control transactions, wherein for example, the control transactions are stored in or by the distributed database system (BC), for example, the control transactions are transmitted to the devices (300, D, BCN_D) by means of the distributed database system.

In a further variant, embodiments of the invention relates to a device comprising:

for example, a communication module for receiving data blocks of a distributed database system, wherein for example, control transactions with control instructions for the device are stored in the data blocks of the distributed database system, for example, the control transactions comprise execution requirements, for example, the execution requirements comprise device-specific requirements for the device and/or presupposed control instructions, for example, the applicable execution requirements are assigned to the respective control transactions;

for example, a first checking module for checking the respective execution requirements for the control instructions of one of the control transactions of a control instruction by the device, wherein for example, the device-specific requirements for the device are checked; and/or for example, checking is performed to ascertain whether confirmation transactions for the presupposed control instructions are available in data blocks of the distributed database system;

for example, an execution module for executing the control instructions by means of the applicable device on the basis of a result of the checking;

for example, a second memory module for storing the result of the execution of the control instructions in confirmation transactions of the data blocks of the distributed database system.

In a further variant, embodiments of the invention relates to a device comprising:

for example, a first communication module for receiving control transactions, wherein the distributed database system provides the control transactions, wherein for example, the control transactions comprise control instructions for the device, for example, the control transactions comprise execution requirements, for example, the execution requirements comprise device-specific requirements for the device and/or presupposed control instructions, for example, the applicable execution requirements are assigned to the respective control transactions;

for example, a first checking module for checking the respective execution requirements for an execution of the control instructions of one of the control transactions by the device, wherein for example, checking is performed to ascertain whether confirmation transactions for the presupposed control instructions of the respective execution requirements of the respective control transaction are available in the distributed database system;

for example, a first execution module for executing the control instructions by means of the applicable device on the basis of a result of the checking.

In a further variant, the device comprises the following features:

for example, a first communication module for receiving control transactions, wherein a distributed database system (or the distributed database system) provides the control transactions, wherein for example, the control transactions comprise control instructions for the device, for example, the control transactions comprise execution requirements, for example, the execution requirements comprise device-specific requirements for the device and/or presupposed control instructions, for example, the applicable execution requirements are assigned to the respective control transactions;

for example, a first checking module for checking the respective execution requirements for an execution of the control instructions of one of the control transactions by the device, wherein for example, checking is performed to ascertain whether confirmation transactions for the presupposed control instructions of the respective execution requirements of the respective control transaction are available in the distributed database system;

for example, a first execution module for executing the control instructions by means of the applicable device on the basis of a result of the checking.

The aspect of embodiments of the invention that relates to the device can, by way of example, also be realized as a method having the following method steps:

for example, having a first method step for receiving control transactions, wherein a distributed database system provides the control transactions, wherein for example, the control transactions comprise control instructions for the device, for example, the control transactions comprise execution requirements, for example, the execution requirements comprise device-specific requirements for the device and/or presupposed control instructions, for example, the applicable execution requirements are assigned to the respective control transactions;

for example, having a first method step for checking the respective execution requirements for an execution of the control instructions of one of the control transactions by the device, wherein for example, checking is performed to ascertain whether confirmation transactions for the presupposed control instructions of the respective execution requirements of the respective control transaction are available in the distributed database system;

for example, having a first method step for executing the control instructions by means of the applicable device on the basis of a result of the checking.

In a further variant, the device comprises:

for example, a communication module for receiving data blocks of a distributed database system, wherein for example, control transactions with control instructions for the device are stored in the data blocks of the distributed database system, for example, the control transactions comprise execution requirements, for example, the execution requirements comprise device-specific requirements for the device and/or presupposed control instructions, for example, the applicable execution requirements are assigned to the respective control transactions.

Optionally, the device can also comprise the following, for example:

for example, a first checking module for checking the respective execution requirements for the control instructions of one of the control transactions of a control instruction by the device, wherein in particular, the device-specific requirements for the device are checked; and/or in particular, checking is performed to ascertain whether confirmation transactions for the presupposed control instructions are available in data blocks of the distributed database system;

in particular, checking is performed to ascertain whether confirmation transactions for the presupposed control instructions are available in the distributed database system;

for example, an optional execution module for executing the control instructions by means of the applicable device on the basis of a result of the checking;

for example, an optional second memory module for storing the result of the execution of the control instructions in confirmation transactions, wherein the confirmation transactions are stored in the distributed database system (e.g. in data blocks of the/a distributed database system), for example.

In a further variant, the device comprises the following features:

for example, a communication module for receiving data blocks of a distributed database system, wherein for example, control transactions with control instructions for the device are stored in the data blocks of the distributed database system, for example, the control transactions comprise execution requirements, for example, the execution requirements comprise device-specific requirements for the device and/or presupposed control instructions, for example, the applicable execution requirements are assigned to the respective control transactions;

for example, a first checking module for checking the respective execution requirements for the control instructions of one of the control transactions of a control instruction by the device, wherein for example, the device-specific requirements for the device are checked; and/or for example, checking is performed to ascertain whether confirmation transactions for the presupposed control instructions are available in data blocks of the distributed database system;

for example, an execution module for executing the control instructions by means of the applicable device on the basis of a result of the checking;

for example, a second memory module for storing the result of the execution of the control instructions in confirmation transactions of the data blocks of the distributed database system.

Figure 3:
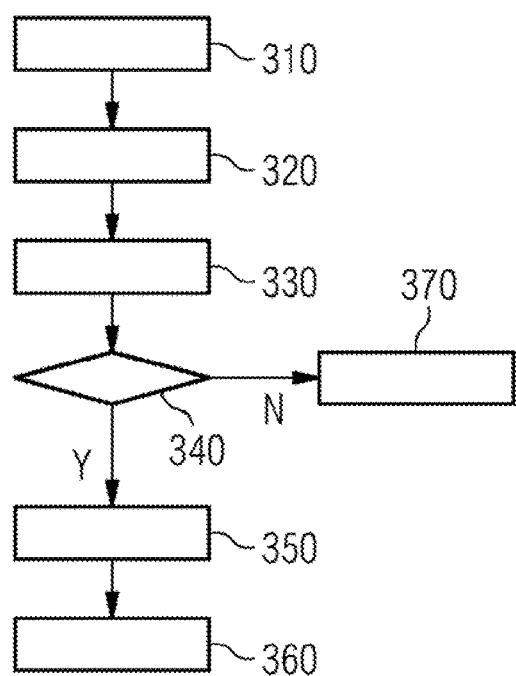
FIG. 3 shows a further exemplary embodiment of the invention.

FIG. 3 shows a third exemplary embodiment of the invention by means of a flowchart of the method according to embodiments of the invention.

The method is preferably performed in computer-aided fashion.

The exemplary embodiment of a method for the computer-aided control of devices can, in one variant, comprise the following method steps:

assigning execution requirements to the control instructions, wherein an executability of the control instructions by nodes of a distributed database system or by devices is ascertained on the basis of the execution requirements, the execution requirements comprise device-specific requirements and/or presupposed control instructions, storing entries in a cache module, wherein the cache module can store a prescribed number of entries, the entries store control instructions already executed by the devices with their associated execution requirements and/or store presupposed control instructions already executed by the devices, storing the respective control instructions with the applicable execution requirements in control transactions, wherein the control transactions are stored in data blocks of a distributed database system;

conveying the control transactions to the devices by means of the data blocks;

checking the respective execution requirements for the execution of the control instructions of one of the control transactions by an applicable device, wherein the device-specific requirements for the applicable device are checked; and/or checking is performed to ascertain whether confirmation transactions for the presupposed control instructions are available in data blocks of the distributed database system;

executing the control instructions by means of the applicable device on the basis of a result of the checking;

storing the result of the execution of the control instructions in confirmation transactions of the data blocks of the distributed database system.

The assigning is effected for example by storing unique identifiers or addresses of the execution requirements and of the applicable control instructions in a data record. In other words, the control instructions are assigned the execution requirements that were determined for these control instructions. By way of example, it is additionally possible to ascertain an executability of the control instructions by nodes of a distributed database system or by devices on the basis of the execution requirements, wherein the execution requirements comprise device-specific requirements and/or presupposed control instructions. To this end, e.g. the execution requirements for an execution of the control instructions by the devices can be determined/ascertained, wherein applicable device-specific requirements and/or presupposed control instructions are stored in the execution requirements.

Specifically, a method for the computer-aided control of devices is performed in this exemplary embodiment.

The method comprises a first method step 310 for assigning execution requirements to the control instructions, wherein an executability of the control instructions by nodes of a distributed database system or by devices is ascertained on the basis of the execution requirements, the execution requirements comprise device-specific requirements and/or presupposed control instructions.

This method step can moreover additionally comprise determining execution requirements for an execution of the control instructions by the devices, wherein applicable device-specific requirements and/or presupposed control instructions are stored in the execution requirements. This method step can moreover also comprise further features, which were disclosed in association with the determining module from the preceding exemplary embodiments, for example.

The method comprises a second method step for storing 320 the respective control instructions with the applicable execution requirements in control transactions, wherein the control transactions are stored in data blocks of a distributed database system.

Method steps three to seven (330-370) can be optional method steps, depending on the implementation variant.

The method comprises a third method step for conveying 330 the control transactions to the devices by means of the data blocks. The conveying is effected for example via the first communication network by means of the distributed database system, as was explained in the preceding exemplary embodiments.

The method comprises a fourth method step for checking 340 the respective execution requirements for the execution of one of the control instructions or of a control instruction or the control instructions of a control transaction by an applicable device, wherein the device-specific requirements of the control instructions for the applicable device are checked and/or checking is performed to ascertain whether confirmation transactions for the presupposed control instructions of the control instructions are available in data blocks of the distributed database system.

The checking yields a result that indicates whether the applicable device can Y or cannot N execute the control instructions.

Accordingly, the method comprises a fifth method step for executing 350 the control instructions by means of the applicable device on the basis of a result of the checking, wherein the control instructions of the control transaction are executed if this is permitted or confirmed Y by the (check) result.

The method comprises a sixth method step for storing 360 the result of the execution of the control instructions in confirmation transactions of the data blocks of the distributed database system.

If the checking reveals or the result indicates that the control instructions cannot N be executed by the applicable device, a seventh method step 370 is carried out. This method step can, by way of example, terminate the execution of the control instructions of the instruction sequence, for example by virtue of a terminate control instruction for the control instructions of the instruction sequence being stored in a transaction, which is in turn stored in blocks of the blockchain. Alternatively or additionally, all or some of these or further control instructions that have resulted from the instruction sequence can be terminated or annulled. Alternatively or additionally, an execution/performance of the applicable control instructions is prevented.

Alternatively or additionally, the check can be restarted in the seventh method step, and the method returns to method step four. In this manner, it is possible, by way of example, to implement a wait until the execution requirements are met, for example. This can involve a configurable time delay being taken into consideration, for example, which indicates in particular how long it takes before there is a return to the fifth method step.

Alternatively or additionally, the result can also be stored in a confirmation transaction in the blockchain (that is to say in a block of the blockchain) in the seventh method step.

The individual method steps can—as was explained in the preceding exemplary embodiments—be performed by different components of the control system. These are for example the distributed database system itself and/or the devices and/or nodes of the distributed database system.

Embodiments of the invention (from this exemplary embodiment or the preceding exemplary embodiments) can easily be used to break down an instruction sequence into control instructions or control transactions that are then performed by appropriately suitable devices. This is ensured by the high level of data integrity that is achieved by a blockchain, for example (e.g. in order to achieve protection against manipulation for the control instructions to be performed in the control transactions). Since the result of the performance of the control instructions or control transactions is stored in confirmation transactions, the devices can also be monitored by means of embodiments of the invention. The confirmation transactions can also comprise details of the performance of the control transactions/control instructions. These are e.g. production time or production problems that have arisen during performance (e.g. production of a product). In this respect, a confirmation transaction can also comprise information indicating that the performance of the control instructions was not successful. If these control instructions that have not been executed successfully are presupposed control instructions for other/further control instructions, then in particular the result of the checking of the execution requirements of these other/further control instructions would reveal that these other/further control instructions cannot be executed by a/the applicable device.

If the execution requirements for the other/further control instructions are met, however, then they are executed by an applicable device.

FIG. 4 shows a fourth exemplary embodiment of the invention as a determining module 110.

The determining module 110 is suitable for a distributed database system or for a control system having a distributed database system for controlling and/or monitoring devices or for devices that execute control instructions (e.g. in the form of transactions).

The determining module 110 comprises a first interface 410, a first evaluation unit 420 and optionally a configuration memory 430, which are preferably communicatively connected to one another via a bus 401. A bus can e.g. also be a simple program flow or a data interchange between the applicable components.

The determining module can, by way of example, additionally also comprise a further or multiple further component/s, such as for example a processor, a memory unit, further communication interfaces (e.g. Ethernet, WLAN), an input device, in particular a computer keyboard or a computer mouse, and a display device (e.g. a monitor). The processor can comprise multiple further processors, for example, that can be used to realize further exemplary embodiments, in particular. The further component/s can likewise be communicatively connected to one another via the bus, for example.

The processor can be an ASIC, for example, that was realized on an application-specific basis for the functions of a respective module (or of a unit) or of all modules of the exemplary embodiment (and/or of further exemplary embodiments), the program component or the program instructions being realized as integrated circuits, in particular. The processor can also be an FPGA, for example, that, in particular, is configured by means of the program instructions such that the FPGA performs the functions of a respective module or of all modules of the exemplary embodiment (and/or of further exemplary embodiments).

The first interface 410 is configured to receive or retrieve control instructions. The control instructions can e.g. be conveyed to the first interface 410 by a user by means of a GUI. The control instructions can alternatively be provided by a server or another database. This can again be a distributed database system or a hierarchic database, for example. Should the determining module be used in a control system according to embodiments of the invention, for example, then the control instructions or an instruction sequence can be conveyed to the control system in the same way as described in this exemplary embodiment.

The control instructions can, by way of example, also be provided by a breakdown module, as was explained in the preceding exemplary embodiments. The breakdown module receives or retrieves the control instructions or instruction sequences for this purpose.

The control instructions or instruction sequences can e.g. be conveyed to the first breakdown module by a user by means of a GUI and, by way of example, via a second interface or the first interface 410. The control instructions or the instruction sequences can alternatively be provided to the breakdown module by a server or another database. This can again be a distributed database system or a hierarchic database, for example.

The first evaluation unit 420 is configured for assignment, wherein
  the first evaluation unit 420 assigns execution requirements to the control instructions,
  an executability of the control instructions by nodes of a distributed database system or by devices is ascertained on the basis of the execution requirements (that is to say the applicable execution requirements) e.g. for the control instructions,
  the execution requirements comprise device-specific requirements and/or presupposed control instructions,
  the first determining module comprises a cache module,
  the cache module comprises a prescribed number of entries,
  the entries store control instructions already executed by the devices with their associated execution requirements and/or store presupposed control instructions already executed by the devices.

The executability can be determined for example by checking whether the devices and/or nodes are capable of executing the applicable control instructions. This can be determined, by way of example, by virtue of the device-specific requirements being compared against the device-specific data in order to discover whether a device and/or which device is capable of implementing/executing the applicable control instructions (or more generally: at least some of the execution requirements for the devices that are supposed to execute the control instructions are checked).

This can be accomplished by first retrieving the applicable device information (or device-specific data or device properties) from the/a registration module or a device database (for example the determining module can comprise or be communicatively connected to the device database and/or the registration module) and comparing it against the device-specific requirements. If a device or multiple devices meet/s the device-specific requirements, the executability of the control instructions has been (successfully) ascertained in respect of the device-specific requirements. In other words, the applicable control instructions are at least executable by one device or node.

In one variant, the control system, the determining module, the registration module or the device database can retrieve or additionally retrieve current device-specific data from an applicable device so as, by way of example, to take into consideration a current device state (e.g. error state of the device, device is in a maintenance mode, device is currently ready) of the device/node when ascertaining executability. By way of example, an applicable device is able, according to the device information of the registration module, to execute the control instructions. If this device information is obsolete (e.g. it was stored in the registration module when the device was installed), for example, then it may be that the current device state (e.g. device is in an error state) does not permit execution of the control instructions by one of the devices, for example. In such a case, the executability of the control instructions is not able to be ascertained successfully and executability of the control instructions is not confirmed. A device state is e.g. an "error state" (e.g. operating system crashed, tool faulty, a device component is faulty), a "maintenance state" (the device cannot execute control instructions because spare parts are being fitted, for example), "at capacity" (the device cannot currently perform control instructions because it is currently already performing control instructions, for example) or "ready" (the device is capable of performing the control instructions). The current device-specific data preferably comprise a current device state and/or information concerning when the device is capable of performing the control instructions and/or when the device is likely to have performed the control instructions and/or when the device is certain to have performed the control instructions. In particular information concerning when the device is certain to have performed the control instructions is relevant to real-time applications or in realtime scenarios. If for example current device-specific data were ascertained, these data are used to update the entries in the device database, for example.

In one variant, checking is first of all performed to ascertain when the device-specific data for an applicable device (or an applicable node) were updated in the device database, for example. If this occurred recently (e.g. within a prescribed period—for example 1 hour or 5 minutes), then it is possible to dispense with retrieving device-specific data again, for example, since the data of the device database are regarded as up to date. Accordingly, the entries in the device database with device-specific data comprise a timestamp indicating the last update, for example.

In one variant, the executability of the control instructions is ascertained or checked by checking whether e.g. there are applicable confirmation transactions present in the distributed database system or stored by the distributed database system, for example, for the applicable presupposed control instructions. In other words, the control instructions are executable by an applicable device, for example, if confirmation transactions for the (applicable) presupposed control instructions of the respective execution requirements of the respective control transaction are available in the distributed database system. For example if such confirmation transactions are stored in applicable data blocks.

In one variant, the first evaluation unit is alternatively or additionally configured to determine execution requirements for an execution of control instructions by nodes of a/the distributed database system or by devices that are e.g. connected by means of a distributed database system, wherein in particular, the execution requirements are determined on the basis of the control instructions, in particular, device-specific requirements and/or presupposed control instructions are determined, in particular, e.g., the device-specific requirements and/or the presupposed control instructions are stored in the execution requirements, the distributed database system is a blockchain, for example.

In one variant, an executability of the control instructions by nodes of a distributed database system or by devices can be ascertained on the basis of the execution requirements. In other words, it is possible, by way of example, to ascertain whether the control instructions are executable by the nodes and/or devices.

The executability can, by way of example, be determined by virtue of checking being performed to ascertain whether the devices and/or nodes are capable of executing the applicable control instructions. This can be determined, by way of example, by virtue of the device-specific requirements being compared against the device-specific data in order to discover whether a device and/or which device is capable of implementing/executing the applicable control instructions.

This can be accomplished by first retrieving the applicable device information (or device-specific data or device properties) from the/a registration module or a device database (for example the determining module can comprise or be communicatively connected to the device database and/or the registration module) and comparing it against the device-specific requirements. If a device or multiple devices meet/s the device-specific requirements, the executability of the control instructions has been (successfully) ascertained in respect of the device-specific requirements. In other words, the applicable control instructions are at least executable by one device or node.

In one variant, the control system, the determining module, the registration module or the device database can retrieve or additionally retrieve current device-specific data from an applicable device so as, by way of example, to take into consideration a current device state (e.g. error state of the device, device is in a maintenance mode, device is currently ready) of the device/node when ascertaining executability. By way of example, an applicable device is able, according to the device information of the registration module, to execute the control instructions. If this device information is obsolete (e.g. it was stored in the registration module when the device was installed), for example, then it may be that the current device state (e.g. device is in an error state) does not permit execution of the control instructions by one of the devices, for example. In such a case, the executability of the control instructions is not able to be ascertained successfully and executability of the control instructions is not confirmed. A device state is e.g. an "error state" (e.g. operating system crashed, tool faulty, a device component is faulty), a "maintenance state" (the device cannot execute control instructions because spare parts are being fitted, for example), "at capacity" (the device cannot currently perform control instructions because it is currently already performing control instructions, for example) or "ready" (the device is capable of performing the control instructions). The current device-specific data preferably comprise a current device state and/or information concerning when the device is capable of performing the control instructions and/or when the device is likely to have performed the control instructions and/or when the device is certain to have performed the control instructions. In particular information concerning when the device is certain to have performed the control instructions is relevant to realtime applications or in realtime scenarios. If for example current device-specific data were ascertained, these data are used to update the entries in the device database, for example.

In one variant, checking is first of all performed to ascertain when the device-specific data for an applicable device (or an applicable node) were updated in the device database, for example. If this occurred recently (e.g. within a prescribed period—for example 1 hour or 5 minutes), then it is possible to dispense with retrieving device-specific data again, for example, since the data of the device database are regarded as up to date. Accordingly, the entries in the device database with device-specific data comprise a timestamp indicating the last update, for example.

The data interchange here or else in the other exemplary embodiments of the invention is, by way of example, performed by means of the infrastructure or communication infrastructure of the distributed database system, e.g. by virtue of applicable messages or transactions with applicable data being interchanged.

In one variant, the executability of the control instructions is ascertained or checked by checking whether e.g. there are applicable confirmation transactions present in the distributed database system or stored by the distributed database system, for example, for the applicable presupposed control instructions. In other words, the control instructions are executable by an applicable device, for example, if confirmation transactions for the (applicable) presupposed control instructions of the respective execution requirements of the respective control transaction are available in the distributed database system. For example if such confirmation transactions are stored in applicable data blocks.

In a further variant, it is also possible for the devices to be asked directly whether they are capable of executing the applicable control instructions or complying with the applicable execution requirements, for example. This can be done e.g. by sending applicable query transactions or query messages to the applicable devices. If the devices confirm this e.g. by means of applicable messages and for example also confirm compliance with the execution requirements, the applicable execution requirements are determined or produced for the applicable control instructions.

In a further variant, the execution requirements can e.g. also be checked in a two-stage process. By way of example, a first portion of the execution requirements is e.g. already checked when the execution requirements are determined and/or when the executability of the control instructions is ascertained. A second portion of the execution requirements is then checked by the device or the checking module, for example. By way of example, checking the first portion of the execution requirements involves checking whether the devices are technically capable (e.g. are currently technically capable) of executing the control instructions. By way of example, checking the second portion of the execution requirements involves checking whether e.g. the presupposed control instructions were already executed. If for example just checking the first portion of the execution requirements results in it being discovered that this first portion of the execution requirements cannot be met by the devices/nodes, the execution requirements can be prevented from being assigned to the control instructions and/or the control instructions can be prevented from being stored, for example. In other words, the assigning and/or storing is performed on the basis of a result of the check on the executability (e.g. on the first portion of the execution requirements) of the control instructions by the devices and/or the nodes.

The configuration memory comprises the device-specific data about the devices and/or device-specific data about the nodes and/or the device-specific requirements.

The determining module is advantageous for, in particular, improving the execution of control instructions by devices or nodes (e.g. production robots, control systems for a power distribution network, bank terminals, automated teller machines, transfers between banks) that are connected to one another via a network.

The determining module can also assign the control instructions to specific devices that are supposed to execute them, for example. This is preferably stored in the execution requirements.

Additionally, security during the operation of a distributed infrastructure (e.g. a distributed database system having devices and/or nodes or nodes/devices that access the distributed database system) implemented wholly or in part by means of a distributed database system (e.g. a blockchain) can be increased, for example.

In particular, the term control instructions should be understood broadly. In addition to the definition cited above, for example, it can also mean transactions that are supposed to be executed by a device (e.g. a node of a blockchain or a device outside the blockchain, e.g. device D). In other words, the apparatus converts in particular unchecked transactions into checked transactions, the check being performed on the basis of the device-specific requirements and device-specific data that are supposed to execute the control instructions, for example.

Embodiments of the invention can be used to ensure or check demanded device-specific requirements for the execution of the control instructions on the device, for example. The device-specific requirements can, by way of example, also be security requirements and/or location-related requirements (e.g. a country statement, a GPS statement or zip code (PLZ)) that a device is supposed to meet for executing the control instructions. As an alternative, specific/prescribed authentication can also be called for by the device-specific requirements for the execution, for example.

The device-specific requirements for nodes or devices can also be user-related or comprise user-specific requirements, for example. By way of example, a first user can call for low precision for producing a workpiece in his assigned device-specific requirements. By way of example, a second user can then call for higher precision for producing a workpiece in his assigned device-specific requirements. In this way, it is e.g. also possible for security requirements to be stored in user-related fashion. It is, by way of example, also conceivable for specific types or kinds of control instructions—user-related or otherwise—to have assigned device-specific requirements that are taken into consideration by the determining module. By way of example, one requirement can be that a control instruction for loading firmware is performed only by a device that meets prescribed security requirements, e.g. in order to ensure that expertise in the firmware is not readily accessible to anyone in a production installation. These prescribed security requirements can, by way of example, call for only specific personnel to have access to an applicable device or for the device to be protected by a password and/or other cryptographic mechanisms (e.g. access is possible only by inserting a chip card and entering a pin).

This can be the case for example if someone wishes to use a device (e.g. an automated teller machine) to withdraw cash. The control instructions are then, by way of example, the request by the customer to make a cash payment. If for example an applicable customer has specified (e.g. at his home bank or using online banking) that he preferably permits a cash payment only in prescribed countries, e.g. Italy, France and Austria, then this is stored in the device-specific requirements, which are preferably assigned to a specific user. An automated teller machine in Andorra might then not permit a payment or prevent a payment. It is also possible, by way of example, for the security requirements to call for prescribed authentication of the customer. By way of example, for a pin to be entered for a payment (which is not necessarily the case e.g. in the USA) and/or for a specific pin length to be required (e.g. 8 characters) and/or for other additional authentication methods to be required (e.g. 2-factor authentication, mobile TAN, Google Authenticator). By way of example, loading of a cash card can be implemented in similar fashion, with e.g. the device-specific requirements for the cash card and the loading device prescribing security requirements. By way of example, the cash card or the loading device need to use or have prescribed cryptographic methods and/or authentication methods in order to perform the loading process.

Alternatively or additionally, the (first) evaluation unit can also analyze the control instructions further or analyze them more comprehensively. If for example the evaluation unit already discovers that the device-specific requirements are not met or are not meetable (e.g. the control instructions were sent from an unapproved country or are intended for execution in an unapproved country), it is e.g. possible for the (first) evaluation unit to create a control transaction that indicates the non-executability to the applicable device, node or the system and preferably prevents or prohibits an execution of the control instructions. Alternatively, it is, by way of example, also possible for no control transaction to be produced, and at some point there is a timeout for the execution of the control instructions, e.g. after a prescribed period.

To discover this, the (first) evaluation unit compares the device-specific data for the device that is supposed to execute the control instructions with the device-specific requirements e.g. for the control instructions. Depending on the result of this comparison, either a control transaction permitting an execution of the control instructions on the applicable device is then produced, or a control transaction is not created or a control transaction prohibiting or preventing an execution of the control instructions is created.

If the (first) evaluation unit discovers that the control instructions are executable (that is to say the comparison is positive), the (first) evaluation unit produces applicable execution requirements and conveys the control instructions and the execution requirements to the first assigning module, for example, to assign the respective execution requirements to the control instructions. The first assigning module can e.g. be an integral component of the determining module or an integral component of the evaluation unit.

After that, the control instructions, if need be together with the associated execution requirements, are conveyed to a first memory module of the determining module, for example. This conveyance can be effected by the assigning module, the (first) evaluation unit or the determining module itself, for example. The first memory module is configured to store the respective control instructions in control transactions, wherein the control instructions are, by way of example, stored together with the assigned execution requirements in the control transactions, for example if the control instructions are executable by one of the devices (e.g. an automated teller machine).

In other words, the result of the comparison is taken as a basis for stipulating whether a control transaction is stored and/or with what content a control transaction is stored.

For storage, the control transactions can then be stored in data blocks (B) of the distributed database system (BC), wherein in particular the control transactions are transmitted to the devices (D, BCN_D) or the nodes by means of the data blocks (B)—provided that a control transaction has been created.

Additionally, the determining module 110 can also comprise a first assigning module and/or a first memory module and/or further modules, for example, as was explained in the exemplary embodiments.

The nodes or devices can then comprise a checking module and/or an execution module, for example, as was explained in the exemplary embodiments.

It would, by way of example, also be conceivable for online banking to be protected in the manner mentioned above by virtue of security requirements and/or location-related requirements of the computer (that is to say the device sending control instructions) being checked in order to discover whether the payment or transfer is permitted by another device. To this end, this computer can be a node of the distributed database system or a device, for example—as was already explained.

In a further variant, the determining module comprises the following features:
  for example, a first interface (410) for receiving or retrieving control instructions;
  for example, a first evaluation unit (420), wherein
    for example, the first evaluation unit (420) assigns execution requirements to the control instructions,
    for example, an executability of the control instructions by nodes of a distributed database system or by devices is ascertained on the basis of the execution requirements,
    for example, the execution requirements comprise device-specific requirements and/or presupposed control instructions,
    for example, the first determining module comprises a cache module,
    for example, the cache module comprises a prescribed number of entries,
    for example, the entries store control instructions already executed by the devices with their associated execution requirements and/or store presupposed control instructions already executed by the devices.

Figure 5:
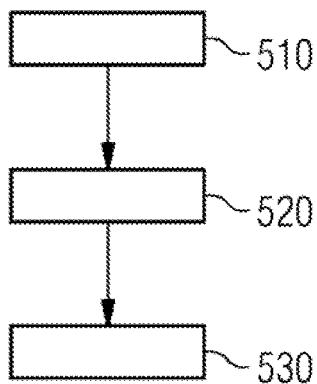
FIG. 5 shows a further exemplary embodiment of the invention.

FIG. 5 shows a fifth exemplary embodiment of the invention as a flowchart for a method according to embodiments of the invention.

The method is preferably performed in computer-aided fashion.

Specifically, a method for the computer-aided determination or assignment of execution requirements for control instructions is performed in this exemplary embodiment. The method can also be used to ascertain the executability of control instructions, for example, as explained in FIG. 4, for example.

The method comprises a first method step 510 for receiving or retrieving control instructions.

The method comprises a second method step 520 for assigning execution requirements to the control instructions, wherein
  an executability of the control instructions by nodes of a distributed database system or by devices is ascertained on the basis of the execution requirements,
  the execution requirements comprise device-specific requirements and/or presupposed control instructions,
  the distributed database system is a blockchain, for example.

The assigning can involve for example checking an executability of the control instructions by nodes of a distributed database system or by devices on the basis of device-specific requirements and/or presupposed control instructions. This check additionally involves for example the device-specific data and/or the already executed control instructions or control transactions being checked as well. By way of example, checking is performed to ascertain whether a device meets the device-specific requirements by virtue of the device-specific data being checked for the applicable device.

The method can comprise for example a method step for determining execution requirements on the basis of the result of the checking of the executability for an execution of control instructions by nodes of a distributed database system or by devices.

In other words, e.g. the execution requirements can be determined on the basis of device-specific requirements and/or presupposed control instructions.

These method steps (assigning and/or determining the execution requirements) can be implemented by the (first) evaluation unit of the determining module from FIG. 4, for example.

The device-specific requirements and/or the presupposed control instructions are stored in the execution requirements. The distributed database system is a blockchain, for example.

The nodes or devices are e.g. connected by means of the distributed database system.

To determine the execution requirements, e.g. the device-specific requirements or presupposed control instructions are analyzed and compared with the already executed control instructions and device-specific requirements for available devices. By way of example, this step can also involve a specific node or a specific device that is supposed to execute the control instructions being specifically allocated or assigned. This in particular improves the reliability and security of the execution or ensures that the execution e.g. produces the desired result. This is e.g. that a product was produced with the required precision.

The method comprises a third method step 530 for storing entries in a cache module, wherein
  the cache module can store a prescribed number of entries,
  the entries store control instructions already executed by the devices with their associated execution requirements and/or store presupposed control instructions already executed by the devices.

The storage can take place (including in the preceding exemplary embodiments) if execution requirements were assigned or were determined for control instructions and the entries in the cache module contain no corresponding entry having the applicable control instructions with the assigned execution requirements. If an entry needs to be displaced, for example, this can involve displacement strategies being used, which are known from instruction caches of processors.

In a further embodiment, the invention relates to a method for the computer-aided assignment of execution requirements for control instructions, having the following method steps:
for example, having a method step for receiving or retrieving control instructions;
for example, having a method step for assigning execution requirements to the control instructions, wherein
for example, an executability of the control instructions by nodes of a distributed database system or by devices is ascertained on the basis of the execution requirements,
for example, the execution requirements comprise device-specific requirements and/or presupposed control instructions,
the distributed database system is a blockchain, for example, for example, having a method step for storing entries in a cache module, wherein
for example, the cache module can store a prescribed number of entries,
for example, the entries store control instructions already executed by the devices with their associated execution requirements and/or store presupposed control instructions already executed by the devices.

According to a further embodiment, the invention relates to a method for the computer-aided control of devices, having the following method steps:
for example, having a method step for assigning execution requirements to the control instructions, wherein
for example, an executability of the control instructions by nodes of a distributed database system or by devices is ascertained on the basis of the execution requirements,
for example, the execution requirements comprise device-specific requirements and/or presupposed control instructions,
for example, having a method step for storing entries in a cache module, wherein
for example, the cache module can store a prescribed number of entries,
for example, the entries store control instructions already executed by the devices with their associated execution requirements and/or store presupposed control instructions already executed by the devices,
for example, storing (530) the respective control instructions with the applicable execution requirements in control transactions, wherein the control transactions are stored in data blocks of a distributed database system.

According to a further embodiment, the invention relates to a method for the computer-aided control of a device and/or a method for the computer-aided execution of control instructions by a device and/or a method for the computer-aided checking of control instructions by a device, having the following method steps:
for example, having a method step for receiving data blocks of a distributed database system, wherein
for example, control transactions having control instructions for the device are stored in the data blocks of the distributed database system,
for example, the control transactions comprise execution requirements,
for example, the execution requirements comprise device-specific requirements for the device and/or presupposed control instructions,
for example, the applicable execution requirements are assigned to the respective control transactions;
for example, having a method step for checking the respective execution requirements for an execution of the control instructions of one of the control transactions by the device, wherein
for example, checking is performed to ascertain whether confirmation transactions for the presupposed control instructions of the respective execution requirements of the respective control transaction are available in data blocks of the distributed database system;
for example, having a method step for executing the control instructions by means of the applicable device on the basis of a result of the checking.

According to a further embodiment, the invention relates to a method for the computer-aided control of a device and/or a method for the computer-aided execution of control instructions by a device and/or a method for the computer-aided checking of control instructions by a device, having the following method steps:
for example, having a method step for receiving control transactions provided by a distributed database system, wherein
for example, the control transactions comprise control instructions for the device,
for example, the control transactions comprise execution requirements,
for example, the execution requirements comprise device-specific requirements for the device and/or presupposed control instructions,
for example, the applicable execution requirements are assigned to the respective control transactions;
for example, having a method step for checking the respective execution requirements for an execution of the control instructions of one of the control transactions by the device, wherein
for example, checking is performed to ascertain whether confirmation transactions for the presupposed control instructions of the respective execution requirements of the respective control transaction are available in the distributed database system;
for example, having a method step for executing the control instructions by means of the applicable device on the basis of a result of the checking.

A few further exemplary embodiments are explained below. These exemplary embodiments are likewise compatible with the variants of the exemplary embodiments explained previously.

A further exemplary embodiment (not depicted in a figure) relates to a determining module for a distributed database system or for a control system having a distributed database system for controlling and/or monitoring devices, having:
for example, a first interface for receiving and/or retrieving control instructions;
for example, a first evaluation unit, wherein
for example, the first evaluation unit assigns execution requirements to the control instructions,
for example, an executability of the control instructions by nodes of a distributed database system or by devices is ascertained on the basis of the execution requirements,
for example, the execution requirements have been or are ascertained on the basis of the control instructions
for example, the execution requirements comprise device-specific requirements and/or presupposed control instructions, for example, the first determining module comprises a cache module, for example, the cache module comprises a prescribed number of entries, for example, the entries store control instructions already executed by the devices with their associated execution requirements and/or store presupposed control instructions already executed by the devices.

A further exemplary embodiment (not depicted in a figure) relates to a determining module for a distributed database system or for a control system having a distributed database system for controlling and/or monitoring devices, having:

for example, a first interface for receiving and/or retrieving control instructions;

for example, a first evaluation unit for determining execution requirements for an execution of control instructions by nodes of a distributed database system or by devices, wherein the execution requirements are determined on the basis of device-specific requirements and/or presupposed control instructions that have been ascertained for the control instructions, for example, the determining module comprises a cache module, for example, the cache module comprises a prescribed number of entries, for example, the entries store control instructions already executed by the devices with their associated execution requirements and/or store presupposed control instructions already executed by the devices.

A further exemplary embodiment (not depicted in a figure) relates to a control system, having:

for example, a first determining module (110), wherein for example, the first determining module is configured to determine transmission requirements for a transmission of the control instructions (e.g. by means of control transactions), for example, the transmission requirements are ascertained on the basis of the control instructions;

for example, the first determining module comprises a cache module, for example, the cache module comprises a prescribed number of entries, for example, the entries store control instructions already executed by the devices with their associated execution requirements and/or store presupposed control instructions already executed by the devices, for example, a distributed database system having a multiplicity of nodes, wherein the nodes and the devices are connected to one another via a first communication network;

for example, a first assigning module for assigning the respective execution requirements to the control instructions;

for example, a first memory module, for example, the first memory module is configured to store the respective control instructions in control transactions, for example, the first memory module uses the transmission requirements to select a transmission method or a combination of transmission methods for a data transmission of the control transactions to the devices, for example, a first selected transmission method (e.g. for non-time-critical control instructions/control transactions) stores the control transactions in the distributed database system (BC), for example, the first selected transmission method transmits the control transactions to the devices by means of the distributed database system;

for example, a second selected transmission method (e.g. for time-critical control instructions or control transactions) transmits the control transactions to the devices by means of separate and/or direct communication channels.

A further exemplary embodiment (not depicted in a figure) relates to a device as used for example in the context of or together with the control system, having:

for example, a first communication module for receiving control transactions, wherein for example, the control transactions comprise control instructions for the device, for example, the control transactions comprise execution requirements, for example, the execution requirements comprise device-specific requirements for the device and/or presupposed control instructions, for example, the applicable execution requirements are assigned to the respective control transactions;

for example, a first transmission method and/or a second transmission method can be used to receive the control transactions, for example, the first transmission method involves the control transactions being conveyed/received by means of a distributed database system, for example, the second transmission method involves the control transactions being conveyed to the devices/received by means of separate and/or direct communication channels, for example, a first checking module for checking the respective execution requirements for an execution of the control instructions of one of the control transactions by the device, wherein for example, checking is performed to ascertain whether confirmation transactions for the presupposed control instructions of the respective execution requirements of the respective control transaction are available in the distributed database system (e.g. if they are stored in data blocks), for example, a first execution module for executing the control instructions by means of the applicable device on the basis of a result of the checking.

A further exemplary embodiment (not depicted in a figure) relates to a control system having:

for example, a distributed database system having for example, a multiplicity of nodes, wherein the nodes and the devices are connected to one another via a first communication network;

for example, a first determining module (110), wherein for example, the first determining module is configured to determine execution requirements for an execution of control instructions by the devices, for example, the execution requirements are ascertained on the basis of the control instructions, for example, device-specific requirements and/or presupposed control instructions are stored in the execution requirements, for example, the first determining module is configured to determine transmission requirements for a transmission of the control instructions (e.g. by means of control transactions), for example, the transmission requirements are ascertained on the basis of the control instructions, for example, the first determining module comprises a cache module, for example, the cache module comprises a prescribed number of entries, for example, the entries store control instructions already executed by the devices with their associated execution requirements and/or store presupposed control instructions already executed by the devices;

for example, a first assigning module (120) for assigning the respective execution requirements to the control instructions;

for example, a first memory module (130), for example, the first memory module is configured to store the respective control instructions with the (assigned) execution requirements in control transactions or for example the first memory module is configured to store the respective control instructions in control transactions, for example, the first memory module uses the transmission requirements to select a transmission method or a combination of transmission methods for a data transmission of the control transactions to the devices, for example, a first selected transmission method (e.g. for non-time-critical control instructions/control transactions) stores the control transactions in the distributed database system (BC), for example, the first selected transmission method transmits the control transactions to the devices (300, D, BCN_D) by means of the distributed database system;

for example, a second selected transmission method (e.g. for time-critical control instructions or control transactions) transmits the control transactions to the devices (300, D, BCN_D) by means of separate and/or direct communication channels.

A further exemplary embodiment (not depicted in a figure) relates to a control system for controlling and/or monitoring devices, comprising:

for example, a first determining module for determining execution requirements for an execution of control instructions by the devices, wherein for example, device-specific requirements and/or presupposed control instructions are stored in the execution requirements, for example, the first determining module comprises a cache module, for example, the cache module comprises a prescribed number of entries, for example, the entries store control instructions already executed by the devices with their associated execution requirements and/or store presupposed control instructions already executed by the devices;

for example, a distributed database system having for example, a multiplicity of nodes, wherein the nodes and the devices are connected to one another via a first communication network;

for example, a first assigning module for assigning the respective execution requirements to the control instructions;

for example, a first memory module for storing the respective control instructions with the assigned execution requirements in control transactions, wherein for example, the control transactions are stored in data blocks of the distributed database system or, for example, the control transactions are stored by the distributed database system;

for example, the control transactions are transmitted to the devices by means of the data blocks and/or, for example, the control transactions are transmitted to the devices by means of the distributed database system and/or, for example, the control transactions are transmitted to the devices via a separate communication channel (e.g. of the distributed database system).

A further exemplary embodiment (not depicted in a figure) relates to an apparatus for a distributed database system or for a control system having a distributed database system for controlling and/or monitoring devices, having:

for example, a first determining module for determining execution requirements for an execution of control instructions by devices or nodes of the distributed database system, wherein for example, device-specific requirements and/or presupposed control instructions are stored in the execution requirements, for example, the first determining module comprises a cache module, for example, the cache module comprises a prescribed number of entries, for example, the entries store control instructions already executed by the devices with their associated execution requirements and/or store presupposed control instructions already executed by the devices;

the distributed database system is a blockchain, for example;

for example, a first memory module for storing the respective control instructions with the assigned execution requirements in control transactions, wherein for example, the control transactions are stored in data blocks of the distributed database system or, for example, the control transactions are stored by the distributed database system;

for example, the control transactions are transmitted to the devices by means of the data blocks and/or, for example, the control transactions are transmitted to the devices by means of the distributed database system and/or, for example, the control transactions are transmitted to the devices via a separate communication channel (e.g. of the distributed database system).

A further exemplary embodiment (not depicted in a figure) relates to a determining module for a distributed database system or for a control system having a distributed database system for controlling and/or monitoring devices, having:

a first interface for receiving or retrieving control instructions;

a first evaluation unit for determining execution requirements for an execution of control instructions by nodes of a distributed database system or by devices, wherein the execution requirements are determined on the basis of device-specific requirements and/or presupposed control instructions, for example, the first determining module comprises a cache module, for example, the cache module comprises a prescribed number of entries, for example, the entries store control instructions already executed by the devices with their associated execution requirements and/or store presupposed control instructions already executed by the devices;

for example, a first memory module for storing the respective control instructions with the assigned execution requirements in control transactions, wherein
for example, the control transactions are stored in data blocks of the distributed database system or, for example, the control transactions are stored by the distributed database system;
for example, the control transactions are transmitted to the devices by means of the data blocks and/or, for example, the control transactions are transmitted to the devices by means of the distributed database system and/or, for example, the control transactions are transmitted to the devices via a separate communication channel (e.g. of the distributed database system).

A further exemplary embodiment (not depicted in a figure) relates to a method for the computer-aided determination of execution requirements for control instructions, having the following method steps:
for example, a method step for receiving or retrieving control instructions;
for example, a method step for determining execution requirements for an execution of control instructions by nodes of a distributed database system or by devices, wherein
for example, the execution requirements are determined on the basis of device-specific requirements and/or presupposed control instructions,
the distributed database system is a blockchain, for example,
for example, a method step for storing entries in a cache module, wherein
for example, the cache module can store a prescribed number of entries,
for example, the entries store control instructions already executed by the devices with their associated execution requirements and/or store presupposed control instructions already executed by the devices;
for example, a method step for storing the respective control instructions with the assigned execution requirements in control transactions, wherein
for example, the control transactions are stored in data blocks of the distributed database system or, for example, the control transactions are stored by the distributed database system;
for example, the control transactions are transmitted to the devices by means of the data blocks and/or, for example, the control transactions are transmitted to the devices by means of the distributed database system and/or, for example, the control transactions are transmitted to the devices via a separate communication channel (e.g. of the distributed database system).

A further exemplary embodiment (not depicted in a figure) relates to a method for the computer-aided determination of execution requirements for control instructions, having the following method steps:
for example, a method step for receiving or retrieving control instructions;
for example, a method step for determining execution requirements for an execution of control instructions by nodes of a distributed database system or by devices, wherein
for example, the execution requirements are determined on the basis of device-specific requirements and/or presupposed control instructions,
for example, the distributed database system is a blockchain, for example,
for example, a method step for storing entries in a cache module, wherein
for example, the cache module can store a prescribed number of entries,
for example, the entries store control instructions already executed by the devices with their associated execution requirements and/or store presupposed control instructions already executed by the devices,
for example, a method step for storing the respective control instructions with the applicable execution requirements in control transactions, wherein for example the control transactions are stored in data blocks of a distributed database system or for example are stored by the distributed database system.

A further exemplary embodiment (not depicted in a figure) relates to a method for the computer-aided control of devices, having the following method steps:
for example, a method step for determining execution requirements for an execution of the control instructions by the devices;
for example, a method step for assigning the respective execution requirements to the control instructions;
for example, a method step for storing the respective control instructions with the applicable execution requirements in control transactions, wherein for example the control transactions are stored in data blocks of a distributed database system or are stored by the distributed database system;
for example, a method step for storing entries in a cache module, wherein
for example, the cache module can store a prescribed number of entries,
for example, the entries store control instructions already executed by the devices with their associated execution requirements and/or store presupposed control instructions already executed by the devices,
for example, a method step for storing the respective control instructions with the applicable execution requirements in control transactions, wherein for example the control transactions are stored in data blocks of a distributed database system or for example are stored by the distributed database system.

A further exemplary embodiment (not depicted in a figure) relates to a method for the computer-aided control of devices, having the following method steps:
for example, a method step for determining execution requirements for an execution of the control instructions by the devices;
for example, a method step for assigning the respective execution requirements to the control instructions;
for example, a method step for storing the respective control instructions with the applicable execution requirements in control transactions, wherein the control transactions e.g. are stored in data blocks of a distributed database system or e.g. are stored by the distributed database system;
for example, a method step for storing entries in a cache module, wherein
for example, the cache module can store a prescribed number of entries,
for example, the entries store control instructions already executed by the devices with their associated execution requirements and/or store presupposed control instructions already executed by the devices.

A further exemplary embodiment (not depicted in a figure) relates to a control system for controlling and/or monitoring devices, comprising:
- for example, a distributed database system having
  - for example, a multiplicity of nodes, wherein the nodes and the devices are connected to one another via a first communication network;
  - for example, a first determining module, wherein
    - for example, the first determining module assigns execution requirements to control instructions,
    - for example, an executability of the control instructions by nodes of the distributed database system or by devices is ascertained on the basis of the execution requirements,
    - for example, the execution requirements comprise device-specific requirements and/or presupposed control instructions,
    - for example, the first determining module comprises a cache module,
    - for example, the cache module comprises a prescribed number of entries,
    - for example, the entries store control instructions already executed by the devices with their associated execution requirements and/or store presupposed control instructions already executed by the devices;
- for example, a first memory module for storing the respective control instructions with the assigned execution requirements in control transactions, wherein
  - for example, the control transactions are stored in data blocks of the distributed database system or, for example, are stored by the distributed database system;
  - for example, the control transactions are transmitted to the devices by means of the data blocks and/or, for example, the control transactions are transmitted to the devices by means of the distributed database system and/or, for example, the control transactions are transmitted to the devices via a separate communication channel (e.g. of the distributed database system).

A further exemplary embodiment (not depicted in a figure) relates to a determining module for a distributed database system or for a control system having a distributed database system for controlling and/or monitoring devices, having:
- for example, a first interface for receiving or retrieving control instructions;
- for example, a first evaluation unit, wherein
  - for example, the first evaluation unit assigns execution requirements to the control instructions,
  - for example, an executability of the control instructions by nodes of a distributed database system or by devices is ascertained on the basis of the execution requirements,
  - for example, the execution requirements comprise device-specific requirements and/or presupposed control instructions,
  - for example, the first determining module comprises a cache module,
  - for example, the cache module comprises a prescribed number of entries,
  - for example, the entries store control instructions already executed by the devices with their associated execution requirements and/or store presupposed control instructions already executed by the devices.

A further exemplary embodiment (not depicted in a figure) relates to an apparatus for a distributed database system or for a control system having a distributed database system for controlling and/or monitoring devices, having:
- for example, a first determining module, wherein
  - for example, the distributed database system comprises a multiplicity of nodes, the nodes and the devices being connected to one another via a first communication network,
  - for example, the first determining module assigns execution requirements to control instructions,
  - for example, an executability of the control instructions by nodes of the distributed database system or by devices is ascertained on the basis of the execution requirements,
  - for example, the execution requirements comprise device-specific requirements and/or presupposed control instructions,
  - for example, the first determining module comprises a cache module,
  - for example, the cache module comprises a prescribed number of entries,
  - for example, the entries store control instructions already executed by the devices with their associated execution requirements and/or store presupposed control instructions already executed by the devices.

A further exemplary embodiment (not depicted in a figure) relates to a method for the computer-aided assignment of execution requirements for control instructions, having the following method steps:
- for example, a method step for receiving or retrieving control instructions;
- for example, a method step for assigning execution requirements to the control instructions, wherein
  - for example, an executability of the control instructions by nodes of a distributed database system or by devices is ascertained on the basis of the execution requirements,
  - for example, the execution requirements comprise device-specific requirements and/or presupposed control instructions,
  - for example, the distributed database system is a blockchain, for example,
- for example, a method step for storing entries in a cache module, wherein
  - for example, the cache module can store a prescribed number of entries,
- for example, the entries store control instructions already executed by the devices with their associated execution requirements and/or store presupposed control instructions already executed by the devices.

A further exemplary embodiment (not depicted in a figure) relates to a method for the computer-aided control of devices, having the following method steps:
- for example, a method step for assigning execution requirements to the control instructions, wherein
  - for example, an executability of the control instructions by nodes of a distributed database system or by devices is ascertained on the basis of the execution requirements,
  - for example, the execution requirements comprise device-specific requirements and/or presupposed control instructions,
- for example, a method step for storing entries in a cache module, wherein
  - for example, the cache module can store a prescribed number of entries,
  - for example, the entries store control instructions already executed by the devices with their associated execution requirements and/or store presupposed control instructions already executed by the devices, for example, a method step for storing the respective control instructions with the applicable execution requirements in control transactions, wherein for example, the control transactions are transmitted to the devices by means of the data blocks and/or, for example, the control transactions are transmitted to the devices by means of the distributed database system and/or, for example, the control transactions are transmitted to the devices via a separate communication channel (e.g. of the distributed database system).

A further exemplary embodiment (not depicted in a figure) relates to a control system for controlling and/or monitoring devices, comprising:

for example, a first determining module for determining execution requirements for an execution of control instructions by the devices, wherein for example, device-specific requirements and/or presupposed control instructions are stored in the execution requirements;

for example, a distributed database system having for example, a multiplicity of nodes, for example wherein the nodes and the devices are connected to one another via a first communication network;

for example, a first assigning module for assigning the respective execution requirements to the control instructions;

for example, a first memory module for storing the respective control instructions with the assigned execution requirements in control transactions, wherein for example, the control transactions are stored in data blocks of the distributed database system or, for example, the control transactions are stored by the distributed database system;

for example, the control transactions are transmitted to the devices by means of the data blocks or, for example, the control transactions are transmitted to the devices by means of the distributed database system and/or by means of a separate communication channel (e.g. a separate communication channel of the distributed database system);

for example, a first checking module for checking the respective execution requirements for the execution of the control instructions of one of the control transactions by an applicable device, wherein for example, the device-specific requirements for the applicable device are checked; and/or for example, checking is performed to ascertain whether confirmation transactions for the presupposed control instructions are available in data blocks of the distributed database system or whether for example confirmation transactions for the presupposed control instructions are available in the distributed database system (e.g. by virtue of the confirmation transactions being stored in the distributed database system and/or being able to be retrieved from the distributed database system by the device);

for example, an execution module for executing the control instructions by means of the applicable device on the basis of a result of the checking;

for example, a second memory module for storing the result of the execution of the control instructions in confirmation transactions of the data blocks of the distributed database system or for example for storing the result of the execution of the control instructions in confirmation transactions of the distributed database system (e.g. the confirmation transactions are stored by the distributed database system or stored in the distributed database system).

A further exemplary embodiment (not depicted in a figure) relates to a device as used for example in the context of or together with the control system, having:

for example, a first communication module for receiving control transactions, wherein for example, the control transactions comprise control instructions for the device, and/or for example, the control transactions comprise execution requirements, and/or for example, the execution requirements comprise device-specific requirements for the device and/or presupposed control instructions, and/or for example, the applicable execution requirements are assigned to the respective control transactions, and/or for example, a first transmission method and/or a second transmission method can be used to receive the control transactions, and/or for example, the first transmission method involves the control transactions being conveyed/received by means of a distributed database system, and/or for example, the second transmission method involves the control transactions being conveyed to the devices/received by means of separate and/or direct communication channels, for example, a first checking module for checking the respective execution requirements for an execution of the control instructions of one of the control transactions by the device, wherein for example, checking is performed to ascertain whether confirmation transactions for the presupposed control instructions of the respective execution requirements of the respective control transaction are available in the distributed database system (e.g. if they are stored in data blocks) or for example whether confirmation transactions for the presupposed control instructions are available in data blocks of the distributed database system, and/or for example, the device-specific requirements for the applicable device are checked;

for example, a first execution module for executing the control instructions by means of the applicable device on the basis of a result of the checking, for example, a second memory module for storing the result of the execution of the control instructions in confirmation transactions of the data blocks of the distributed database system or for storing the result of the execution of the control instructions in confirmation transactions of the distributed database system (e.g. the confirmation transactions are stored by the distributed database system or stored in the distributed database system).

A further exemplary embodiment (not depicted in a figure) relates to a device as used for example in the context of or together with the control system, having:

for example, a first communication module for receiving control transactions, wherein for example, the control transactions comprise control instructions for the device, and/or for example, the control transactions comprise execution requirements, and/or for example, the execution requirements comprise device-specific requirements for the device and/or presupposed control instructions, and/or for example, the applicable execution requirements are assigned to the respective control transactions, for example, the control transactions are conveyed to the device by means of the distributed database system for reception or for example the control transactions are retrieved from the distributed database system by the device for reception;

for example, a first checking module for checking the respective execution requirements for an execution of the control instructions of one of the control transactions by the device, wherein for example, checking is performed to ascertain whether confirmation transactions for the presupposed control instructions of the respective execution requirements of the respective control transaction are available in the distributed database system (e.g. if they are stored in data blocks) or for example whether confirmation transactions for the presupposed control instructions are available in data blocks of the distributed database system, and/or for example, the device-specific requirements for the applicable device are checked;

for example, a first execution module for executing the control instructions by means of the applicable device on the basis of a result of the checking, for example, a second memory module for storing the result of the execution of the control instructions in confirmation transactions of the data blocks of the distributed database system or for example for storing the result of the execution of the control instructions in confirmation transactions of the distributed database system (e.g. the confirmation transactions are stored by the distributed database system or stored in the distributed database system).

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A control system for controlling and/or monitoring devices, comprising:
a distributed database system;
a first determining module, wherein:
the first determining module assigns execution requirements to control instructions,
an executability of the control instructions by nodes of the distributed database system or by devices is ascertained on the basis of the execution requirements,
the execution requirements comprise device-specific requirements and/or presupposed control instructions,
the first determining module comprises a cache module,
the cache module comprises a prescribed number of entries,
the entries store control instructions already executed by the devices with their associated execution requirements and/or store presupposed control instructions already executed by the devices;
a first memory module for storing the respective control instructions with the assigned execution requirements in control transactions, wherein:
the control transactions are stored in the distributed database system;
the control transactions are transmitted to the devices by means of the distributed database system;
a first checking module for checking the respective execution requirements during execution of the control instructions of one of the control transactions by an applicable device, wherein:
checking is performed to ascertain whether confirmation transactions for the presupposed control instructions of the respective execution requirements of the respective control transaction are available in the distributed database system; and
an execution module for executing the control instructions by means of the applicable device on a basis of the result of the checking.

2. The control system as claimed in claim 1, wherein the presupposed control instructions are already executed control instructions for which a confirmation of the execution thereof is stored in confirmation transactions of the distributed database system.

3. The control system as claimed in claim 1, wherein the execution requirements prescribe a performance of the presupposed control instructions before further control instructions are performed.

4. The control system as claimed in claim 1, wherein the execution requirements prescribe an order of a performance of the control instructions.

5. The control system as claimed in claim 1, wherein the execution requirements prescribe dependencies with respect to other control instructions of a performance of the control instructions.

6. The control system as claimed in claim 1, wherein the execution requirements prescribe priorities for a performance of the control instructions.

7. The control system as claimed in claim 1, wherein the execution requirements prescribe a time limit by which control instructions need to be performed.

8. The control system as claimed in claim 1, wherein the control system comprises an optimizer that optimizes an execution of the control instructions by the devices on the basis of a prescribed criterion.

9. The control system as claimed in claim 1, wherein:
the distributed database system is a blockchain and in particular data blocks are blocks of the blockchain.

10. A determining module for a distributed database system or for a control system having a distributed database system for controlling and/or monitoring devices, comprising:
a first interface for receiving or retrieving control instructions; and
a first evaluation unit, wherein:
the first evaluation unit assigns execution requirements to the control instructions,
an executability of the control instructions by nodes of a distributed database system or by devices is ascertained on the basis of the execution requirements,
the execution requirements comprise device-specific requirements and/or presupposed control instructions,
the first determining module comprises a cache module, the cache module comprises a prescribed number of entries, the entries store control instructions already executed by the devices with their associated execution requirements and/or store presupposed control instructions already executed by the devices.

11. The determining module as claimed in claim 10, wherein:
the determining module comprises an optimizer,
the optimizer optimizes the execution of the control instructions by the devices on the basis of a prescribed criterion.

12. A device comprising:
a first communication module for receiving control transactions, wherein the distributed database system provides the control transactions, wherein:
the control transactions comprise control instructions for the device,
the control transactions comprise execution requirements,
the execution requirements comprise device-specific requirements for the device and/or presupposed control instructions,
the applicable execution requirements are assigned to the respective control transactions,
a first checking module for checking the respective execution requirements for an execution of the control instructions of one of the control transactions by the device, wherein
checking is performed to ascertain whether confirmation transactions for the presupposed control instructions of the respective execution requirements of the respective control transaction are available in the distributed database system; and
a first execution module for executing the control instructions by means of the applicable device on a basis of a result of the checking.

13. A method for the computer-aided assignment of execution requirements for control instructions, comprising:
receiving or retrieving control instructions;
assigning execution requirements to the control instructions, wherein:
an executability of the control instructions by nodes of a distributed database system or by devices is ascertained on the basis of the execution requirements,
the execution requirements comprise device-specific requirements and/or presupposed control instructions,
the distributed database system is a blockchain, and
storing entries in a cache module, wherein:
the cache module can store a prescribed number of entries,
the entries store control instructions already executed by the devices with their associated execution requirements and/or store presupposed control instructions already executed by the devices.

14. A computer program product, comprising a computer readable hardware storage device having a computer readable program code stored therein, said program code executable by a processor of a computer system to implement a method having program instructions for performing the method as claimed in claim 13.

15. A providing apparatus for the computer program product as claimed in claim 14, wherein the providing apparatus stores and/or provides the computer program product.

16. A method for the computer-aided control of devices, comprising:
assigning execution requirements to the control instructions, wherein:
an executability of the control instructions by nodes of a distributed database system or by devices is ascertained on the basis of the execution requirements,
the execution requirements comprise device-specific requirements and/or presupposed control instructions,
storing entries in a cache module, wherein:
the cache module can store a prescribed number of entries,
the entries store control instructions already executed by the devices with their associated execution requirements and/or store presupposed control instructions already executed by the devices, and
storing the respective control instructions with the applicable execution requirements in control transactions, wherein the control transactions are stored in the distributed database system.

17. A method for the computer-aided control of a device, comprising:
receiving control transactions, wherein a distributed database system provides the control transactions, wherein:
the control transactions comprise control instructions for the device,
the control transactions comprise execution requirements,
the execution requirements comprise device-specific requirements for the device and/or presupposed control instructions,
the applicable execution requirements are assigned to the respective control transactions,
checking the respective execution requirements for an execution of the control instructions of one of the control transactions by the device, wherein:
checking is performed to ascertain whether confirmation transactions for the presupposed control instructions of the respective execution requirements of the respective control transaction are available in the distributed database system; and
executing the control instructions by means of the applicable device on the basis of a result of the checking.

\* \* \* \* \*